(12) United States Patent
Amada

(10) Patent No.: US 7,684,100 B2
(45) Date of Patent: Mar. 23, 2010

(54) OPTICAL-ELEMENT HOLDING DEVICE, METHOD OF ADJUSTING SHAPE OF OPTICAL ELEMENT, OPTICAL-ELEMENT SHAPE ADJUSTING DEVICE, METHOD OF CORRECTING SCANNING LINE VARIATION, OPTICAL SCANNING DEVICE, AND IMAGE FORMING APPARATUS

(75) Inventor: Taku Amada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 327 days.

(21) Appl. No.: 11/287,473

(22) Filed: Nov. 28, 2005

(65) Prior Publication Data

US 2006/0132880 A1 Jun. 22, 2006

(30) Foreign Application Priority Data

Nov. 26, 2004 (JP) .............................. 2004-342112
Dec. 27, 2004 (JP) .............................. 2004-377727
Mar. 18, 2005 (JP) .............................. 2005-080609

(51) Int. Cl.
G02B 26/08 (2006.01)
(52) U.S. Cl. ................................................. 359/224.1
(58) Field of Classification Search ................. 359/196, 359/223–226, 871, 872
See application file for complete search history.

(56) References Cited

U.S. PATENT DOCUMENTS 6,064,505 A * 5/2000 Blanding .................... 359/224

FOREIGN PATENT DOCUMENTS

| JP | 63-43172 | 2/1988 |
|---|---|---|
| JP | 7-19084 | 3/1995 |
| JP | 9-58053 | 3/1997 |
| JP | 10-228148 | 8/1998 |
| JP | 11-153765 | 6/1999 |
| JP | 11-231240 | 8/1999 |
| JP | 3049606 | 3/2000 |
| JP | 2001-133718 | 5/2001 |
| JP | 2001-166235 | 6/2001 |
| JP | 2001-253113 | 9/2001 |
| JP | 2002-148551 | 5/2002 |
| JP | 2002-258189 | 9/2002 |
| JP | 2003-140070 | 5/2003 |
| JP | 2003-154703 | 5/2003 |
| JP | 2003-215484 | 7/2003 |
| JP | 2003-233094 | 8/2003 |
| JP | 2003-255245 | 9/2003 |
| JP | 2003-262816 | 9/2003 |
| JP | 2004-109761 | 4/2004 |
| JP | 3569412 | 6/2004 |

* cited by examiner

*Primary Examiner*—Euncha P Cherry
(74) *Attorney, Agent, or Firm*—Dickstein Shapiro LLP

(57) ABSTRACT

An optical-element holding device includes an elastic member that presses an optical element with an elastic force in a direction orthogonal to an optical axis of the optical element and orthogonal to a longitudinal direction of the optical element, and a support member that forms a pair with the elastic member and supports the optical element against a pressing force of the elastic member. At least three pairs of the elastic member and the support member are provided.

24 Claims, 57 Drawing Sheets

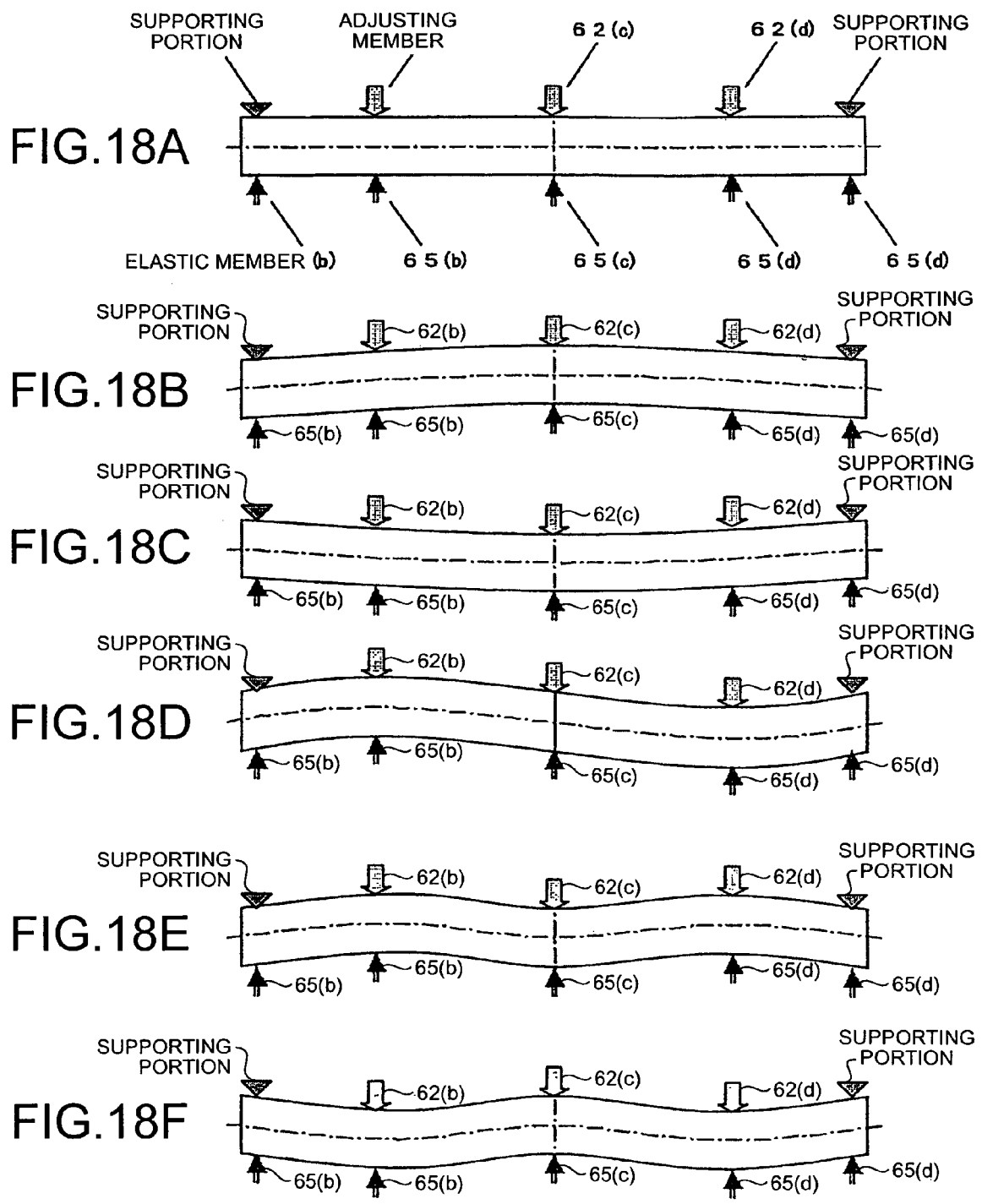

ELASTIC MODULUS : $K = (W \times L^3)/(48 \times \delta)$

GEOMETRICAL MOMENT OF INERTIA: I =2100 [mm4]
YOUNG'S MODULUS: E =2,500 [MPa] (zeonex_E48R)
⇒BENDING RIGIDITY: EI =5.3 [N·m²]

$L = 220 \, [\text{mm}], \quad A = L/4 = 55 \, [\text{mm}]$
$W1 = -12 \, [N], \quad W2 = +9 \, [N]$ MODEL AT THE TIME WHEN LOADS W1 AND W2 ARE APPLIED TO CENTER (Y=0) AND MIDDLE PORTIONS (Y=±A), RESPECTIVELY, WITH BOTH ENDS SUPPORTED ROTATIONALLY (b) COMPARISON OF CALCULATION RESULT AND MEASUREMENT RESULT

| --☐-- | MEASUREMENT RESULT |
|---|---|
| ----- | CALCULATION RESULT |

A-A

D-D

FIG.62
(a)
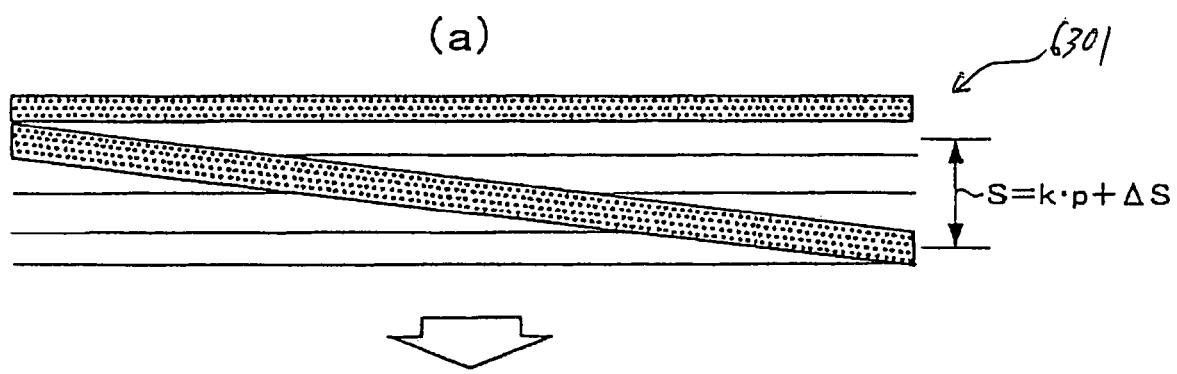
$S = k \cdot p + \Delta S$
(b)
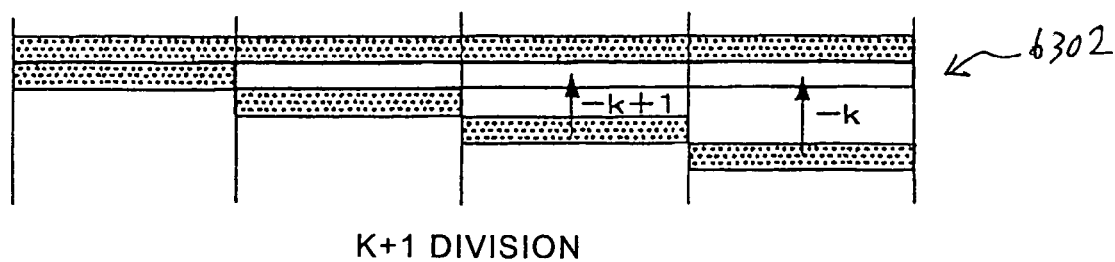
K+1 DIVISION

OPTICAL-ELEMENT HOLDING DEVICE, METHOD OF ADJUSTING SHAPE OF OPTICAL ELEMENT, OPTICAL-ELEMENT SHAPE ADJUSTING DEVICE, METHOD OF CORRECTING SCANNING LINE VARIATION, OPTICAL SCANNING DEVICE, AND IMAGE FORMING APPARATUS

CROSS-REFERENCE TO RELATED APPLICATIONS

The present document incorporates by reference the entire contents of Japanese priority document, 2004-342112 filed in Japan on Nov. 26, 2004.

The present document incorporates by reference the entire contents of Japanese priority document, 2004-377727 filed in Japan on Dec. 27, 2004.

The present document incorporates by reference the entire contents of Japanese priority document, 2005-80609 filed in Japan on Mar. 18, 2005.

BACKGROUND OF THE INVENTION

1. Field of the Invention

The present invention relates to a long-optical-element holding device, a method of adjusting shape of a long optical element, a long-optical-element shape adjusting device, a method of correcting scanning line variation, an optical scanning device, and an image forming apparatus.

2. Description of the Related Art

In recent years, in image forming apparatuses, such as a laser printer, a digital copying machine, and a laser facsimile, a plastic material is often used as a material for an optical element forming a scanning optical system. Although plastic is excellent in mass productivity, a shape of the plastic often varies from an ideal one because of, for example, a distribution of temperature in a die at the time of molding and non-uniformity of cooling after the plastic is taken out from the die.

In the optical scanning system, an optical element elongated in a main scanning direction is often used. Since the optical element bends in a sub-scanning direction, depending on a holding method for the long optical element, the bending of the optical element causes scanning position deviation in a direction corresponding to sub-scanning, such as scanning line tilt and scanning line bending. An error in attachment of the optical element to a housing also causes scanning position deviation in a direction corresponding to sub-scanning on a surface to be scanned. The scanning position deviation is often nonnegligibly large.

In an image forming apparatus having a plurality of scanning units for an increase in speed of image formation or for color image formation (hereinafter, "tandem image forming apparatus"), an amount of scanning position deviation in a direction corresponding to sub-scanning such as scanning line bending is different for each of the scanning units because of a temperature deviation among housings that hold and fix the scanning units. This causes deterioration in a quality of a formed image, color misalignment, and the like. The same problem occurs in a system for making a plurality of light beams incident on a single deflector to use the light beams for scanning and arranging optical elements to be laid one on top of another in a sub-scanning direction, that is, a system for holding all scanning units in an identical optical housing. An amount of scanning position deviation in a direction corresponding to sub-scanning such as scanning line tilt and scanning line bending on each surface to be scanned, for example, a photosensitive member surface is different because of an influence of a shape error or an attachment error of the optical elements forming scanning optical systems or a temperature distribution in an identical housing. This causes deterioration in a quality of a formed image.

A tandem image forming apparatus is one of the types of a full-color image forming apparatus. In the tandem image forming apparatus, for example, four photosensitive drums are provided along a conveyance surface of a transfer belt in association with colors of cyan (C), magenta (M), yellow (Y), and black (K). Optical scanning devices provided in association with the respective photosensitive drums scan the photosensitive drums using light beams to form electrostatic latent images on peripheral surfaces of the photosensitive drums. The electrostatic latent images are visualized with toners of corresponding colors. The visualized images are sequentially transferred onto a sheet conveyed by the transfer belt to be superimposed one on top of another to form a multi-color image. Therefore, if scanning position deviation in a direction corresponding to sub-scanning occurs for each color, deterioration in a quality of a formed image or color misalignment is caused.

As a solution for the problem described above, many proposals have been made. Some of proposals related to the present invention among the proposals are described below as examples.

As an example, an optical scanning device is proposed in, for example, Japanese Patent Application Laid-Open No. H11-231240. The optical scanning device includes an adjusting mechanism for forcibly deforming an optical member, for example, a mirror in a scanning optical system with an adjusting screw or the like to correct scanning line bending. However, this system has a difficulty in that a magnification in a main scanning direction changes because of the correction of scanning line bending. Therefore, in particular, in a tandem drawing optical system, dot position deviation in the main scanning direction occurs among optical scanning devices and stations consisting of photosensitive members corresponding to the optical scanning devices. Color misalignment due to the dot position deviation occurs. Since it is impossible to adjust scanning line tilt, even if an amount of scanning line bending for each of the stations is reduced to be within a predetermined range, if the scanning line tilt fluctuates for each of the stations, color unevenness or color misalignment is caused. This leads to deterioration in a quality of a formed image.

As another example, a scanning optical device is proposed in, for example, Japanese Patent Application Laid-Open No. 2001-166235. The scanning optical device presses and supports a plastic lens disposed in a housing with a plurality of adjusting screws screwed in the housing and springs arranged in positions opposed to the adjusting screws and adjusts a pressing force by the adjusting screws to correct deflective deformation of the plastic lens and correct any one of bending and tilt or both of a scanning line on a surface to be scanned. Since the plastic lens is disposed in the housing, the adjustment system according to the invention has a difficulty in that a size of the optical scanning device increases. Since the housing is fixed to an optical housing, it is impossible to correct the scanning line tilt.

As still another example, a tandem image forming apparatus using a plurality of scanning units is proposed in, for example, Japanese Patent Application Laid-Open No. 2001-166235. The tandem image forming apparatus is a color image forming apparatus that uses a scanning optical device in which all the scanning units are assembled in separate housings, respectively, and positions of all the housings are adjusted to photosensitive members corresponding thereto to cause scanning lines in the photosensitive members to coincide with one another. However, according to the invention, there is a difficulty in that, since a mechanism for adjustment is complicated and adjustment time is long, an increase in cost is caused. It is likely that color misalignment occurs because it is impossible to adjust scanning line bending when temperature fluctuates from a room temperature state to cause a temperature distribution among the scanning units. It is impossible to cope with aged deterioration due to a temperature change or the like. Thus, it is impossible to highly accurately correct color misalignment during printing or in an environment of use.

As still another example, an optical scanning device for a multi-color image forming apparatus is proposed in for example, Japanese Patent Application Laid-Open No. H10-268217. The optical scanning device brings an adjusting screw into abutment against a portion near the center in a length direction of a toroidal lens consisting of a plastic lens forming a scanning optical system to bend the toroidal lens in a sub-scanning direction and adjusts a deflection degree of the toroidal lens according to adjustment of the adjusting screw to correct scanning line bending. According to the invention, it is possible to correct scanning line bending among photosensitive members in an initial state. However, it is impossible to cope with aged deterioration due to a temperate change or the like. Thus, it is impossible to highly accurately correct color misalignment due to a change in environment during printing or color misalignment due to an environment of use.

As described above, all the conventional technologies still have a technical problem in that a dot position in a main scanning direction in a surface to be scanned is shifted, it is impossible to correct scanning line tilt, or it is impossible to correct scanning line bending involved in any one of aged deterioration and a temperature change or both.

Further, conventionally, as a constitution of an optical scanning device, it is proposed to correct scanning line bending and scanning line tilt by bending a long lens forming a scanning and focusing optical system with a plurality of fulcrums as supporting points or tilting the long lens in a sub-scanning direction in order to reduce the bending or the scanning line tilt (see, for example, Japanese Patent Application Laid-Open No. 2002-258189).

In an image forming apparatus using an electrophotographic process called a Carlson process, formation of a latent image by exposure, a development by a toner, and transfer of a toner image to a transfer member are performed according to rotation of a photosensitive drum serving as an image carrier. Therefore, in a multi-color image forming apparatus in which a plurality of photosensitive drums are arranged along a conveyance direction of a transfer member to superimpose toner images formed by image forming stations of respective colors one on top of another, a time difference from formation to transfer of latent images due to eccentricity and fluctuation in diameters of the photosensitive drums, a difference of intervals of the photosensitive drums of the respective colors, or fluctuation in speed or meander of a transfer member such as a transfer belt or a conveyor belt for conveying recording paper causes misregistration in a sub-scanning direction of respective toner images. This leads to color misalignment and color change to deteriorate an image quality.

Conventionally, regardless of whether the misregistration is misregistration caused by an optical scanning device or misregistration due to other reasons, the misregistration is periodically detected according to a misregistration detection pattern recorded in a transfer member at the time of start of the apparatus, between jobs, or the like. Concerning a sub-scanning direction, a position of a leading line is corrected by adjusting timing for starting drawing an image every other deflective reflection surface of a polygon mirror. Concerning a main scanning direction, a position for starting drawing an image is corrected by adjusting light-emission start timing of a light source according to a synchronization detection signal (see, for example, Japanese Patent Application Laid-Open No. H7-19084, Japanese Patent Application Laid-Open No. 2001-253113, and Japanese Patent Application Laid-Open No. 2003-154703 (hereinafter, "first document")). Along with the correction, full-width magnifications of respective colors are set by taking measures for, for example, detecting scanning time from a scanning start to a scanning end and adjusting a frequency of a pixel clock to the scanning time detected (see, for example, Japanese Patent Application Laid-Open No. H9-58053).

On the other hand, in such a multi-color image forming apparatus, an increase in speed and an increase in density have been advanced year after year. As measures for coping with the increase in speed and the increase in density, there is a method of increasing the number of revolutions of a polygon motor. However, since there is a limit in a life of a bearing, heat generation and vibration are not sufficiently controlled. Thus, a system using a multi-beam light source that can realize the increase in speed and the increase in density by performing scanning using a plurality of beams at a smaller number of revolutions is proposed. However, the multi-beam light source has differences in pitches and wavelengths among light sources. Thus, as disclosed in the first document, an example for preventing the differences among the light sources by performing misregistration detection for a set of a plurality of lines separately is proposed. Moreover, an example using a liquid crystal deflection element as means for correcting a scanning position in a sub-scanning direction is proposed (see, for example, Japanese Patent Application Laid-Open No. 2003-233094 and Japanese Patent Application Laid-Open No. 2003-215484).

In recent years, intending to improve a scanning characteristic, an optical element having a special surface represented by an aspherical surface is generally adopted for a focusing optical system of an optical scanning device. There is a resin material as a material from which such an optical element having a special surface can be easily formed. Since it is possible to form the special surface by integrally molding the resin material, cost for forming the optical element is low. Thus, the optical element formed of the resin material is frequency used in a focusing optical system.

An optical characteristic of the optical element formed of the resin material is affected by a change in temperature or humidity to change easily. When such an optical element is used for a scanning and focusing optical system for an optical scanning device, a state of bending and constant speed property of a scanning line also change because of a change in temperature or humidity. Therefore, when several tens color images are continuously formed, an internal temperature rises because of a continuous operation of respective optical scanning devices, an optical characteristic of the focusing optical system changes, and a state of bending and constant speed property of scanning lines for drawing images in the respective optical scanning devices gradually change. As a result, a tone of a color image obtained in an initial period and a tone of a color image obtained in an end period may be completely different because of a color misalignment phenomenon. Since temperature in the optical scanning device rises, a housing for the optical scanning device expands and a position of a receiving surface of the optical element changes. Consequently, a deficiency occurs in that a scanning position with respect to a photosensitive member is shifted over time, for example, a beam position with respect to the optical element changes or a setting angle for a return mirror changes.

A scanning and focusing lens such as an fθ lens representative as an optical element forming a scanning and focusing optical system is generally formed as a strip-shaped lens long in a main scanning direction by cutting off an unnecessary portion (a portion on which deflected light beams are not made incident) of a lens in a sub-scanning direction. When the scanning and focusing optical system is formed of a plurality of lenses, a lens length in the main scanning direction increases as an arrangement position of the lenses is farther apart from a light deflecting unit. A long lens having a length of about 100 mm to 200 mm or more is required. Such a long lens is generally formed by resin molding using a resin material. When a temperature distribution in the lens becomes non-uniform because of a change in ambient temperature, the lens is warped to be bowed in the sub-scanning direction. Such warp of the long lens causes the scanning line bending. When the warp is marked, the scanning line bending also occurs excessively.

As examples of the optical scanning device applicable to the multi-color image forming apparatus, a constitution in which light beams from light sources corresponding to respective colors are collectively used for scanning by a single polygon mirror and a plurality of mirrors for leading the respective light beams to scanning optical systems and photosensitive drums corresponding to the light beams are integrally supported in a common housing and a constitution in which optical scanning devices are arranged individually in association with respective photosensitive drums are known (see, for example, Japanese Patent Application Laid-Open No. 2002-148551 (hereinafter, "second document")). According to the constitution described in the second document, components are arranged such that light beams traveling to the photosensitive drums pass different paths. Thus, respective irradiation positions easily fluctuate because of, for example, temperature of an environment in which the multi-color image forming apparatus is set.

It is possible to periodically detect a misregistration detection pattern recorded in a transfer member such as an intermediate transfer belt, for example, at the time of start of the apparatus or between jobs and correct the deviation of an irradiation position based on a result of the detection. However, since the irradiation position further fluctuates because of heat or the like from a fixing device and a polygon motor following a print operation, if the number of prints per one job is large, color misalignment and color change gradually occur. In particular, as in the invention described in the second document, when optical systems are arranged to be opposed to each other across a polygon mirror, since scanning directions are opposite in the opposed optical systems, a position for drawing an image is shifted by fluctuation in a main scanning magnification. Moreover, since scanning position deviation among respective colors increases because of distortion of a housing, color misalignment and color change tend to occur.

As measures against the problem, it is conceivable to always observe temperature and, when the temperature reaches a predetermined temperature change width or when the number of prints exceeds a predetermined number, stop the print operation and correct deviation of the irradiation position again. However, taking into account a flow of creating a misregistration detection pattern, detecting and correcting the misregistration detection pattern, creating a detection pattern again, and detecting and correcting the detection pattern, it takes several minutes until the correction ends. This deteriorates productivity and a toner is consumed wastefully to form the detection pattern. Therefore, it is desirable to minimize frequency of correction of a light beam irradiation position.

In the image forming apparatus using the Carlson process, formation, development, and transfer of a latent image are performed according to rotation of a photosensitive drum. Therefore, in a tandem multi-color image forming apparatus in which a plurality of photosensitive drums are arranged along a conveyance direction of a transfer member to superimpose toner images formed by image forming stations of respective colors one on top of another, a time difference from formation to transfer of latent images due to eccentricity and fluctuation in diameters of the photosensitive drums, a difference of intervals of the photosensitive drums of the respective colors, or fluctuation in speed or meander of a transfer member such as a transfer belt or a conveyor belt for conveying recording paper causes misregistration or skew of respective toner images. This leads to color misalignment and color change to deteriorate an image quality.

Similarly, in the optical scanning device, unless changes (indicating bending, tilt, curve, deformation, and the like) of scanning lines for electrostatic latent images formed on a photosensitive drum are accurately adjusted, bending or skew of scanning lines for forming respective toner images occurs. This also causes color misalignment and color change.

Conventionally, regardless of whether the misregistration or the skew is misregistration or skew caused by an optical scanning device or misregistration or skew due to other reasons, as disclosed in Japanese Patent Application Laid-Open No. H7-199084 and Japanese Patent No. 3049606, the misregistration or the skew is periodically detected according to a detection pattern recorded in a transfer member at the time of start of the apparatus, between jobs, or the like. The misregistration is corrected by changing a position of a leading line by adjusting timing for starting drawing an image every other surface of a polygon mirror.

The skew is corrected by changing scanning line tilt by, for example, tilting a return mirror as disclosed in Japanese Patent No. 3049606 or rotating a scanning lens having a convergent action in a sub-scanning direction around an optical axis as disclosed in Japanese Patent Application Laid-Open No. H11-153765 and Japanese Patent Application Laid-Open No. 2003-262816.

In this way, the misregistration or the skew is automatically corrected by providing a mechanical correction function and building a pulse motor or the like in the optical scanning device.

On the other hand, the scanning line bending is also mechanically corrected by, for example, curving a return mirror as disclosed in Japanese Patent No. 3049606, correcting a shape along a main scanning direction of a scanning lens in a sub-scanning direction as disclosed in Japanese Patent Application Laid-Open No. 2002-148551, or rotating a position of a scanning lens around an axis orthogonal to a sub-scanning section as disclosed in Japanese Patent Application Laid-Open No. 2003-255245.

As a constitution for controlling deviation of a plurality of scanning lines, there is one disclosed in Japanese Patent Application Laid-Open No. 2003-140070. As a technology related to the invention, there is one disclosed in Japanese Patent Application Laid-Open No. H10-228148.

However, recently, since a scanning lens is made of resin according to a reduction in cost, it is difficult to secure straightness of a focal line of the scanning lens because of warp at the time of molding, distortion of a lens surface, and a distribution of internal refractive indexes.

On the other hand, since users have strict views about color misalignment and color change, higher accuracy is required for correction of the misregistration, the skew, and the scanning line bending.

Since the detection by the detection pattern requires labor and time for the scanning line bending, it is difficult to correct fluctuation of the bending due to fluctuation in temperature or the like. The point is how accurately the bending is adjusted at the time of manufacturing.

In that regard, in the conventional method of correcting scanning line bending, warp of a return mirror or a position of a scanning lens is changed. Although it is possible to correct the bending, a scanning line on a surface to be scanned is simply curved in a shape of a quadratic function curve to offset the curve. Thus, the method cannot cope with complicated bending having a quadratic or higher-order function curve component.

For example, a method of correcting bending and tilt while correcting warp of an external shape of a scanning lens by holding the scanning lens between metal plates is proposed in Japanese Patent Application Laid-Open No. 2004-109761. However, even if the external shape is straight, if there is distortion of a lens surface or a distribution of internal refractive indexes, it is impossible to cope with a complicated bent shape as in the conventional correction method.

In general, a quadratic function curve component is caused by warp of a scanning lens, eccentricity of an optical axis with respect to an attachment reference surface, distortion of a transfer member, or the like. On the other hand, a higher-order function curve component is caused by combination of bending of focal lines in a plurality of lenses. Thus, the higher-order function curve component has less importance compared with the quadratic function curve component.

Therefore, the higher-order function curve component has been treated as a correction residual. However, the higher-order function curve component is innegligible because of complication of a bent shape and a reduction in an allowable residual due to the distortion of a lens surface involved in formation of a scanning lens with resin, the distribution of an internal refractive indexes, and the like.

SUMMARY OF THE PRESENT INVENTION

It is an object of the present invention to at least solve the problems in the conventional technology.

An optical-element holding device according to one aspect of the present invention includes an elastic member that presses an optical element with an elastic force in a direction orthogonal to an optical axis of the optical element and orthogonal to a longitudinal direction of the optical element; and a support member that forms a pair with the elastic member and supports the optical element against a pressing force of the elastic member. At least three pairs of the elastic member and the support member are provided.

An optical-element holding device according to another aspect of the present invention includes a holding member that is provided on at least one of one side and other side of an optical element, and includes two supporting portions that supports the optical element, the two supporting portions being separated with a distance L; an adjusting member that is provided in the holding member, and deforms the optical element with a pressing force; and an elastic member that is arranged in opposite to the adjusting member, to press and fix the optical element to the holding member. Both ends of the optical element and the holding member are rotatably supported by the two supporting portions. When an elastic modulus Ki is defined as $Ki=(Wi \times L^3)/(48 \times di)$, where a deflection of the optical element at a time of applying a load Wi to a center of the optical element and the holding member is di, the elastic modulus of the optical element K1 and the elastic modulus of the holding member K2 satisfies $K2/K1 \geq 0.5$.

An optical scanning device according to still another aspect of the present invention includes a light deflector that deflects a light beam emitted from a light source; at least one optical element that focuses the deflected light beam on a surface to be scanned as a beam spot; and an optical-element holding unit including an elastic member that presses an optical element with an elastic force in a direction orthogonal to an optical axis of the optical element and orthogonal to a longitudinal direction of the optical element, and a support member that forms a pair with the elastic member and supports the optical element against a pressing force of the elastic member. At least three pairs of the elastic member and the support member are provided.

An image forming apparatus according to still another aspect of the present invention includes an optical scanning unit that includes a light deflector that deflects a light beam emitted from a light source, at least one optical element that focuses the deflected light beam on a surface to be scanned as a beam spot, and an optical-element holding unit. The optical-element holding unit includes an elastic member that presses an optical element with an elastic force in a direction orthogonal to an optical axis of the optical element and orthogonal to a longitudinal direction of the optical element; and a support member that forms a pair with the elastic member and supports the optical element against a pressing force of the elastic member. At least three pairs of the elastic member and the support member are provided.

An image forming apparatus according to still another aspect of the present invention includes an optical scanning unit that includes a light deflector that deflects a light beam emitted from a light source, at least one optical element that focuses the deflected light beam on a surface to be scanned as a beam spot, and an optical-element holding unit. The optical-element holding unit includes an elastic member that presses an optical element with an elastic force in a direction orthogonal to an optical axis of the optical element and orthogonal to a longitudinal direction of the optical element, a support member that forms a pair with the elastic member and supports the optical element against a pressing force of the elastic member. At least three pairs of the elastic member and the support member are provided, and a detecting unit that detects an amount of deflection of the optical element. The support member is capable of adjusting an amount of movement based on a result of detection by the detecting unit, and the detecting unit detects the amount of deflection of the optical element from a toner image formed on a transfer belt.

A method according to still another aspect of the present invention is for adjusting shape of an optical element in an optical-element holding device that includes an elastic member that presses an optical element with an elastic force in a direction orthogonal to an optical axis of the optical element and orthogonal to a longitudinal direction of the optical element, and a support member that forms a pair with the elastic member and supports the optical element against a pressing force of the elastic member. At least three pairs of the elastic member and the support member are provided. The method includes adjusting deflection of the optical element by adjusting a position of the support ember forming the pair with the elastic member.

A method according to still another aspect of the present invention is for adjusting shape of an optical element in an optical-element holding device that includes a holding member that is provided on at least one of one side and other side of an optical element, and includes two supporting portions that supports the optical element. The two supporting portions are separated with a distance L. An adjusting member is provided in the holding member, and deforms the optical element with a pressing force, and an elastic member is arranged in opposite to the adjusting member, to press and fix the optical element to the holding member. Both ends of the optical element and the holding member are rotatably supported by the two supporting portions. When an elastic modulus Ki is defined as $Ki=(Wi \times L^3)/(48 \times di)$, where a deflection of the optical element at a time of applying a load Wi to a center of the optical element and the holding member is di, the elastic modulus of the optical element K1 and the elastic modulus of the holding member K2 satisfies $K2/K1 \geq 0.5$. The method includes adjusting deflection of the optical element by adjusting the optical element with the adjusting member.

A method according to still another aspect of the present invention, which is for adjusting shape of an optical element, includes adjusting deflection of the optical element by applying an external force to the optical element. The shape of the optical element after the adjusting is a shape with a number of peaks equal to or less than three by making the external force act to one place.

A mechanism for adjusting shape of an optical element, according to still another aspect of the present invention, includes an elastic member that presses an optical element with an elastic force in a direction orthogonal to an optical axis of the optical element and orthogonal to a longitudinal direction of the optical element; and a support member that forms a pair with the elastic member and supports the optical element against a pressing force of the elastic member. At least three pairs of the elastic member and the support member are provided. An external force is to one place of the optical element by the elastic members and the support members to adjust the shape of the optical element so that the shape of the optical element after adjustment becomes a shape with a number of peaks equal to or less than three.

A mechanism for adjusting shape of an optical element, according to still another aspect of the present invention, employs a method of adjusting the shape of the optical element is applied. The method includes applying a counteracting elastic force against each of adjustable external forces applied to the optical element in a preliminary assembly stage in an adjusting process and making the external force act to one place so that the shape of the optical element after the adjusting is a shape with a number of peaks equal to or less than three. The mechanism includes a first plate elastic member and a second plate elastic member that are longer than the optical element, arranged on both sides of the optical element in a direction perpendicular to a longitudinal direction, and nip the optical element; a plurality of press adjusting members that are arranged in a row on one of the first and the second plate elastic members in the longitudinal direction to press and deform the optical element, the press adjusting members including a first press adjusting member, a second press adjusting member, and a third press adjusting member; two support members that are arranged between other of the first and the second plate elastic members and the optical element in opposite to the first and the second press adjusting members, respectively; and a third elastic member that is arranged between the first and the second plate elastic members and applies an elastic force to the optical element in opposite to a pressing force by the third press adjusting member.

An optical scanning device according to still another aspect of the present invention includes a mechanism for adjusting shape an optical element to which a method of adjusting the shape of the optical element is applied, the method including adjusting deflection of the optical element by applying an external force to the optical element so that the shape of the optical element after the adjusting is a shape with a number of peaks equal to or less than three by making the external force act to one place. The shape of the optical element is adjustable in a state in which the optical element is mounted on the optical scanning device.

An image forming apparatus according to still another aspect of the present invention includes an optical scanning unit that includes a mechanism for adjusting shape an optical element to which a method of adjusting the shape of the optical element is applied. The method includes adjusting deflection of the optical element by applying an external force to the optical element so that the shape of the optical element after the adjusting is a shape with a number of peaks equal to or less than three by making the external force act to one place. The shape of the optical element is adjustable in a state in which the optical element is mounted on the optical scanning unit.

An optical scanning device according to still another aspect of the present invention includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot. The third focusing optical system includes a plurality of optical elements; and a pressing member that presses at least one of optical elements at a plurality of places in a direction orthogonal to the deflection direction to hold the optical element, and controls a position of the optical element. The pressing members are made of different materials depending on a pressing place.

An optical scanning device according to still another aspect of the present invention includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot. The third focusing optical system includes a plurality of optical elements; and a pressing member that presses at least one of optical elements at a plurality of places in a direction orthogonal to the deflection direction to hold the optical element, and controls a position of the optical element. The pressing members have different thicknesses depending on a pressing place.

An optical scanning device according to still another aspect of the present invention includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot, the third focusing optical system including a plurality of optical elements; and a pressing member that presses at least one of optical elements at a plurality of places in a direction orthogonal to the deflection direction to hold the optical element, and controls a position of the optical element. The pressing members have different contact areas with respect to the optical element depending on a pressing place.

An image forming apparatus according to still another aspect of the present invention includes an optical scanning unit that includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot. The third focusing optical system includes a plurality of optical elements; and a pressing member that presses at least one of optical elements at a plurality of places in a direction orthogonal to the deflection direction to hold the optical element, and controls a position of the optical element. The pressing members are made of different materials depending on a pressing place.

An image forming apparatus according to still another aspect of the present invention includes an optical scanning unit that includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot. The third focusing optical system includes a plurality of optical elements; and a pressing member that presses at least one of optical elements at a plurality of places in a direction orthogonal to the deflection direction to hold the optical element, and controls a position of the optical element. The pressing members have different thicknesses depending on a pressing place.

An image forming apparatus according to still another aspect of the present invention includes an optical scanning unit that includes a first focusing optical system that collimates a light beam from a light source; a deflector that deflects the light beam from the first focusing optical system to a medium to be scanned; a second focusing optical system that is arranged between the first focusing optical system and the deflector, and forms a long line image in a deflection direction near a reflection surface of the deflector; a third focusing optical system that scans the medium at a constant speed using the deflected light beam from the deflector as a light spot. The third focusing optical system includes a plurality of optical elements; and a pressing member that presses at least one of optical elements at a plurality of places in a direction orthogonal to the deflection direction to hold the optical element, and controls a position of the optical element. The pressing members have different contact areas with respect to the optical element depending on a pressing place.

An optical scanning device according to still another aspect of the present invention scans a surface to be scanned with a light beam from a light source by a rotary polygon mirror and forms an image on the surface with a focusing optical system. The optical scanning device includes a scanning-line-variation correcting unit that corrects a variation of a scanning line on the surface. The scanning-line-variation correcting unit generates a variation of the scanning line of a curve component of equal to or higher than a third-order function having peaks at a plurality of portions along a main scanning direction, and offsets the curve component by generating a variation of the scanning line of an opposite shape.

An optical scanning device according to still another aspect of the present invention scans a surface to be scanned with a light beam from a light source by a rotary polygon mirror and forms an image on the surface with a focusing optical system. The optical scanning device includes a scanning-line-variation correcting unit that corrects a variation of a scanning line on the surface. The scanning-line-variation correcting unit includes a first scanning-line-variation correcting unit that adjusts a first curve component of a quadratic function having a peak at one portion in a main scanning direction; and a second scanning-line-variation correcting unit that adjusts a second curve component of equal to or higher than a third-order function having peaks at a plurality of portions along a main scanning direction.

An optical scanning device according to still another aspect of the present invention scans a surface to be scanned with a light beam from a light source by a rotary polygon mirror and forms an image on the surface with a focusing optical system. The optical scanning device includes a focal-line varying unit that varies a focal line of an optical element having a convergent action at least in a sub-scanning direction from among optical elements constituting the focusing optical system, so that the focal line has peaks at a plurality of portions along a main scanning direction. A variation of the focal line is corrected by the focal-line varying unit.

An image forming apparatus according to still another aspect of the present invention is for obtaining a color image by forming electrostatic latent images on a plurality of image carriers, developing the electrostatic latent images with toners of different colors for each of the image carriers to form toner images, and sequentially transferring the toner images onto a sheet-type recording medium in a superposing manner. The image forming apparatus includes an optical scanning device that scans a surface to be scanned with a light beam from a light source by a rotary polygon mirror and forms an image on the surface with a focusing optical system, the optical scanning device including a scanning-line-variation correcting unit that corrects a variation of a scanning line on the surface. The scanning-line-variation correcting unit generates a variation of the scanning line of a curve component of equal to or higher than a third-order function having peaks at a plurality of portions along a main scanning direction, and offsets the curve component by generating a variation of the scanning line of an opposite shape.

An image forming apparatus according to still another aspect of the present invention is for obtaining a color image by forming electrostatic latent images on a plurality of image carriers, developing the electrostatic latent images with toners of different colors for each of the image carriers to form toner images, and sequentially transferring the toner images onto a sheet-type recording medium in a superposing manner. The image forming apparatus includes an optical scanning device that scans a surface to be scanned with a light beam from a light source by a rotary polygon mirror and forms an image on the surface with a focusing optical system. The optical scanning device includes a scanning-line-variation correcting unit that corrects a variation of a scanning line on the surface. The scanning-line-variation correcting unit includes a first scanning-line-variation correcting unit that adjusts a first curve component of a quadratic function having a peak at one portion in a main scanning direction; and a second scanning-line-variation correcting unit that adjusts a second curve component of equal to or higher than a third-order function having peaks at a plurality of portions along a main scanning direction.

An image forming apparatus according to still another aspect of the present invention is for obtaining a color image by forming electrostatic latent images on a plurality of image carriers, developing the electrostatic latent images with toners of different colors for each of the image carriers to form toner images, and sequentially transferring the toner images onto a sheet-type recording medium in a superposing manner. The image forming apparatus includes an optical scanning device that scans a surface to be scanned with a light beam from a light source by a rotary polygon mirror and forms an image on the surface with a focusing optical system. The optical scanning device includes a focal-line varying unit that varies a focal line of an optical element having a convergent action at least in a sub-scanning direction from among optical elements constituting the focusing optical system, so that the focal line has peaks at a plurality of portions along a main scanning direction. A variation of the focal line is corrected by the focal-line varying unit.

An image forming apparatus according to still another aspect of the present invention is for obtaining a color image by forming electrostatic latent images on a plurality of image carriers, developing the electrostatic latent images with toners of different colors for each of the image carriers to form toner images, sequentially transferring the toner images onto an intermediate transfer member in a superimposing manner, and collectively transferring the superposed toner images onto a sheet-like recording medium. The image forming apparatus includes an optical scanning device that scans a surface to be scanned with a light beam from a light source by a rotary polygon mirror and forms an image on the surface with a focusing optical system. The optical scanning device includes a scanning-line-variation correcting unit that corrects a variation of a scanning line on the surface. The scanning-line-variation correcting unit generates a variation of the scanning line of a curve component of equal to or higher than a third-order function having peaks at a plurality of portions along a main scanning direction, and offsets the curve component by generating a variation of the scanning line of an opposite shape.

An image forming apparatus according to still another aspect of the present invention is for obtaining a color image by forming electrostatic latent images on a plurality of image carriers, developing the electrostatic latent images with toners of different colors for each of the image carriers to form toner images, sequentially transferring the toner images onto an intermediate transfer member in a superimposing manner, and collectively transferring the superposed toner images onto a sheet-like recording medium. The image forming apparatus includes an optical scanning device that scans a surface to be scanned with a light beam from a light source by a rotary polygon mirror and forms an image on the surface with a focusing optical system. The optical scanning device includes a scanning-line-variation correcting unit that corrects a variation of a scanning line on the surface. The scanning-line-variation correcting unit includes a first scanning-line-variation correcting unit that adjusts a first curve component of a quadratic function having a peak at one portion in a main scanning direction; and a second scanning-line-variation correcting unit that adjusts a second curve component of equal to or higher than a third-order function having peaks at a plurality of portions along a main scanning direction.

An image forming apparatus according to still another aspect of the present invention is for obtaining a color image by forming electrostatic latent images on a plurality of image carriers, developing the electrostatic latent images with toners of different colors for each of the image carriers to form toner images, sequentially transferring the toner images onto an intermediate transfer member in a superimposing manner, and collectively transferring the superposed toner images onto a sheet-like recording medium. The image forming apparatus includes an optical scanning device that scans a surface to be scanned with a light beam from a light source by a rotary polygon mirror and forms an image on the surface with a focusing optical system. The optical scanning device includes a focal-line varying unit that varies a focal line of an optical element having a convergent action at least in a sub-scanning direction from among optical elements constituting the focusing optical system, so that the focal line has peaks at a plurality of portions along a main scanning direction. A variation of the focal line is corrected by the focal-line varying unit.

A method according to still another aspect of the present invention is for correcting a variation of a scanning line formed on a surface to be scanned by a focusing optical system by mechanically applying a force to an optical element constituting the focusing optical system. The method includes dividing the variation of the scanning line into a curve component of a quadratic function having a peak in one portion in a main scanning direction and a curve component of equal to or higher than a third-order function having peaks at a plurality of portions along a main scanning direction; and correcting the curve component of the quadratic function and the curve component of the equal to or higher than a third-order function individually.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 18A to 18F are front view of various modifications of the long optical element according to the first embodiment and various examples of correction of shapes for the long optical element;

FIG. 34A is a side view of a geometrical moment of inertia, FIG. 34B is a front view of a state in which a load is applied to the long optical element, and FIG. 34C is a graph of a shape of the long optical element at the time when there is no action of an external force, a correction amount due to an action of an external force, and a shape of the long optical element at the time when there is an action of an external force;

FIG. 62 is a diagram of electrical adjustment;

DETAILED DESCRIPTION OF THE PREFERRED EMBODIMENTS

Exemplary embodiments of the present invention are explained below in detail with reference to the accompanying drawings.

Figure 1:
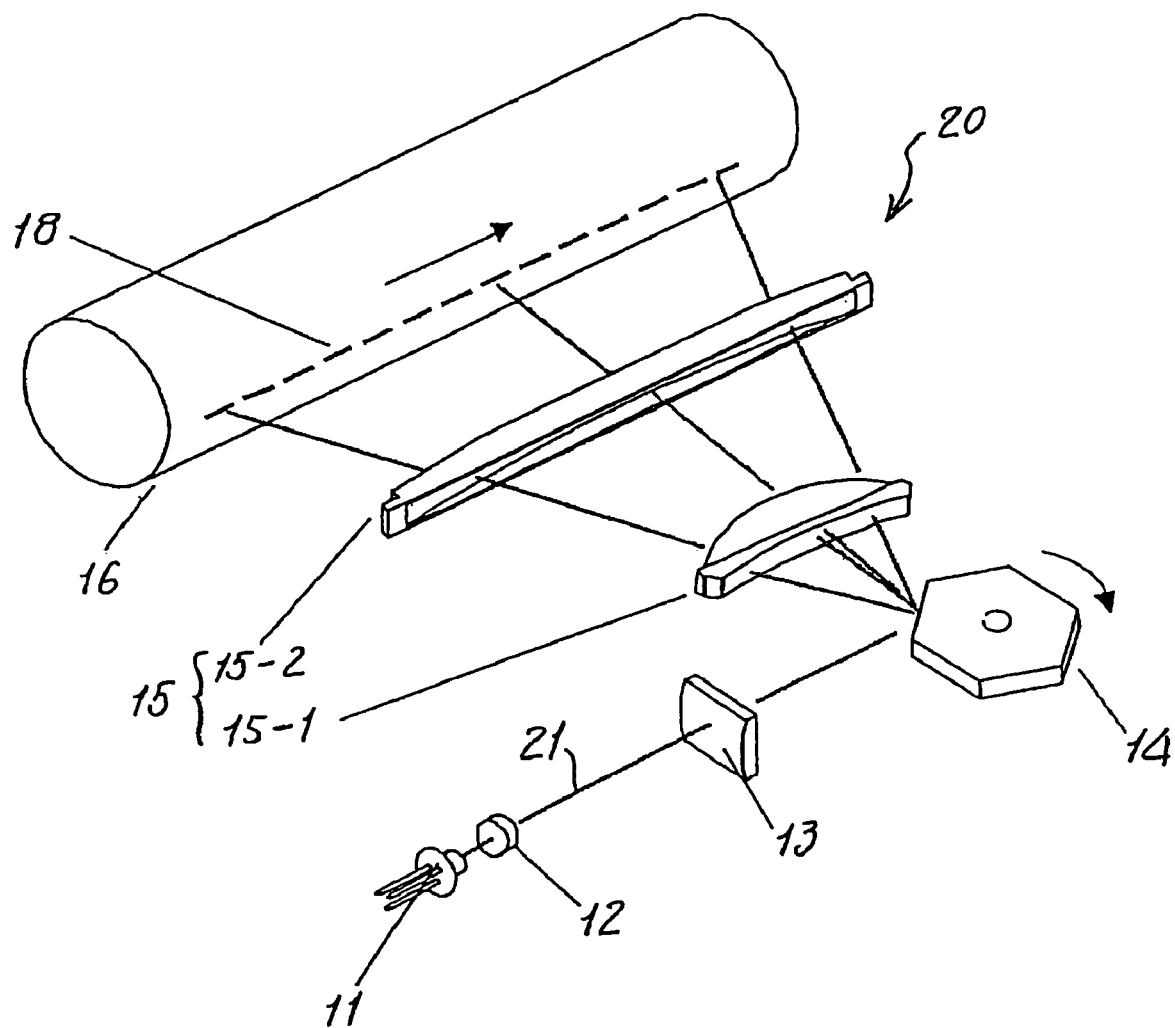
FIG. 1 is a perspective view of an example of an optical scanning device according to a first embodiment of the present invention.

FIG. 1 is a diagram of an example of an "optical scanning device" used in an image forming apparatus according to a first embodiment of the present invention. The optical scanning device is an example of an optical scanning device that scans a surface to be scanned using one laser beam emitted from one light source. It is also possible to apply the optical scanning device to a "multi-beam optical scanning device" that simultaneously uses a plurality of laser beams emitted from a plurality of light sources (e.g., a semiconductor laser array) to perform scanning. In FIG. 1, a laser beam 21 emitted from a semiconductor laser 11 serving as a light source is changed to a substantially parallel laser beam by a coupling lens 12 and coupled to a following optical system. The laser beam is converged only in a sub-scanning direction according to an action of a cylindrical lens 13 and focused as a line image long in a main scanning direction on a deflective reflection surface of a polygon mirror 14 serving as a light deflector. The polygon mirror 14 is driven to perform constant speed rotation at high speed by a polygon motor and the laser beam is deflected in a constant angular speed manner. The laser beam deflected is focus as a beam spot on a surface of a photosensitive member 16, which serves as a surface to be scanned, by a scanning optical system 15 including a long lens 15-1 serving as a first scanning lens and a long lens 15-2 serving as a second scanning lens. The laser beam is used for scanning the surface to be scanned in a constant speed manner according to an fθ function of the scanning optical system 15. Reference numeral 18 denotes a scanning line formed by a laser beam on the photosensitive member 16. Such a device for focusing a light beam emitted from a light source unit as a beam spot on the photosensitive member 16 and using the light beam for scanning is referred to as an "optical scanning device". The optical scanning device is denoted by reference numeral 20 in the following description.

Figure 2:
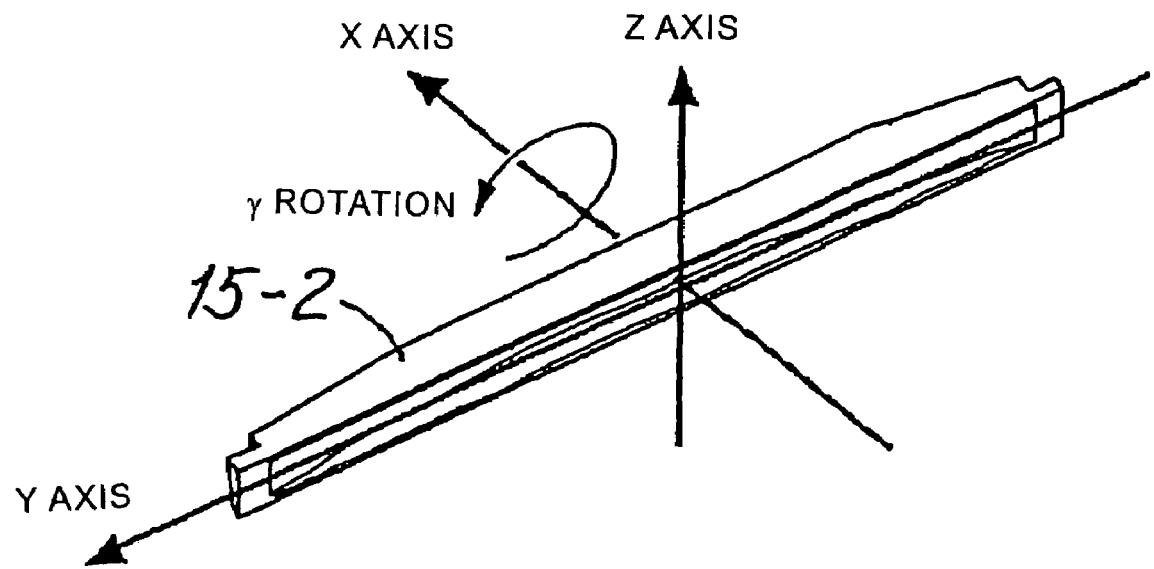
FIG. 2 is a perspective view of a long optical element in the optical scanning device.

FIG. 2 is a diagram for explaining a constitution of the long lens 15-2 in the optical scanning device according to a coordinate system (direction) set. The long lens 15-2 is a long lens that is long in the main scanning direction. In FIG. 2, a longitudinal direction of the long lens 15-2 is a scanning direction of a laser beam deflected by the polygon mirror 14 serving as the light deflector. This direction is set as the "main scanning direction", that is, a Y axis direction. A latitudinal direction of the long lens 15-2, which is a direction equivalent to a moving direction of the surface of the photosensitive drum serving as the photosensitive member 16, is set as the "sub scanning direction", that is, a Z axis direction. A direction orthogonal to the Y axis direction and the Z axis direction (an X axis direction) is referred to as an "optical axis direction". The optical axis direction usually coincides with a center axis of a lens. A curved line enveloping vertexes of respective sub-scanning sections in the main scanning direction of the long lens 15-2 serving as the long lens is referred to as a "bus" of the long lens. The bus is considered as a parameter representing a "deflection degree" of the long lens. In other words, "bending of the long lens" indicates "bending of the bus of the long lens".

In recent years, a plastic material is frequently used for an optical element forming the scanning optical system 15. Although the optical element made of the plastic material is excellent in mass productivity, a shape after processing often deviates from an ideal one because of, for example, a distribution of temperature in a die at the time of molding and non-uniformity of cooling after the plastic material is taken out from the die. In particular, since the long lens 15-2 is arranged on the photosensitive member 16 side, the long lens 15-2 tends to have a shape (a long shape) relatively long in the main scanning direction. Thus, an amount of a shape error after molding tends to increase. Moreover, the long lens 15-2 often has focusing performance in the sub-scanning direction and an optical face tangle error correction function for a polygon mirror and has large power in the sub-scanning direction. Thus, the shape error, that is, deformation of the bus significantly affects a shape of a scanning line on the photosensitive member 16, so-called "scanning line bending" and "scanning line tilt".

It is known that the scanning line bending and the scanning line tilt are caused by reasons other than the deformation of the bus of the long lens 15-2. Examples of the reasons include:

deformation and attachment errors of a return mirror, a first scanning lens, a dust-proof glass, and the like provided in an optical scanning device (in particular, a scanning optical system of the optical scanning device);

rotation axis toppling of a polygon mirror (a rotary polygon mirror) serving as a light deflector; and an emission direction error of an exit beam from a light source device.

The "scanning line bending" due to shape errors and assembly errors of components other than the long lens sometimes reaches about several hundred μm. It is possible to correct the scanning line bending according to bending adjustment for the long lens.

The "long optical element" is not limited to a "long lens made of plastic". For example, optical components having a relatively long and slender shape such as a return mirror provided for bending an optical path between the polygon mirror serving as the light deflector and the surface to be scanned and a long mirror having a focusing function may be the long optical element.

Figure 4:
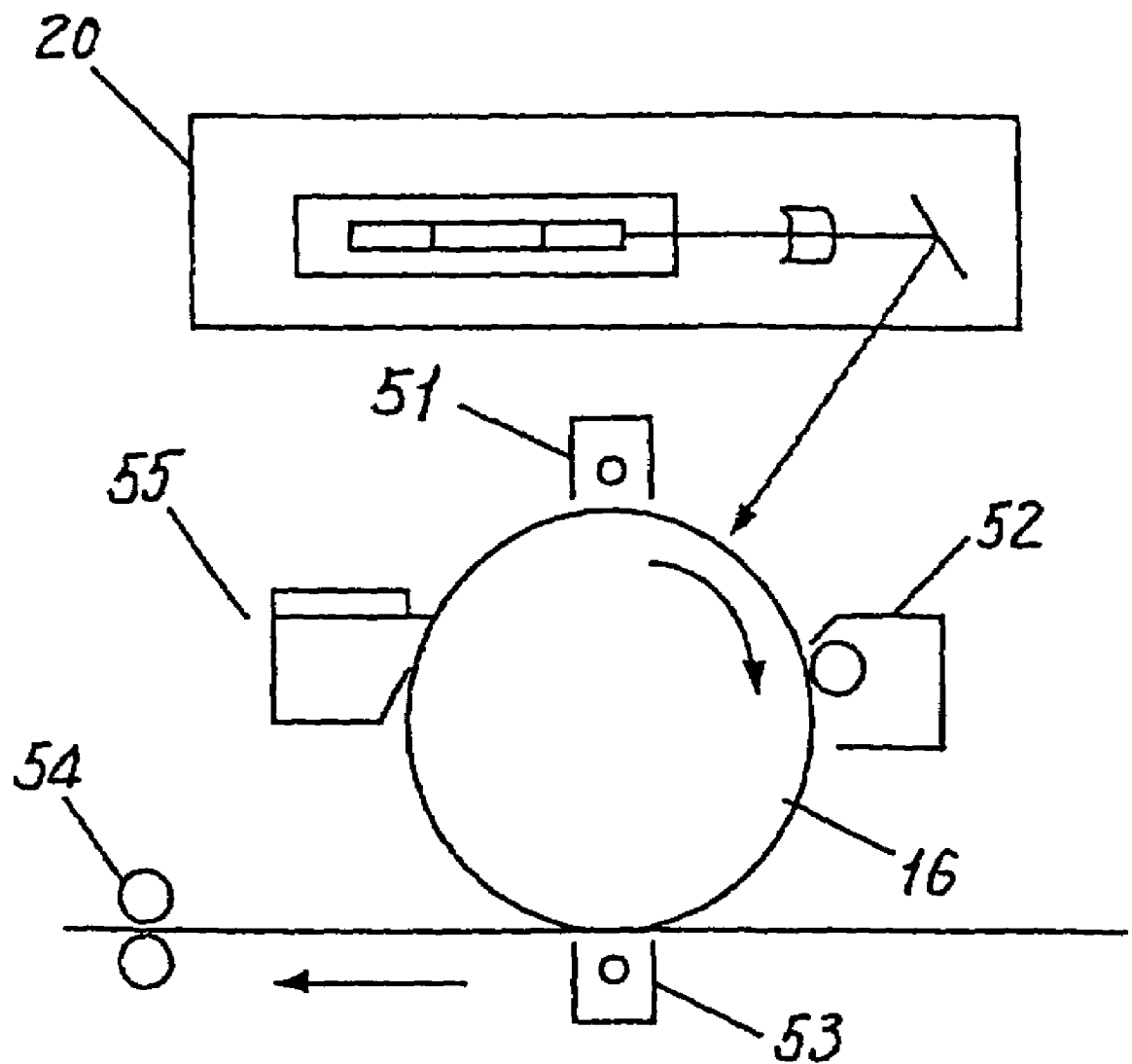
FIG. 4 is a front view of an example of an image forming apparatus according to the first embodiment.

FIG. 4 is a central sectional view of an example of the image forming apparatus according to the first embodiment. In FIG. 4, the image forming apparatus has the photosensitive member 16 and an optical scanning device 20 and also has a charging device 51, a developing device 52, a transfer device 53, a fixing device 54, and a cleaning unit 55 arranged around the photosensitive member 16. The optical scanning device 20 optically scans the surface of the photosensitive member 16 serving as an image carrier to thereby perform optical writing. The optical scanning device 20 executes an electrophotographic process to thereby form an electrostatic image on the photosensitive member 16. The optical scanning device 20 carries out an exposure process in the electrophotographic process. A principle for image formation by the image forming apparatus is well known as described below. The surface of the photosensitive member 16 is uniformly charged by the charging device 51. The optical scanning device 20 optically scans the surface of the photosensitive member 16 uniformly charged to form an image. A potential of the surface of the photosensitive member 16 falls according to an exposure distribution by optical scanning. An electrostatic latent image is formed on the photosensitive member 16. The electrostatic latent image is visualized when a toner supplied by the developing device 52 is deposited on the photosensitive member 16. The toner deposited on the photosensitive member 16 is transferred onto a sheet by the transfer device 53 and, then, melted to be stuck and fixed to the sheet by the fixing device 54. The cleaning unit 55 removes a residual toner on the photosensitive member 16.

Figure 3:
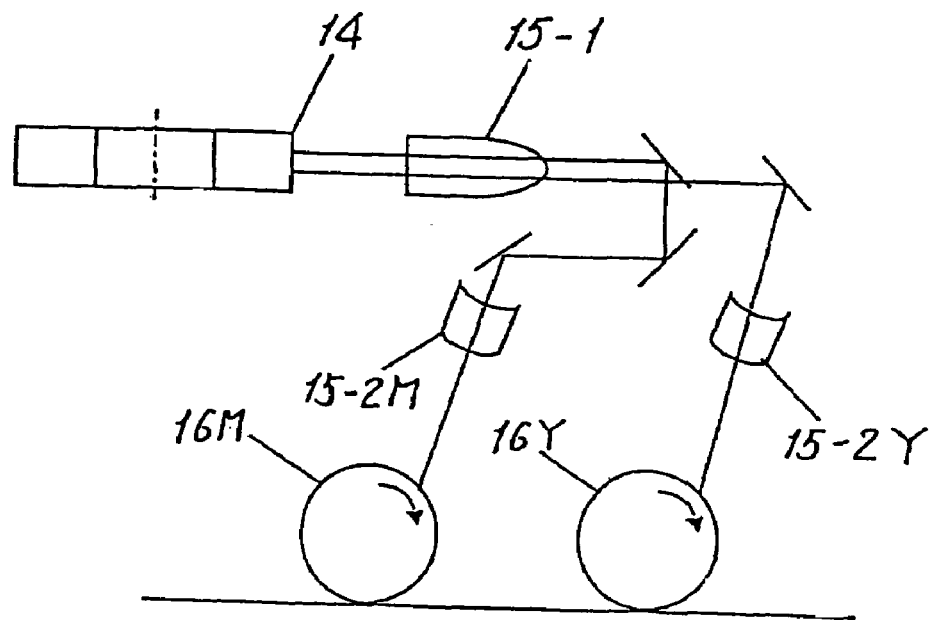
FIG. 3 is a front view of another example of the optical scanning device according to the first embodiment.

As described above, the tandem system is often adopted for the color image forming apparatus. Usually, a four-drum tandem system is used as the tandem system. Before explaining a four-drum tandem image forming apparatus, an optical scanning device for a simpler two-drum tandem image forming apparatus is explained with reference to FIG. 3. In FIG. 3, two laser beams emitted from a light source (not shown) are deflected and reflected by the polygon mirror 14 serving as the light deflector to pass through the common long lens 15-1. Optical paths of the two laser beams, which have passed through the long lens 15-1, are bent by different mirrors. After passing through different second scanning lenses 15-2M and 15-2Y, the laser beams reach photosensitive drums 16M and 16Y, respectively. In general, the long lens 15-1 often has large power in the main scanning direction to secure focusing performance in the main scanning direction and constant speed scanning performance on surfaces of the photosensitive drums 16M and 16Y serving as surfaces to be scanned. When the long lens 15-1 is made of plastic, if a temperature distribution in the main scanning direction occurs in the lens, a constant speed scanning property on the surfaces to be scanned is deteriorated to cause dot position deviation in the main scanning direction.

Unlike the constitution of the example shown in FIG. 3, when different temperature distributions occur in the constitution in which two laser beams pass through different first scanning lenses, a deviation occurs in dot position deviation amounts in the main scanning direction on respective photosensitive drums. Thus, when it is attempted to transfer toners on the respective photosensitive drums to be superimposed one on top of another, the deviation eventually causes color misalignment of an output image. However, when the two laser beams pass through the common long lens 15-1 as in the example shown in FIG. 3, it is possible to control a deviation of a constant speed scanning property even if a temperature distribution occurs. Thus, there is an advantage that it is possible to control occurrence of the dot position deviation in the main scanning direction among the photosensitive members.

Figure 5:
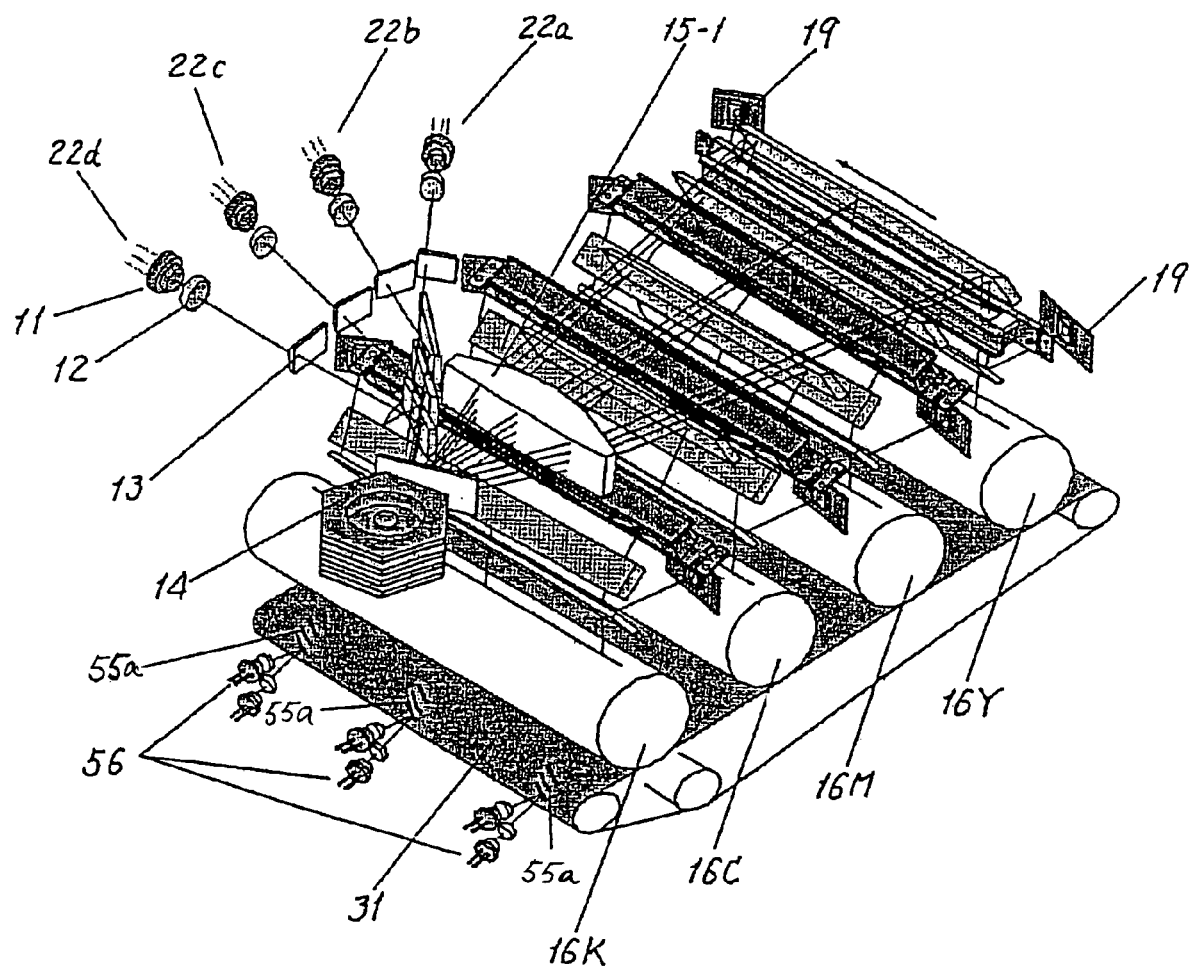
FIG. 5 is a perspective view of another example of the image forming apparatus according to the first embodiment.

FIG. 5 is a diagram of an example of the four-drum tandem image forming apparatus. A basic constitution of an optical scanning device for the four-drum tandem image forming apparatus is the same as that of the optical scanning device for the two-drum tandem image forming apparatus. Reference numerals 22a, 22b, 22c, and 22d denote light source units. Each of the light source units includes the semiconductor laser 11 and the coupling lens 12 that changes a laser beam emitted from the semiconductor laser to a substantially parallel light beam and couples the laser beam to a following optical system. The laser beam changed to the substantially parallel light beam is transmitted through the cylindrical lens 13 to be converged only in the sub-scanning direction to focus a line image long in the main scanning direction in the vicinity of a deflective reflection surface of the polygon mirror 14 serving as the light deflector. The light source units, coupling lenses, and cylindrical lenses constitute four sets of different optical scanning devices to emit four laser beams deflected to perform scanning.

In the example shown in FIG. 5, four laser beams deflected and reflected by the polygon mirror 14 pass through the common long lens 15-1. The four laser beams are beams emitted from different optical scanning devices, respectively. The optical scanning devices have the same constitution as the optical scanning device shown in FIGS. 1 and 2. The four laser beams exiting the long lens 15-1 are reflected by mirrors and pass through second scanning lenses through different optical paths, respectively. Then, the laser beams reach respective photosensitive drums 16K, 16C, 16M, and 16Y and are used for optically scanning surfaces of the photosensitive drums to expose the surfaces and form electrostatic latent images thereon.

Synchronization detection sensors 19 shown in FIG. 5 are provided to obtain a signal for timing for starting drawing images on the respective photosensitive drums by the respective laser beams.

Toner images formed on the respective photosensitive drums are transferred onto a transfer belt 31 to be superimposed one on top of another to form a color image. The color image on the transfer belt 31 is transferred onto a transfer sheet and fixed on the transfer sheet by a fixing device. In superimposing the toner images on the respective photosensitive drums one on top of another on the transfer belt 31, if there is a deviation in shapes of scanning lines on the respective photosensitive drums, a color superimposing state in the sub-scanning direction is deteriorated to cause color misalignment. As a result, an output image quality falls. A main object of the present embodiment is to reduce such an error in scanning line shapes. Note that, in the example of the four-drum tandem image forming apparatus shown in FIG. 5, "toner images for color misalignment detection" 55 for detecting an amount of color misalignment are formed three places on the transfer belt 31. It is possible to detect the toner images for color misalignment detection 55a with a "sensor for color misalignment detection" 56.

Figure 17A:
FIGS. 17A to 17F are front views of various modifications of the long optical element according to the first embodiment.
Figure 17B:
Figure 17C:
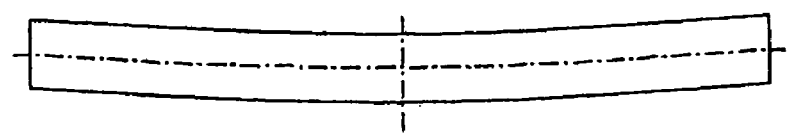
Figure 17D:
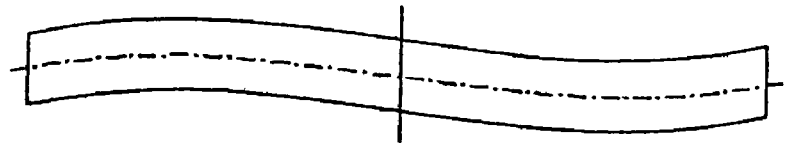
Figure 17E:
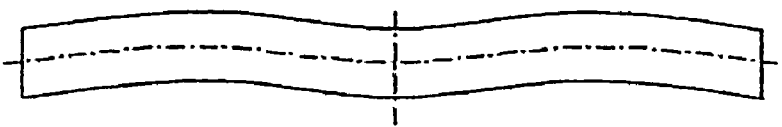
Figure 17F:
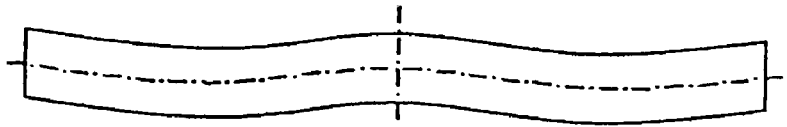

As described above, among the optical components constituting the scanning optical system, deflective deformation, that is, bending of the bus of the "long lens" arranged on the surface to be scanned side and having large power in the sub-scanning direction significantly affects a scanning line shape on the surface to be scanned. FIGS. 17A to 17F are diagrams of various examples of a shape of the long lens after molding, that is, various examples of deflective deformation. Upper surfaces at both ends in the longitudinal direction of the long lens are fixed and the long lens is pressed to fixed sections from a lower surface side thereof by a spring to be elastically held. FIG. 17A is a diagram of a design median, that is, an ideal shape. Usually, the long lens is formed in a shape having one peak. For example, as shown in FIGS. 17B and 17C, the long lens is often formed in a shape projected upward or a shape projected downward. Depending on a condition by a plastic material, a cooling condition after taking out from a die, a magnification of an optical system, or the like, in the case of a long lens having a total length of about 200 mm, from experiences, maximum bus bending of about several tens μm to one hundred several tens μm occurs. Moreover, in some cases, the long lens is formed in an N shape (see FIG. 17D) having two peaks or a shape having three peaks, for example, an M shape shown in FIG. 17E or a W shape shown in FIG. 17F.

As shown in FIG. 18A, upper parts at both ends of the long lens are fixed at supporting portions and the long lens is elastically held from lower parts thereof by elastic members such as springs opposed to the supporting portions. When the bus of the long lens is formed in a shape (a shape shown in FIG. 18B or 18C) having one peak, it is possible to correct a shape of the bus of the long lens to be close to a straight ideal shape by pressing a part near the center of the long lens with one or a plurality of adjustment members consisting of, for example, adjusting screws. Note that elastic members 65(b) to 65(d) such as springs are provided in positions opposed to adjusting screws 62(b) to 62(d) in the lower part of the long lens.

When "bending rigidity: EI" (a product of a Young's modulus E and a geometrical moment of inertia I) of the long lens is constant in the longitudinal direction of the long lens, deflection v at the time when a load W is applied to the center of a beam supporting both the end having a length L is represented by Equation 1 below.

$$v=(WL^3/48EI)\{(3x/L)-(4x^3/L^3)\}; 0 \leq x \leq L/2 \quad (1)$$

Note that x in Equation 1 indicates a distance from one end. When an adjusting screw is provided only in the center in the longitudinal direction of the long lens, correction according to the equation is possible. However, it is impossible to remove, for example, complicated shape errors shown in FIGS. 18C to 18F. Therefore, it is necessary to increase the number of adjusting screws as the number of peaks of bus bending in the long lens shape increases. However, in general, adjusting screws of the same number as the estimated number of peaks has to be provided.

As described above, any one of scanning line bending and scanning line tilt or both may occur because of not only a bus shape of the long lens but also influences of any one of shape error and an assembly error or both and the like of other components. It is also possible to correct any one of the scanning line bending and the scanning line tilt or both by adjusting deformation of the long lens. Therefore, even when the long lens, the bus of which has one peak, is used, it is desirable to provide a plurality of adjusting screws. However, it is usually sufficient to set the adjusting screws in three to four places taking into account, for example, the fact that, as the number of adjusting screws increases, it is likely that an adjustment process becomes complicated and adjustment time increases and, in the case of a usual optical system, the number of peaks of scanning lines on a surface to be scanned is about three at the maximum.

Figure 6:
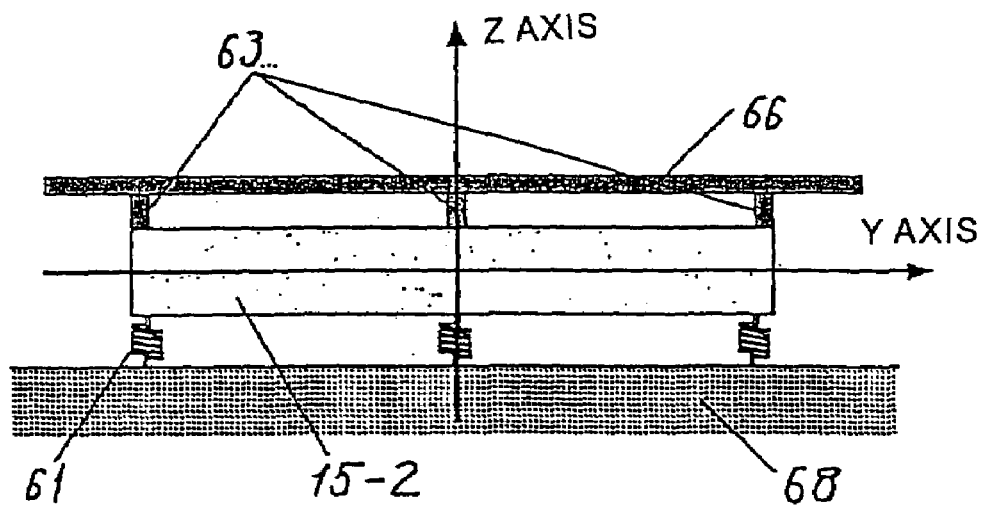
FIG. 6 is a front view of a first example of a holding mechanism for the long optical element according to the first embodiment.

FIG. 6 is a diagram of a first example of a holding mechanism for the long optical element. In FIG. 6, the long lens 15-2 is held by three compression springs (elastic members) 61 set on a housing bottom surface 68 serving as a reference surface and three support members 63 that form pairs with the compression springs 61 and support the long lens 15-2 from a lower side against pressing forces from the compression springs 61. There are three pairs of the compression spring 61 serving as an elastic member and the support member 63. Two pairs among the three pairs are arranged at both ends in the longitudinal direction of the long lens 15-2 and one pair is arranged in the center in the longitudinal direction. According to the present embodiment, the support members 63 are formed in a part of a holder member 66, which is machined by pressing of a steel plate or the like, by bending or cutting and raising the part of the holder member 66. As materials for the support members 63, a machined product or a sintered product of metal such as aluminum, a resin mold product, and the like may be adopted.

Figure 15A:
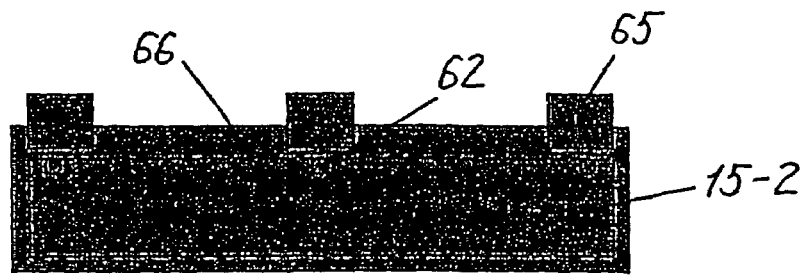
FIG. 15A is a plan view of still another example of the holding mechanism for the long optical element according to the first embodiment.
Figure 15B:
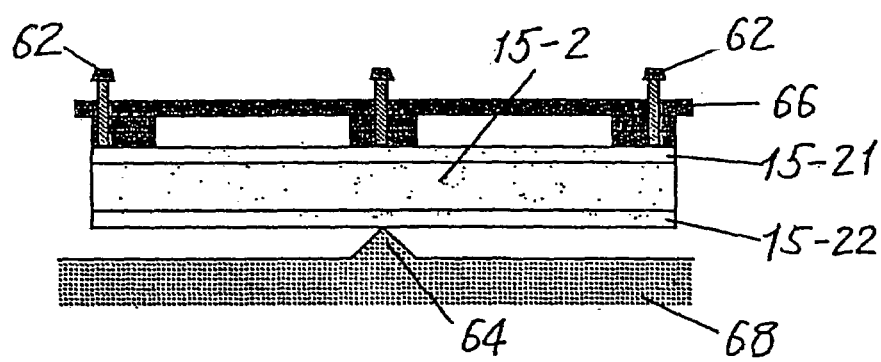
FIG. 15B is a front view of the example of the holding mechanism for the long optical element according to the first embodiment.
Figure 15C:
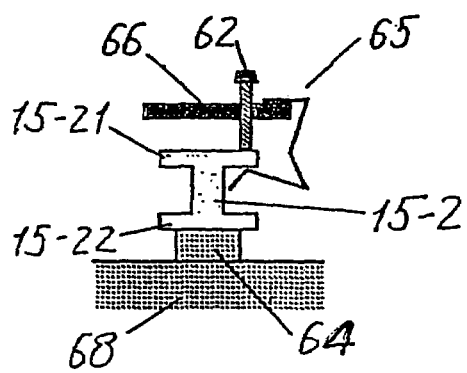
FIG. 15C is a side view of the example of the holding mechanism for the long optical element according to the first embodiment.
Figure 15D:
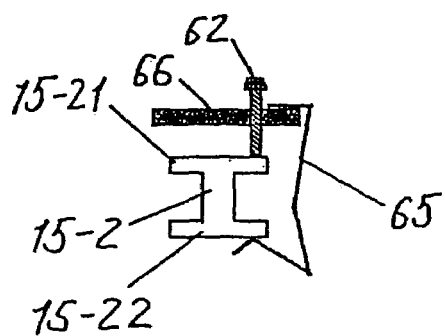
FIG. 15D is a side view of a modification of the holding mechanism for the long optical element according to the first embodiment.

As the elastic member for applying a pressing force to the long lens 15-2, other than the compression spring 61, a leaf spring 65 shown in FIGS. 15A to 15D may be adopted. In FIGS. 15A to 15D, the long lens 15-2 has ribs 15-21 and 15-22 in upper and lower width directions along the longitudinal direction. A cross section of the long lens 15-2 parallel to an optical axis direction is formed in a sideways "H" shape. Bent edges at both ends of the leaf spring 65 shown in FIG. 15C are hooked astride an edge of the holder member 66 and the projected edge 15-21 on an upper side of the long lens 15-2. The leaf spring 65 urges the long lens 15-2 to be attracted to the holder member 66 side. An adjusting screw 62 is screwed into the holder member 66 instead of the support member 63. A tip of the adjusting screw 62 comes into abutment against the upper surface of the long lens 15-2 to regulate movement of the long lens 15-2 by the urging force. The leaf spring 65 shown in FIG. 15D is the same as that shown in FIG. 15C except that bent edges at both ends thereof are hooked astride the edge of the holder member 66 and the projected edge 15-21 on the lower side of the long lens 15-2. The leaf spring 65 applies a pressing force to the long lens 15-2 in the same manner as that shown in FIG. 15C. By adopting the leaf spring 65 in this way, compared with the constitution using the compression spring 61 shown in FIG. 6, since a useless space is not formed, it is possible to realize a reduction in size of the device.

Figure 7:
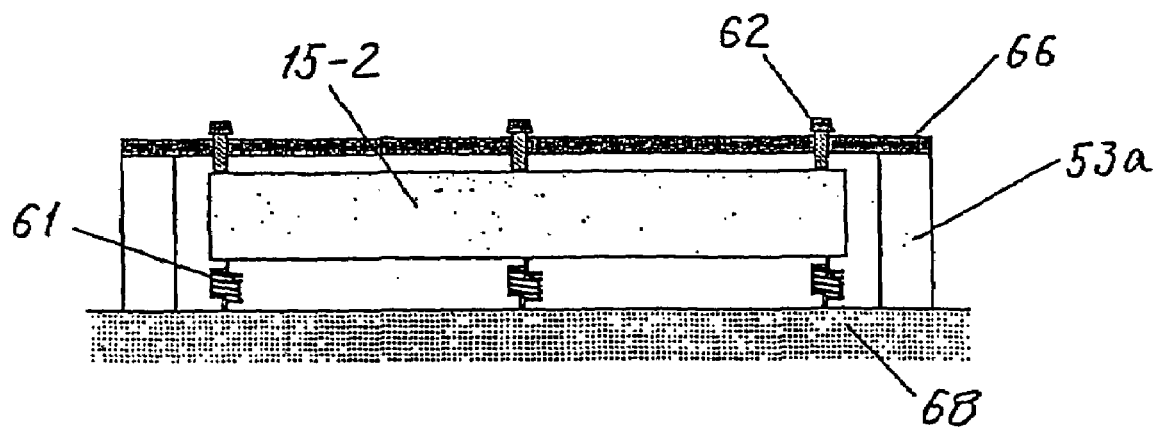
FIG. 7 is a front view of a second example of the holding mechanism for the long optical element according to the first embodiment.

FIG. 7 is a diagram of a second example of the holding mechanism for the long optical element. In FIG. 7, both ends in the longitudinal direction of the holder member 66 are fixed to two spacing members 53a set on the housing bottom surface 68. A plurality of adjusting screws 62 are screwed in the holder member 66. The compression springs 61 serving as elastic members are arranged to be opposed to the respective adjusting screws 62 on the housing bottom surface 68. The long lens 15-2 is arranged between the respective adjusting screws 62 and the respective compression springs 61. The long lens 15-2 is pressed against lower ends of the adjusting screws 62 by a pressing force of the compression spring 61. The adjusting screws 62 function as support members for supporting the long lens 15-2. It is possible to correct a "deflection degree" of a bus shape of the long lens 15-2 by adjusting a projection amount of the respective adjusting screws 62. Three pairs of the adjusting screw 62 and the compression spring 61 are arranged at both the ends and the center in the longitudinal direction of the long lens 15-2.

Figure 20:
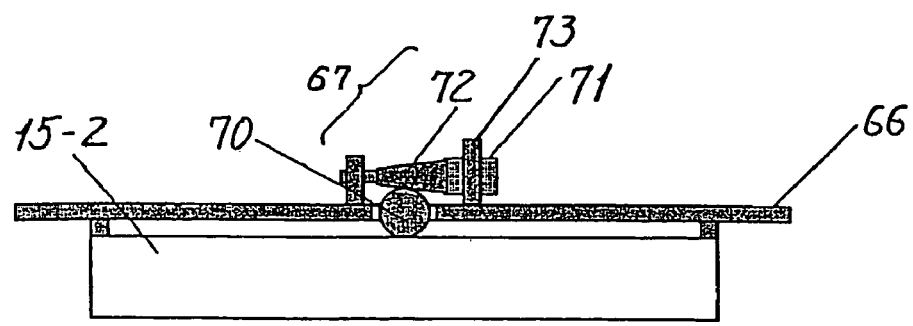
FIG. 20 is a front view of an eleventh example of the holding mechanism for the long optical element according to the first embodiment.

A constitution shown in FIG. 20 may be adopted as another constitution of an adjusting screw constituting a support member. In FIG. 20, the adjusting screw 62 includes a roller 70 and a tapered adjusting screw 71. The roller 70 is formed in a columnar shape and inserted in a window hole formed in the holder member 66 to be placed on the upper surface of the long lens 15-2. The tapered adjusting screw 71 is arranged such that a center axis thereof faces the longitudinal direction of the long lens 15-2 and crosses an axis of the roller 70. A thread portion of the tapered adjusting screw 71 is screwed in a support piece 73 erected from the holder member 66. The tapered adjusting screw 71 has a taper section 72. A tip portion of the tapered adjusting screw 71 is held by a bearing piece erected from the holder member 66. The taper section 72 comes into abutment against the roller 70 to regulate movement of the long lens 15-2 upward by an urging force of the compression spring 61 and functions as a support member for the long lens 15-2. Three pairs of the adjusting screw 62 and the compression spring 61 serving as an elastic member are arranged at both the ends and the center in the longitudinal direction of the long lens 15-2.

The constitution of the adjusting screw 62 shown in FIG. 20 corresponds to the description "including at least a screw element" in claims. It is possible to press the long lens 15-2 with the roller 70 by pushing in the roller 70 in a state in which the tapered adjusting screw 71 is in abutment against the columnar or cylindrical roller 70. It is possible to appropriately set "adjustment sensitivity", that is, a pressing amount of the long lens 15-2 by the roller 70 with respect to a rotation angle of the adjusting screw according to an angle of a taper provided in the tapered adjusting screw 71.

In the case of the first example shown in FIG. 6, since the support members 63 raised from the holder member 66 are fixed to the holder member 66, it is impossible to correct the "deflection degree" of the bus shape of the long lens 15-2. In the case in which it is desired to form the long lens 15-2 straight, since the long lens 15-2 is in abutment against and supported by the support members 63, it is necessary to maintain height of the support members 63 in three places highly accurately. However, in general, it is difficult to secure necessary accuracy with pressing. Therefore, as in the second example shown in FIG. 7, it is more desirable to make at least one of the support members movable.

FIGS. 8 to 12 are diagrams of third to seventh examples of the holding mechanism for the long optical element. In all the third to the seventh examples shown in FIGS. 8 to 12, a support member 64 serving as an attachment section formed by projecting the housing bottom surface 68 upward is provided. In the fourth to the sixth examples shown in FIGS. 9 to 11, a pair of compression springs 61 serving as the elastic member opposed to the support member 64 and assembled with the holder unit 51 are provided. In the examples shown in FIGS. 9 and 11, two pairs of the compression spring 61 serving as the elastic member attached to the housing bottom surface 68 and the adjusting screw 62 serving as the support member screwed in the holder member 66 are added. In the fifth example shown in FIG. 10, four pairs of the compression spring 61 and the adjusting screw 62 are added. In the examples shown in FIGS. 8 to 10 and FIG. 12, the support member 64 is provided in the center in the longitudinal direction of the long lens 15-2. In the example shown in FIG. 11, the support member 64 is provided at one end in the longitudinal direction of the long lens 15-2.

In the case of the constitutions shown in FIGS. 8 to 12, it is possible to rotate and adjust the long lens 15-2 in a rotation direction (hereinafter, "γ direction") around a line substantially parallel to the optical axis of the long lens 15-2 with a contact with the support member 64 serving as the attachment member as a rotation axis as indicated by an arrow 69 in the figures. A Y rotation component of the long lens 15-2 makes it possible to correct "scanning line tilt" on the surface to be scanned.

Figure 9:
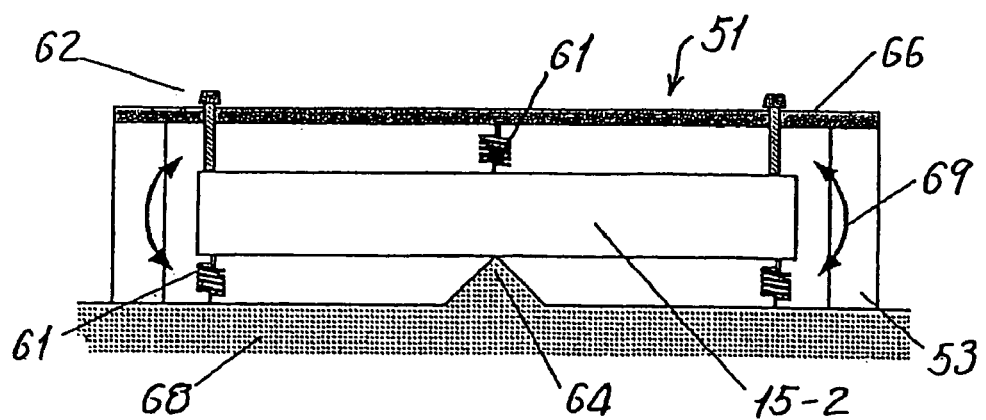
FIG. 9 is a front view of a fourth example of the holding mechanism for the long optical element according to the first embodiment.
Figure 10:
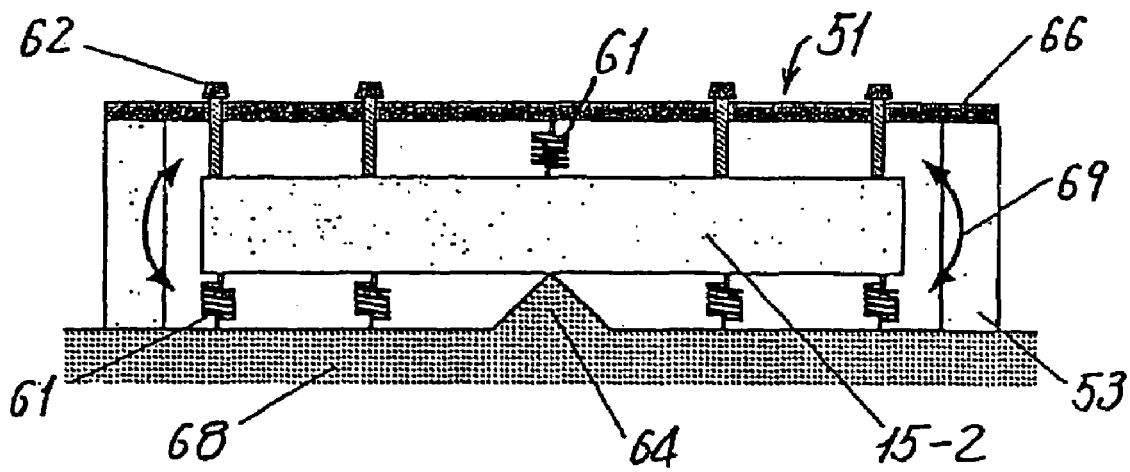
FIG. 10 is a front view of a fifth example of the holding mechanism for the long optical element according to the first embodiment.
Figure 11:
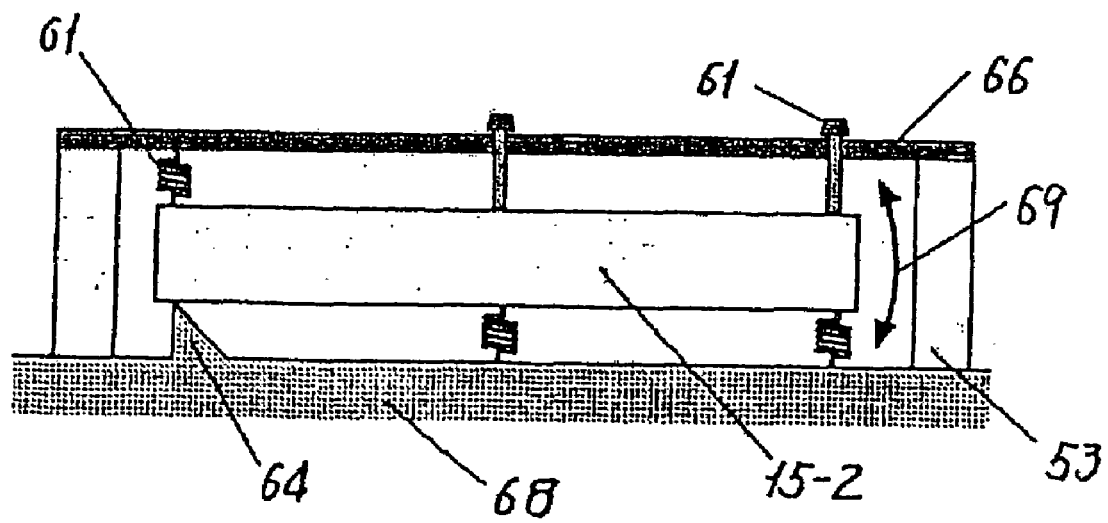
FIG. 11 is a front view of a sixth example of the holding mechanism for the long optical element according to the first embodiment.

Note that, even in the examples shown in FIGS. 9 and 11 in which the two adjusting screws 62 are provided, it is possible to correct a long lens with a relatively simple shape as shown in FIGS. 17B and 17C (correct the long lens to be nearly straight). However, to correct a shape warped more complicatedly shown in FIGS. 17D and 17F, it is necessary to add the four (or more) adjusting screws 62 as in the fifth example shown in FIG. 10.

In the first, the second, and the fourth to the seventh examples (see FIGS. 6, 7, and 9 to 11), the holder member 66 is provided only on the upper side (the sub-scanning direction is set as the vertical direction) of the long lens 15-2. In the case of such a constitution, compared with a constitution including holder members 66 and 67 on the upper side and the lower side shown in FIG. 8 (the third example) explained below, it is possible to realize a reduction in cost and any one of a reduction in size and a reduction in weight of the device or both. These examples are further explained below.

Figure 8:
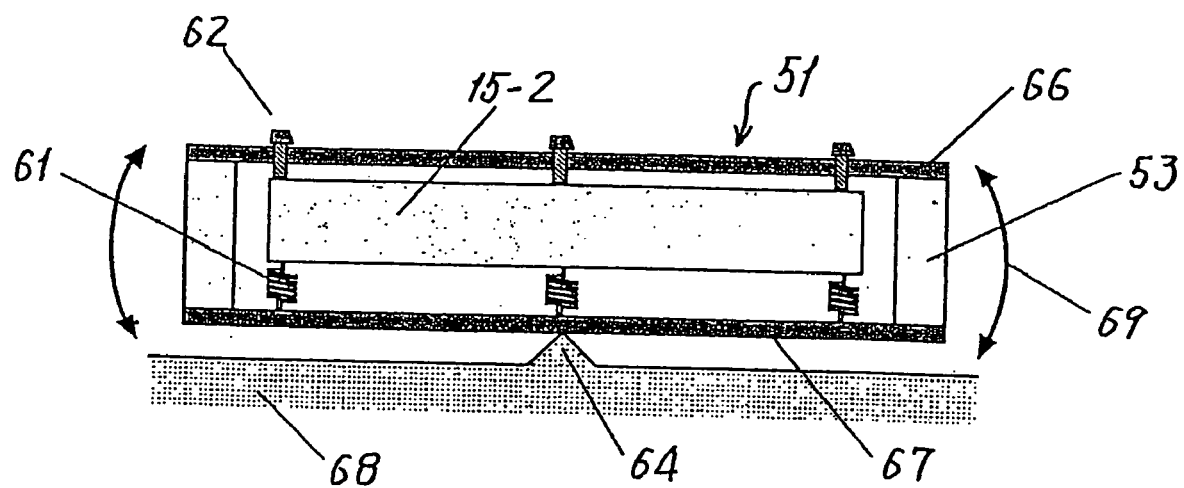
FIG. 8 is a front view of a third example of the holding mechanism for the long optical element according to the first embodiment.

The third example of the holding mechanism for the long optical element is shown in FIG. 8. In FIG. 8, the two holder members 66 and 67 are integrally formed with the two spacing members 53a provided on the outer sides at both the ends in the longitudinal direction of the long lens 15-2 while keeping spaces between the holder members 66 and 67. The three compression springs (elastic members) 61 are attached to the upper surface of the holder member 67 on the lower side. The three adjusting screws 62 are screwed in the holder member 66 on the upper side to be opposed to the compression spring 61. A holding mechanism includes these members. The long lens 15-2 is held by the holding mechanism, more specifically, nipped by the three pairs of the adjusting screw 62 and the compression spring 61. The holding mechanism is rotatably held on the support member 64 provided on the housing bottom surface 68 (in the Y direction indicated by an arrow in the figure). Y rotation adjustment for the long lens 15-2 following Y rotation of the holding mechanism makes it possible to correct "scanning line tilt" on the surface to be scanned.

As described above, even in the constitutions shown in FIGS. 8 and 9 to 11, it is possible to adjust scanning line tilt according to the substantial Y rotation adjustment of the long lens 15-2. However, in adjusting scanning line tilt, bending of the bus of the long lens 15-2 (scanning line bending) tends to occur. In general, it is difficult to independently correct scanning lint bending and scanning line tilt. In that regard, according to the third example shown in FIG. 8, it is possible to correct bus bending of the long lens 15-2 in the holding mechanism. It is possible to adjust scanning line tilt independently from correction of the bus bending by subjecting the holding mechanism for the long lens 15-2 to Y rotation adjustment. This makes it possible to realize facilitation of an adjustment process and a reduction in adjustment time.

FIGS. 9 to 11 are diagrams of the fourth to the sixth examples of the holding mechanism for the long optical element. These examples are already explained above.

Figure 12:
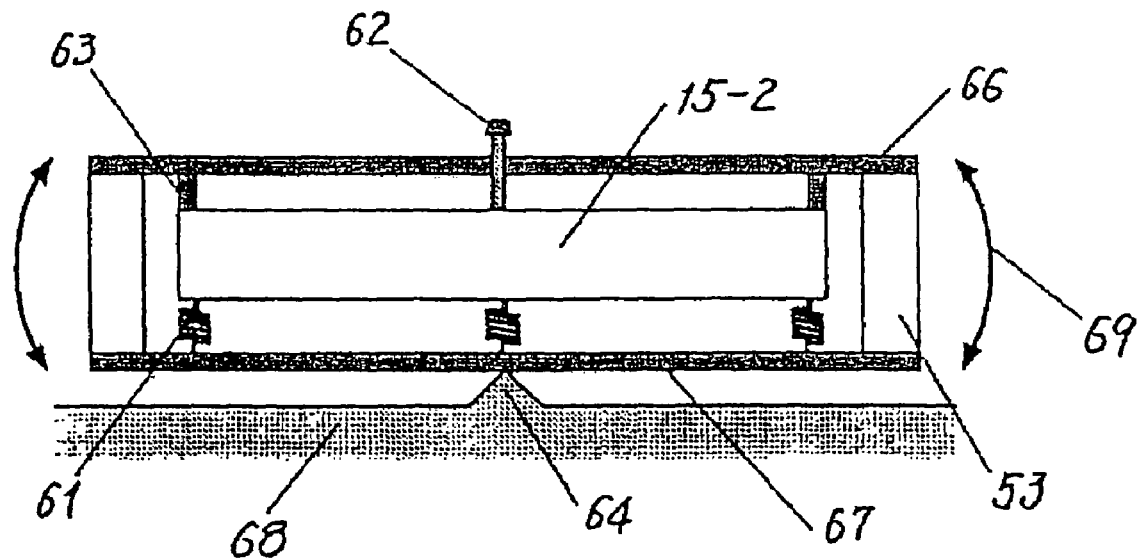
FIG. 12 is a front view of a seventh example of the holding mechanism for the long optical element according to the first embodiment.

FIG. 12 is a diagram of the seventh example of the holding mechanism for the long optical element according to the present embodiment. The example shown in FIG. 12 is similar to the constitution of the third example shown in FIG. 8 but is different from the constitution of the third example in that the two support members 63 at both the ends among the support members provided in the holder member 66 are formed integrally with the holder member 66. It is possible to form the support members 63 by bending or cutting and raising a part of the holder member 66 consisting of a sheet metal component. The holding mechanism for the long lens 15-2 in this example is capable of performing Y rotation around the support member 64 provided in the housing bottom surface 68 while holding the long lens 15-2. This makes it possible to correct scanning line tilt. Therefore, Y rotation adjustment (correction of scanning line tilt) by the adjusting screw 62 is unnecessary. The adjusting screw 62 can give a function of only adjustment of the bus shape (correction of scanning line bending) of the long lens 15-2.

In the constitution of the seventh example shown in FIG. 12, it is also possible to independently correct scanning line bending and scanning line tilt. Therefore, a degree of freedom of adjustment is lower than that in the third example shown in FIG. 8. However, it is possible to complete correction of a scanning line shape at adjustment time and adjustment accuracy of substantially the same degree.

Figure 13:
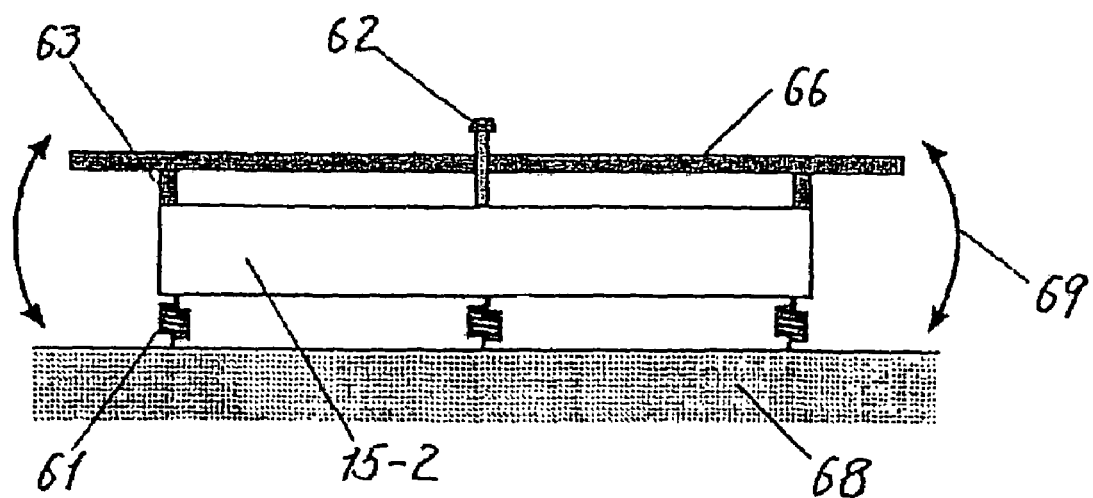
FIG. 13 is a front view of a eighth example of the holding mechanism for the long optical element according to the first embodiment.

FIG. 13 is a diagram of an eighth example of the holding mechanism for the long optical element that can reduce the number of components for a reduction in cost and any one of a reduction in size and a reduction in weight of the device or both. In FIG. 13, the holder member 66 is rotatably held by an appropriate rotation mechanism around an axis parallel to the optical axis of the long lens 15-2. The upper surface at both the ends in the longitudinal direction of the long lens 15-2 is attached to the holder member 66 via the support members 63 formed integrally with the holder member 66. The compression springs 61 serving as the elastic members are interposed between the lower surface of the long lens 15-2 and the housing bottom surface 68 at both the ends and the center in the longitudinal direction of the long lens 15-2. The adjusting screw 62 is screwed in the holder member 66 in the position opposed to the compression spring 61 in the center. The tip of the adjusting screw 62 is in abutment against the upper surface of the long lens 15-2. The long lens 15-2 is pressed against the support members 63 and the adjusting screw 62 by a pressing force of the respective compression springs 61. The long lens 15-2 is substantially attached to the holder member 66. It is possible to adjust tilt by rotating the holder member 66 together with the long lens 15-2. It is possible to adjust bending with the adjusting screw 62 independently from the adjustment of tilt.

Figure 14A:
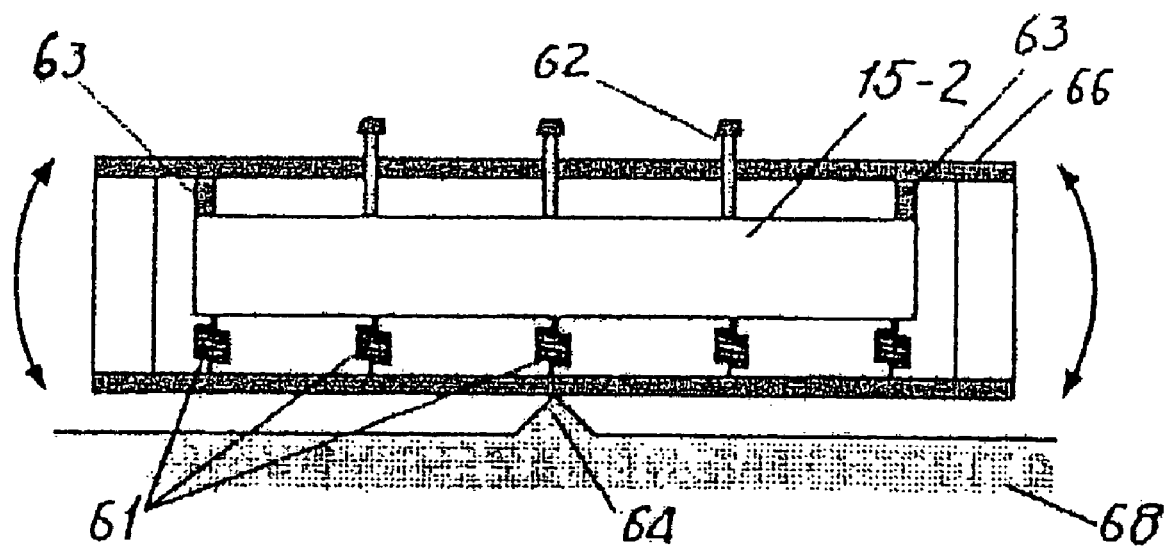
FIG. 14A is a front view of a ninth example of the holding mechanism for the long optical element according to the first embodiment.
Figure 14B:
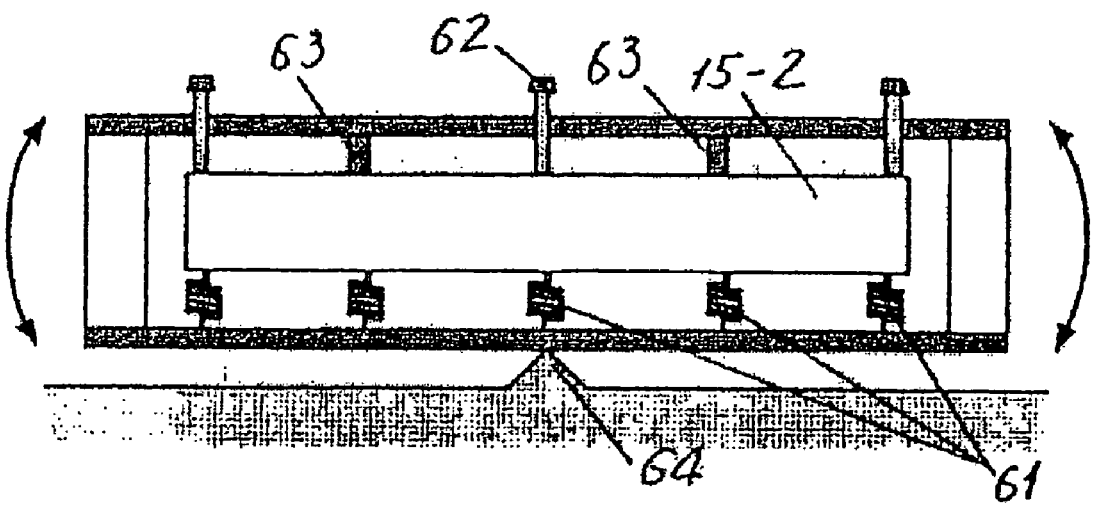
FIG. 14B is a front view of the ninth example of the holding mechanism for the long optical element having a constitution partially different from that shown in FIG. 14A.

FIGS. 14A and 14B are diagrams of a ninth example in which the three adjusting screws 62 are provided to correct a scanning line shape more accurately. In the example in FIG. 14A, the support members (bent sections) 63 are located on the outermost side in the longitudinal direction of the long lens 15-2 and the three adjusting screws 62 are arranged on the inner side at predetermined intervals. As in the example in FIG. 14B, it is also possible that the support members 63 are arranged on the inner side and the three adjusting screws 62 are arranged on the outermost side at both the sides and the center in the longitudinal direction of the long lens 15-2.

In the respective second to nine examples of the holding mechanism for the long optical element, the leaf spring 65 explained with reference to FIG. 15 may be used as the elastic member instead of the compression spring 61. This makes it possible to obtain the effect described above.

Figure 16A:
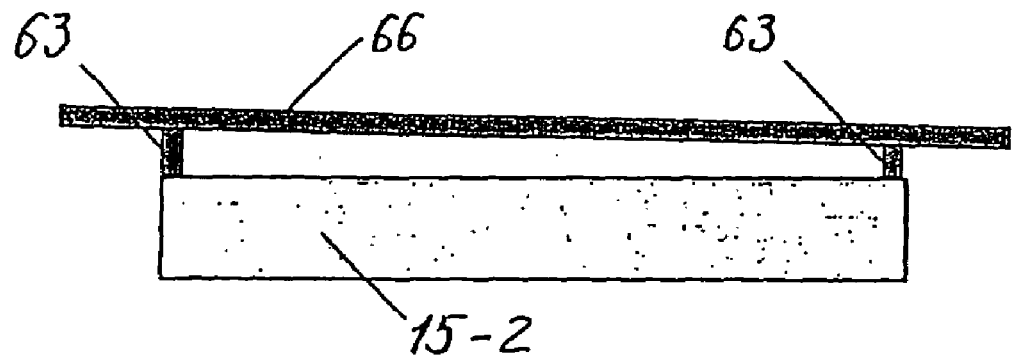
FIG. 16A is a front view of a state of tilt of the long optical element in the ninth example of the holding mechanism for the long optical element according to the first embodiment.
Figure 16B:
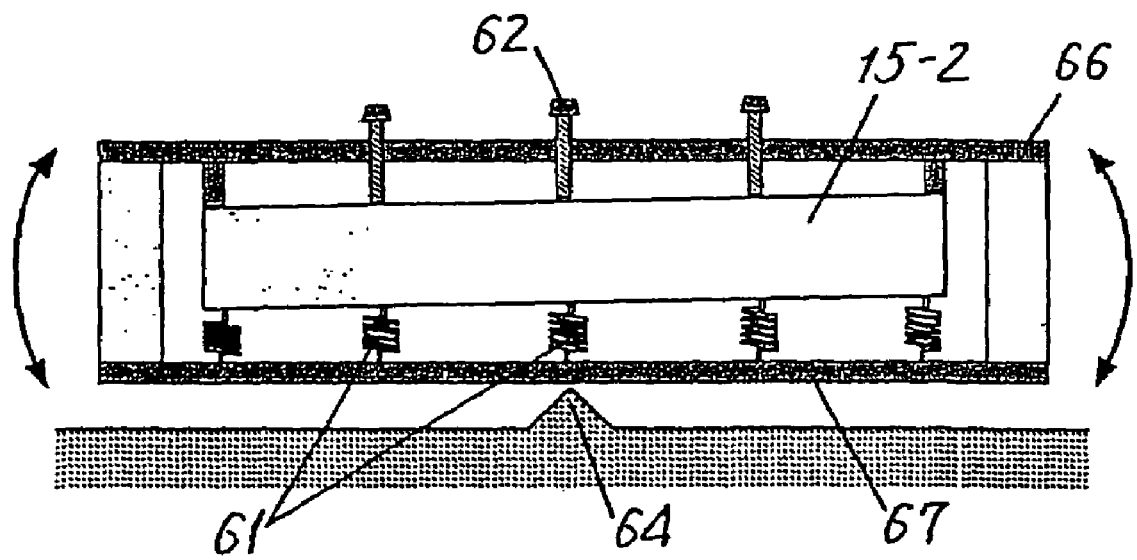
FIG. 16B is a front view of a state of adjustment of tilt of the long optical element in the ninth example of the holding mechanism for the long optical element according to the first embodiment.

Note that, as shown in FIG. 16A, when the support members 63 on any one of the right side and the left side or both are machined by bending of a sheet metal, it is likely that a deviation of about several hundred μm occurs in bending height of the left and the right support members 63 because of a machining error and the long lens 15-2 is assembled in a tilted state. Even when the machining error of this degree occurs, as shown in FIG. 16B, it is possible to eliminate an influence of an attachment error of the long lens due to the machining error by subjecting the holding mechanism including the holder members 66 and 67 vertically forming a pair to Y rotation.

It is possible to control deflective deformation of the holder member and prevent deterioration in attachment accuracy of the holding mechanism for the long optical element.

When a shape in a main scanning section (a YZ plane) of a long lens has a relatively large curvature, it is advisable to make it possible to adjust rotation in a sub-scanning section (an XZ plane) of the lens. This makes it possible to correct scanning line bending.

Figure 19A:
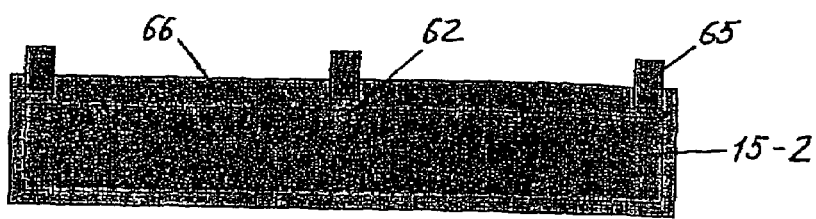
FIG. 19A is a plan view of a tenth example of the holding mechanism for the long optical element according to the first embodiment.
Figure 19B:
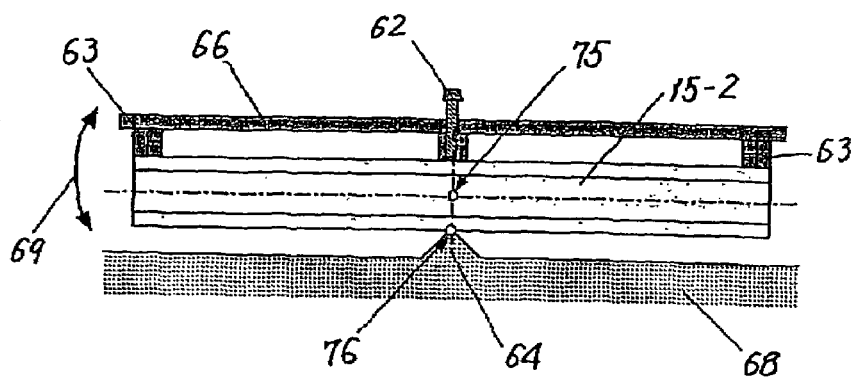
FIG. 19B is a front view of the tenth example of the holding mechanism for the long optical element according to the first embodiment.
Figure 19C:
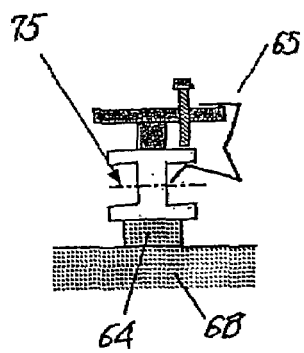
FIG. 19C is a side view of the tenth example of the holding mechanism for the long optical element according to the first embodiment.

FIGS. 19A to 19E are diagrams of a tenth example of the holding mechanism for the long optical element. In FIGS. 19A to 19E, the housing bottom surface 68 serving as the reference surface includes the support member 64 serving as the attachment section formed to be projected upward. The support member 64 is formed in a triangular shape. The center in the longitudinal direction of the bottom surface of the long lens 15-2 is placed on a vertex of the support member 64 equivalent to a vertex of the triangle. As shown in FIG. 19C, the side section of the long lens 15-2 is formed in a sideways "H" shape. The long lens 15-2 has projected edges in upper and lower parts thereof across a portion having a lens action. The long lens 15-2 is pressed against and fixed to the bent sections (the supporting portions) 63 formed by, for example, cutting and raising both the ends in the longitudinal direction of an upper sheet metal 66 serving as the holder member by elasticity of the two leaf springs 65 serving as the elastic members provided at both the ends in the longitudinal direction.

The adjusting screw 62 serving as the adjustment member is screwed in the center of the upper sheet metal 66. The tip of the adjusting screw 62 is in abutment against the upper surface of the long lens 15-2 and presses the long lens 15-2. The third leaf spring 65 serving as the elastic member is arranged against a pressing force of the adjusting screw 62. As shown in FIG. 19C, the leaf spring 65 is formed to be bent substantially in an "M" shape. Both the ends of the leaf spring 65 are hooked to the upper surface of the upper sheet metal 66 and the lower surface of the projected edge on the upper side of the long lens 15-2. The upper sheet metal 66 and the long lens 15-2 are urged to be attracted to each other by elasticity of the leaf spring 65. The bent section 63 comes into abutment against the upper surface of the long lens 15-2 by the urging force to form the upper sheet metal 66 and the long lens 15-2 substantially as one member. It is possible to press and deform the long lens 15-2 by subjecting the adjusting screw 62 to rotation adjustment to be pushed in or pulled out from the upper sheet metal 66. This makes it possible to eliminate a shape error of the long lens 15-2.

Figure 19D:
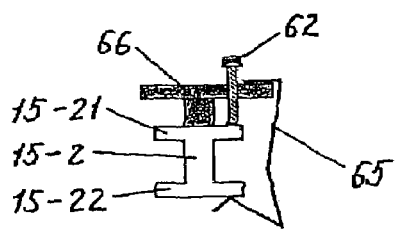
FIG. 19D is a side view of the tenth example of the holding mechanism for the long optical element according to the first embodiment shown with an example of a leaf spring.

The leaf spring 65 shown in FIG. 19D is different from that shown in FIG. 19C only in that the bent edges at both the ends thereof are hooked astride the edge of the upper sheet metal 66 serving as the holder member and the projected edge 15-21 on the lower side of the long lens 15-2. The leaf spring 65 applies a pressing force to the long lens 15-2 and the upper sheet metal 66 in the same manner as that shown in FIG. 19C. In a modification shown in FIG. 19E, the two leaf springs 65 in the example shown in FIG. 19C are used as a pair and arranged symmetrically when the long lens 15-2 is viewed from the side thereof. Similarly, it is also possible that the two leaf springs 65 shown in FIG. 19D are used as a pair and arranged symmetrically to the long lens 15-2. By adopting the leaf springs 65 in this way, compared with the constitution using the compression spring 61 in an example explained later, since a useless space is not formed, it is possible to realize a reduction in size of the device.

Figure 33:
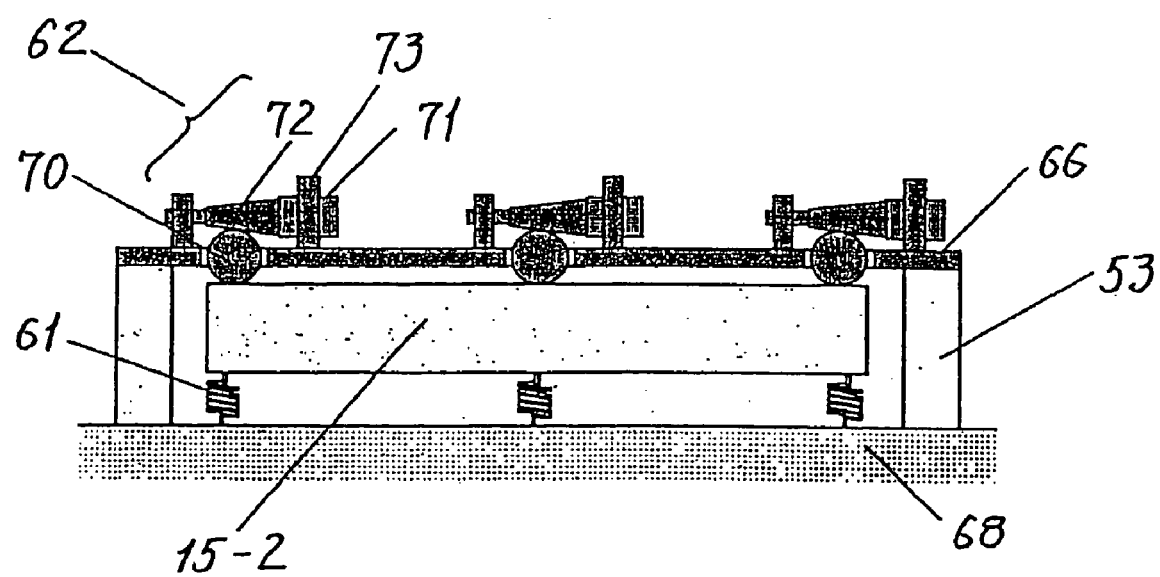
FIG. 33 is a front view of a thirteenth example of the holding mechanism for the long optical element according to the first embodiment.

In an eleventh example of the holding mechanism for the long optical element, to improve adjustment resolution in eliminating a shape error of the long lens 15-2, it is possible to adopt an adjustment member 67 including the tapered adjusting screw 71 having the tapered section 72 and the roller 70 as in examples shown in FIGS. 20 and 33 instead of the adjusting screw 62 used in the examples described above. Since the example shown in FIG. 20 is already explained, a detailed explanation of the example is omitted.

In the example shown in FIG. 20, it is possible to change adjustment sensitivity, that is, a moving distance of the roller 70 with respect to a rotation angle of the tapered adjusting screw 71 according to a taper angle of the taper section 72 of the tapered adjusting screw 71. Although a shape of the roller 70 is cylindrical in the example shown in the figure, the roller 70 may be formed in other shapes such as spherical. As in the example shown in FIG. 19, it is also possible that the long lens 15-2 is arranged on the support member (attachment section) 64 provided on the optical housing bottom surface 68 and rotation or tilt of the long lens 15-2 is adjusted in the direction of the arrow 69 in FIG. 19 (the γ rotation direction) with the vertex of the support member 64 as a rotation axis 76 using a not shown actuator like a stepping motor. Mechanical automatic adjustment is made possible by driving to rotate the tapered adjusting screw 71 in the example shown in FIG. 20 with the actuator. Note that the rotation axis in the γ rotation direction may be set on a bottom surface of the long lens 15-2 as in the example in FIG. 19. Alternatively, when an attachment reference is not provided on the bottom surface of the long lens 15-2, the rotation axis may be arranged on the upper sheet metal 66. However, to control movement of a position of an optical axis 75 of the long lens 15-2, ideally, it is desirable to provide the rotation axis near the optical axis of the long lens 15-2.

It is possible to correct a scanning line shape on a surface to be scanned such as a photosensitive drum surface as schematically explained about the optical scanning device according to such shape error adjustment and tilt adjustment for the long lens 15-2, that is, error adjustment and tilt adjustment of the "bus" of the long lens 15-2.

"Bending adjustment" by pressing of the adjusting screw 62 in the example shown in FIG. 19 at the time when an initial shape (a shape after molding) of the long lens 15-2 is a curved line having one peak is examined. Correction of a shape of a long lens (i.e., a shape of a bus of the long lens) by such pressing of the adjusting screw 62 is simply referred to as "bending adjustment" below.

Figure 21:
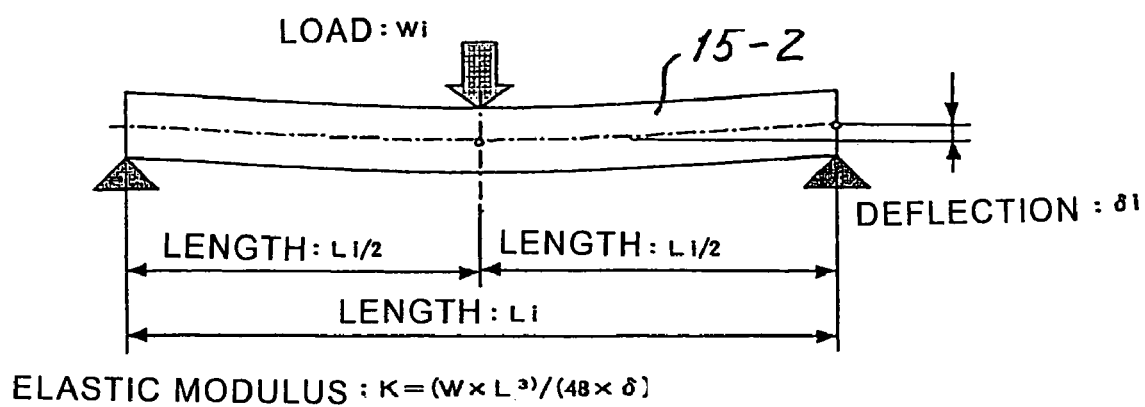
FIG. 21 is a front view for explaining a definition of an elastic modulus of the long optical element.
Figure 23:
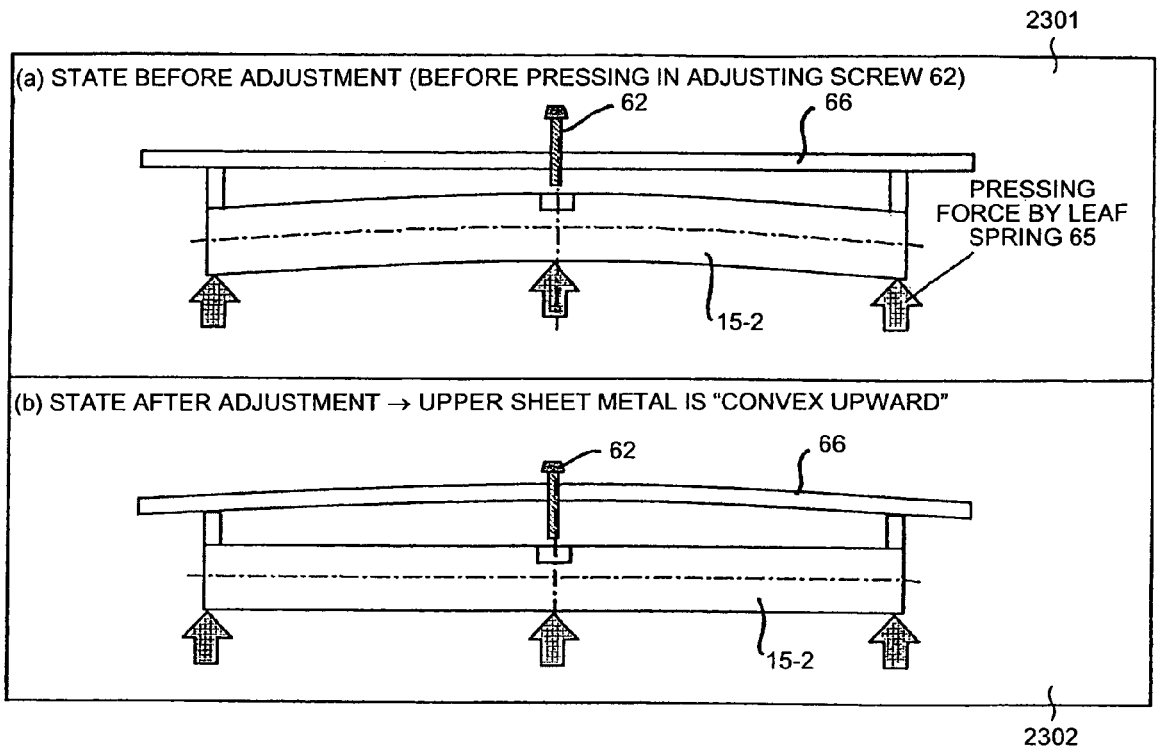
FIG. 23 is a front view of an example of a shape of the long optical element according to the first embodiment before and after adjustment.
Figure 24:
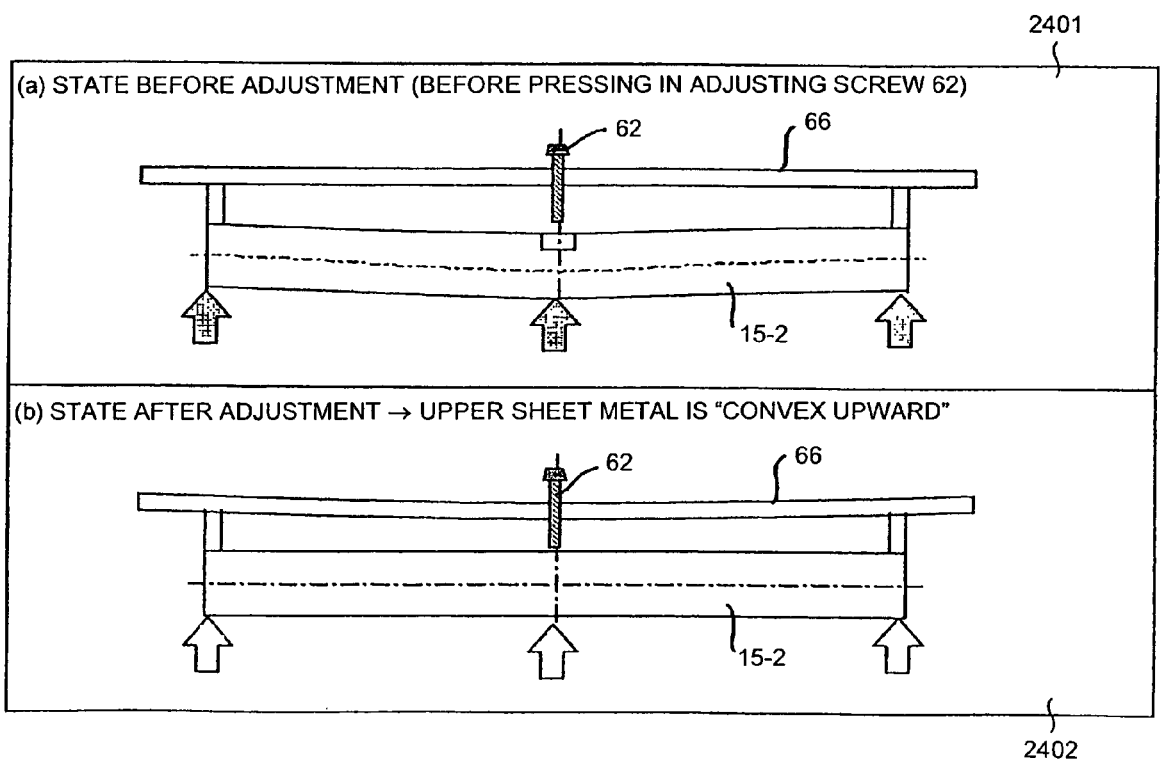
FIG. 24 is a front view of another example of a shape of the long optical element according to the first embodiment before and after adjustment.

When the initial shape of the long lens 15-2 is "convex upward" as shown in a diagram denoted by reference numeral 2301 in FIG. 23, after bending adjustment ends and, therefore, in a state in which the long lens 15-2 is straight, the upper sheet metal 66 is made "convex upward" by a pressing force of the adjusting screw 62 as shown in a diagram denoted by reference numeral 2302 in FIG. 23. In contrast, when the initial shape of the long lens 15-2 is "convex downward" as shown in a diagram denoted by reference numeral 2401 in FIG. 24, after the bending is adjusted, the upper sheet metal 66 is made "convex downward" by an elastic force of the leaf spring 65 as shown in a diagram denoted by reference numeral 2402 in FIG. 24. As shown in FIG. 21, when the long lens 15-2 and the upper sheet metal 66 are rotatably supported by two supporting portions apart from each other by length Li and a deflection amount at the time when a load Wi is applied to the center is di, a modulus of elasticity Ki of the long lens 15-2 on the lower side and the upper sheet metal 66 is defined by $$Ki = (Wi \times L^3)/(48 \times di) \quad (2)$$

Note that, when suffice I is 1, this represents the long lens 15-2 and, when I is 2, this represents the deflection amount di.

In the case of this example, since a load W1 is equal to a load W2, from Equation 2, it is seen that the deflection amount di is inversely proportional to the "modulus of elasticity" Ki. In other words, a ratio of deflection amounts is a ratio of inverses of moduli of elasticity.

$$d1/d2 = K2/K1 \quad (3)$$

In Equation 3, d1 is equivalent to a deflection amount of the long lens 15-2 before bending adjustment and d2 is equivalent to a deflection amount of the upper sheet metal 66 after bending adjustment. In other words, an increase in d2 means an increase in the deflection amount of the upper sheet metal 66 after adjustment. As deflection of the upper sheet metal 66 after adjustment increases, it is apprehended that the following deficiencies occur.

When a rotation axis after Y rotation adjustment is arranged on the upper sheet metal 66, it is likely that an influence of displacement of the rotation axis in the vertical direction (the sub-scanning direction) is innegligible and adversely affects optical performance like a beam spot diameter on a surface to be scanned.

When the adjustment member 67 shown in FIG. 12 is applied to realize improvement of adjustment resolution, it is likely that an adjustment stroke is insufficient. Therefore, it is desirable to set d1/d2 to at least 0.5 or more and it is more desirable to set d1/d2 to 1.0 or more to more effectively prevent the deficiencies.

It is possible to derive the following equation from Equation 3.

$$K2/K1 \geq 0.5 \quad (4)$$

Figure 25A:
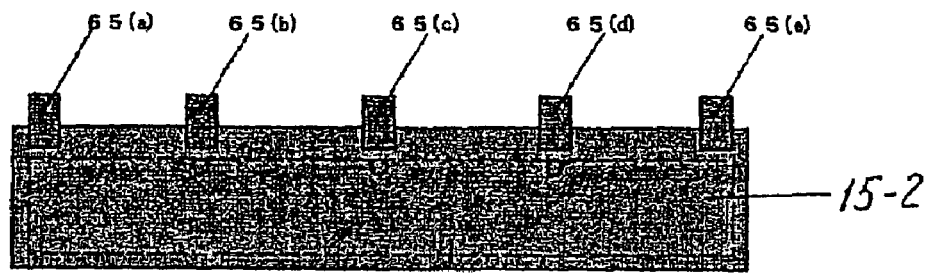
FIG. 25A is a plan view of a twelfth example of the holding mechanism for the long optical element according to the first embodiment.
Figure 25B:
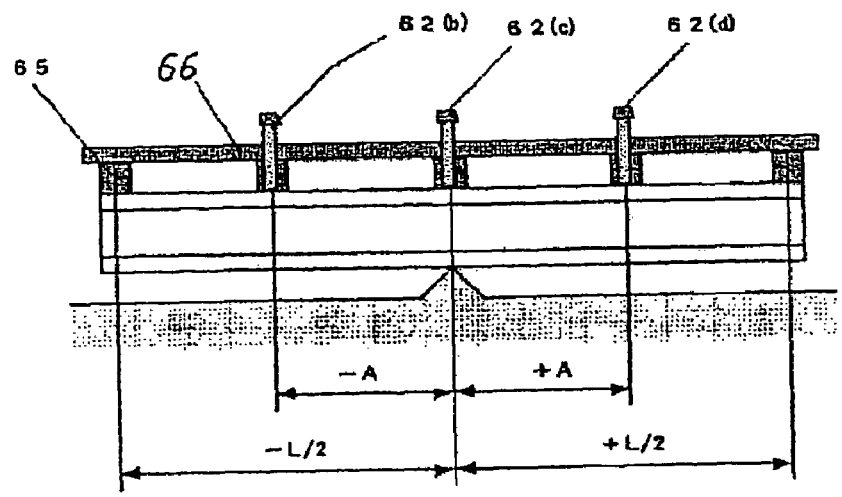
FIG. 25B is a front view of the twelfth example of the holding mechanism for the long optical element according to the first embodiment.
Figure 25C:
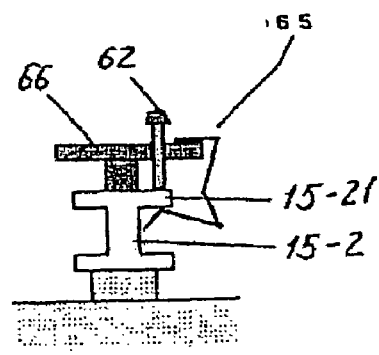
FIG. 25C is a side view of the twelfth example of the holding mechanism for the long optical element according to the first embodiment.

A range of the ratio of moduli of elasticity K2/K1 is derived using bending adjustment for a long lens by one adjusting screw as described above. As in an example shown in FIGS. 25A to 25C, the same relation is established when a plurality of adjusting screws are provided. FIGS. 25A to 25C are plan view, a front view, and a side view of a twelfth example of the holding mechanism for the long optical element.

In the twelfth example, three adjusting screws are arranged. Whereas one pair of the adjusting screws 62 serving as the adjustment members or the adjusting screws 62 are provided in the examples shown in FIGS. 19 and 20, two pairs of the adjusting screw 62 serving as the adjustment member and the leaf spring 65 serving as the elastic member are added in the example shown in FIGS. 25A to 25C. More specifically, a pair of adjusting screw 62(c) and leaf spring 65(c) are arranged in the center in the longitudinal direction of the long lens 15-2 and a pair of an adjusting screw 62(b) and a leaf spring 65(b) and a pair of an adjusting screw 62(d) and a leaf spring 65(d) are arranged between the pair of the adjusting screw 62(c) and the leaf spring 65(c) in the center and both the ends in the longitudinal direction of the long lens 15-2. Leaf springs 65(a) and 65(e) are arranged at both the ends in the longitudinal direction of the long lens 15-2, respectively. Since constitutions of the respective adjusting screws and leaf springs are the same as those shown in FIG. 19C and the like, a detailed explanation of the constitutions is omitted. Note that three or more pairs of the adjustment members 67 shown in FIG. 20 may be arranged.

By adopting such a constitution, compared with the constitution of the example shown in FIG. 19, it is possible to perform adjustment when an initial shape of a long lens is more complicated. In the case of the ninth example in which the adjustment member is provided in one place, it is possible to perform only adjustment for a long lens having an initial shape with "one peak". On the other hand, in the case of the twelfth example in which the adjustment members are provided in three places, it is also possible to cope with a long lens with "three peaks".

Figure 26:
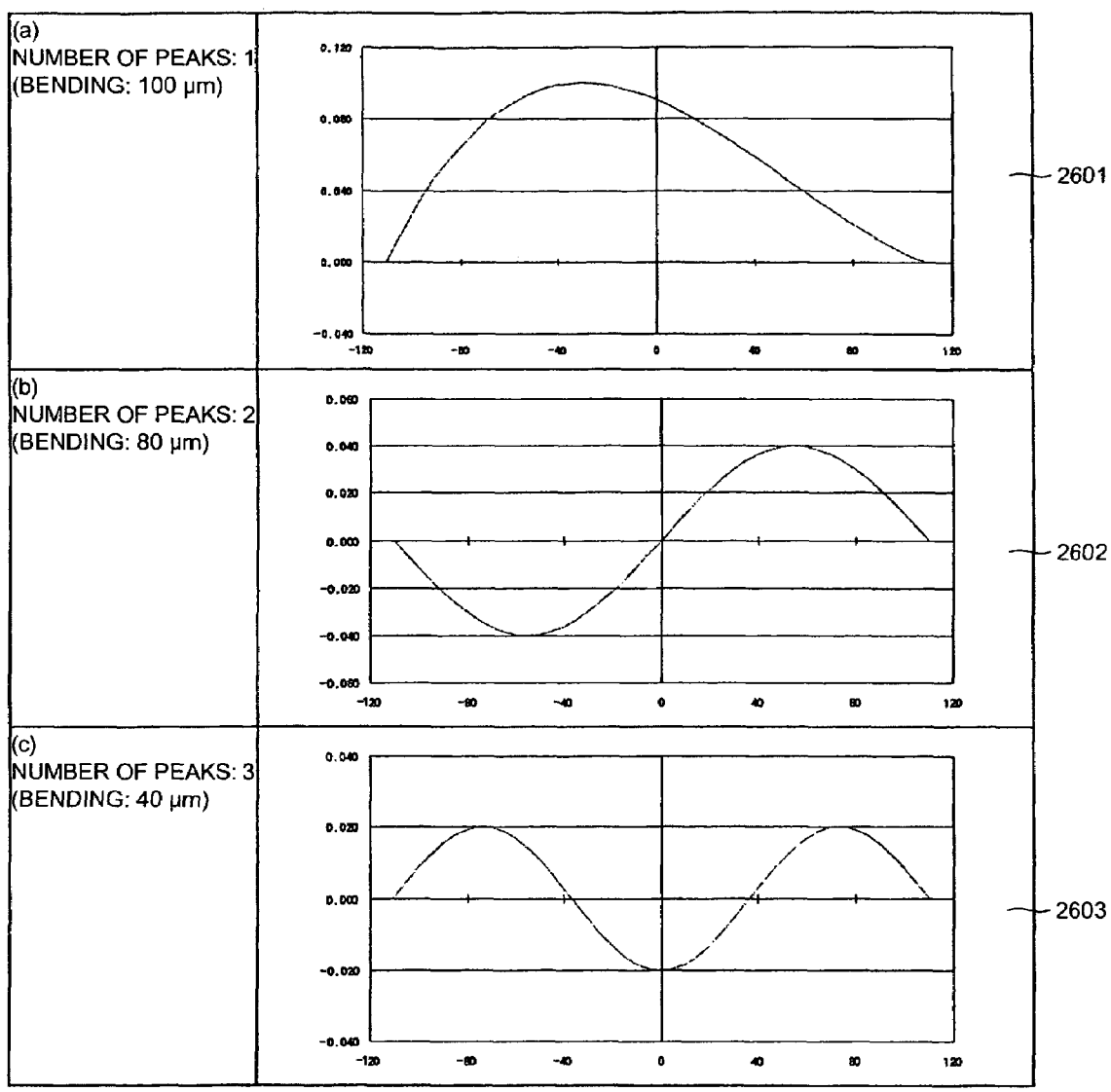
FIG. 26 is a graph of imaginary shapes of various modifications of the long optical element according to the first embodiment.
Figure 27:
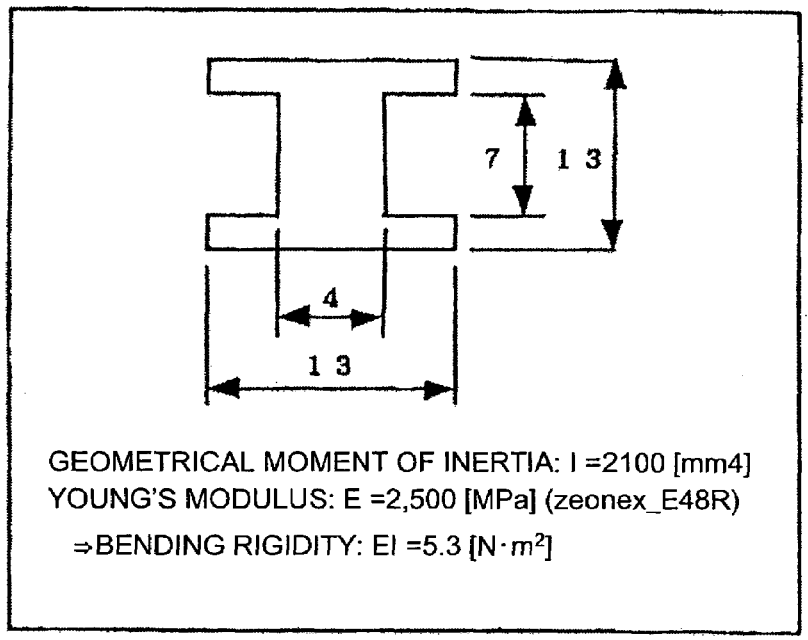
FIG. 27 is a side sectional view of an example of a sectional shape of the long optical element according to the first embodiment.

As in the example shown in FIGS. 25A to 25C, length of the long lens 15-2 (and the upper sheet metal 66) is set to L (±L/2) and the adjusting screws 62(c), 62(b), and 62(d) are arranged in the center thereof (Y=0) and middle portions between the center and the peripheries thereof (Y=±A), respectively. A sectional shape near the center of the long lens 15-2 is shown in FIG. 27. As an initial shape of the long lens 15-2, three types shown in sections denoted by reference numerals 2601 to 2603 in FIG. 26, that is, imaginary shapes at the time when the number of peaks is 1 to 3, respectively, are assumed. In the case shown in the diagram denoted by reference numeral 2601, a shape at the time when there is one peak is assumed. In the case shown in the diagram denoted by reference numeral 2602, a shape at the time when there are two peaks is assumed. In the case shown in the diagram denoted by reference numeral 2603, a shape at the time when there are three peaks is assumed.

Figure 31:
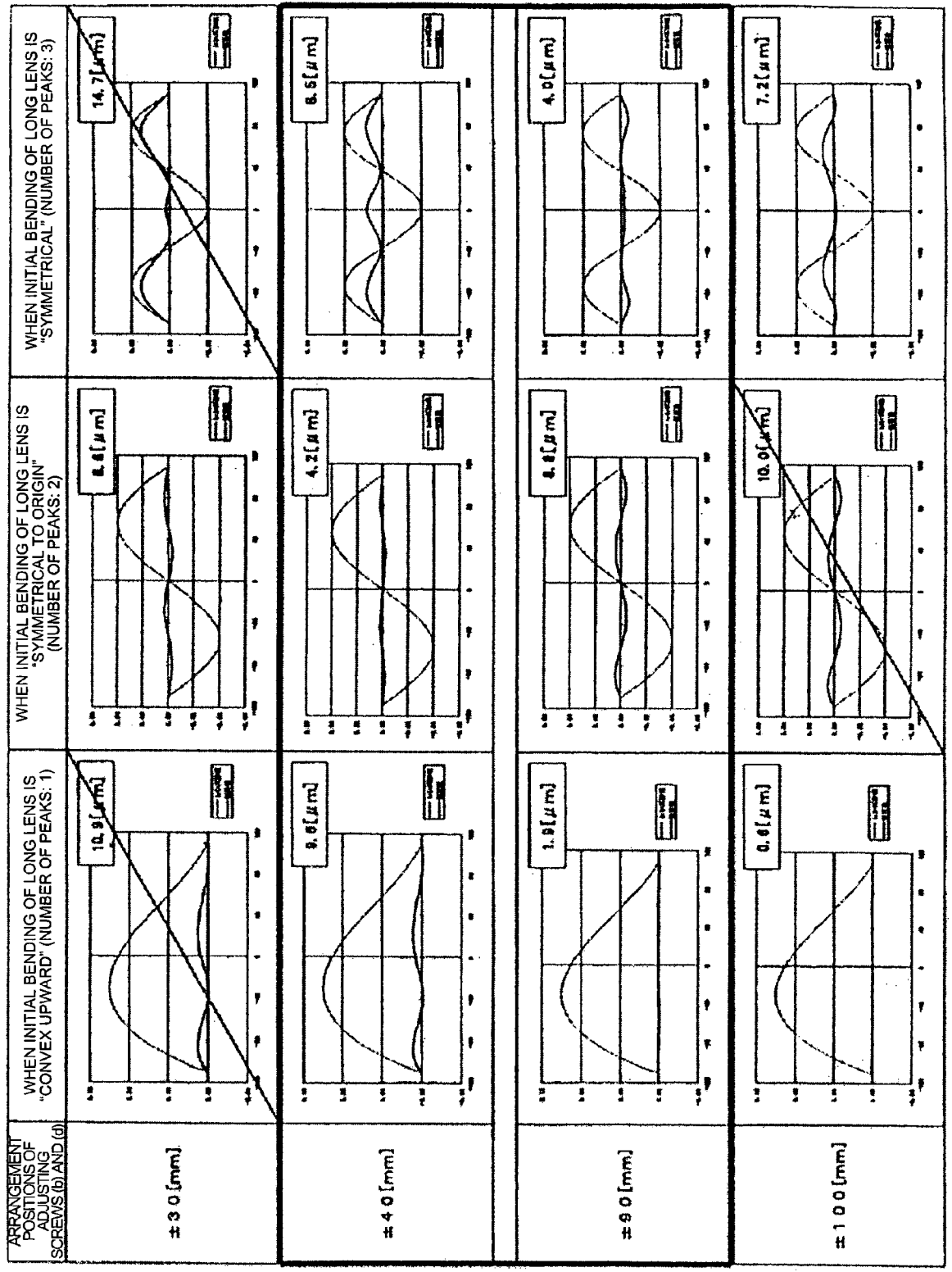
FIG. 31 is a graph of a result of measurement of an adjustment residual amount with respect to various examples of arrangement of an adjusting screw according to the first embodiment.

Adjustment residuals of bending adjustment according to positions (±A) of the adjusting screws 62(b) and 62(d) are derived with respect to the initial shapes of the long lens. The adjustment residuals are collectively shown in FIG. 31 as graphs. When an allowable value of an adjustment residual is set to 10 μm or less taking into account a change in a bent shape at the time of a temperature change and positioning accuracy among photosensitive drums, it is necessary to set the positions of the adjusting screws 62(b) and 62(d) in a range of Y=±40 to ±90 mm. When length of the long lens 15-2 in the third example is set to L1, since L1 is 220 mm, if the positions are scaled with the value, the positions are in a range of Y=±0.18L1 to ±0.41L1. In FIG. 31, when arrangement positions of the adjusting screws 62(b) and 62(d) are in a range of Y=±30 mm or less or Y=±100 mm or more, an adjustment residual increases to be equal to or larger than 10 μm and deviates from the allowable value. Thus, graphs corresponding to such a case are marked with oblique lines.

Figure 28:
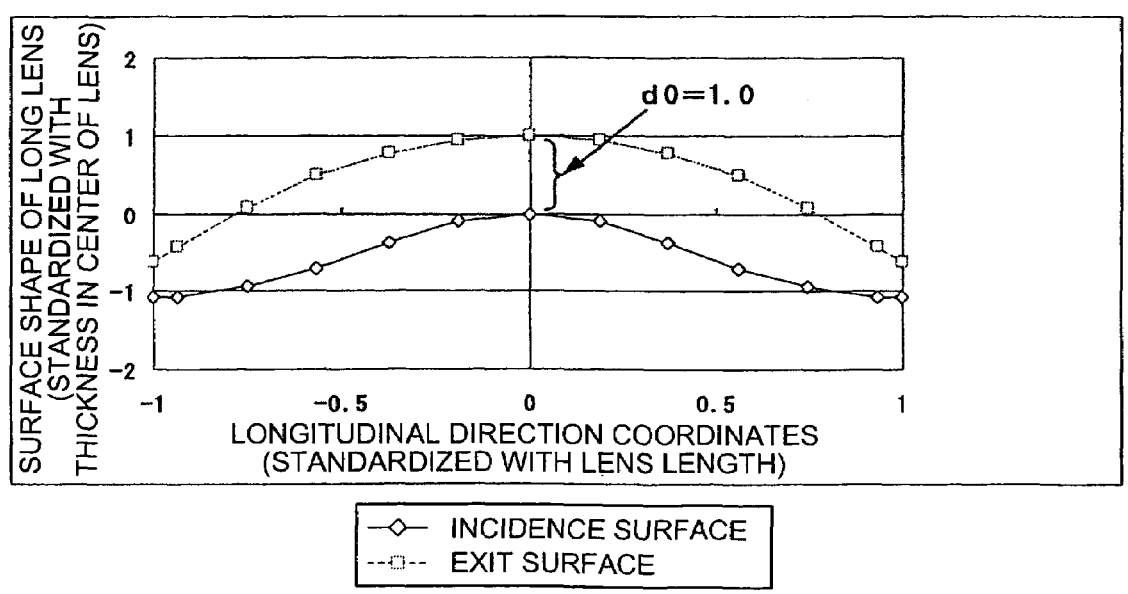
FIG. 28 is a graph of an example of a surface shape of the long optical element according to the first embodiment.
Figure 29:
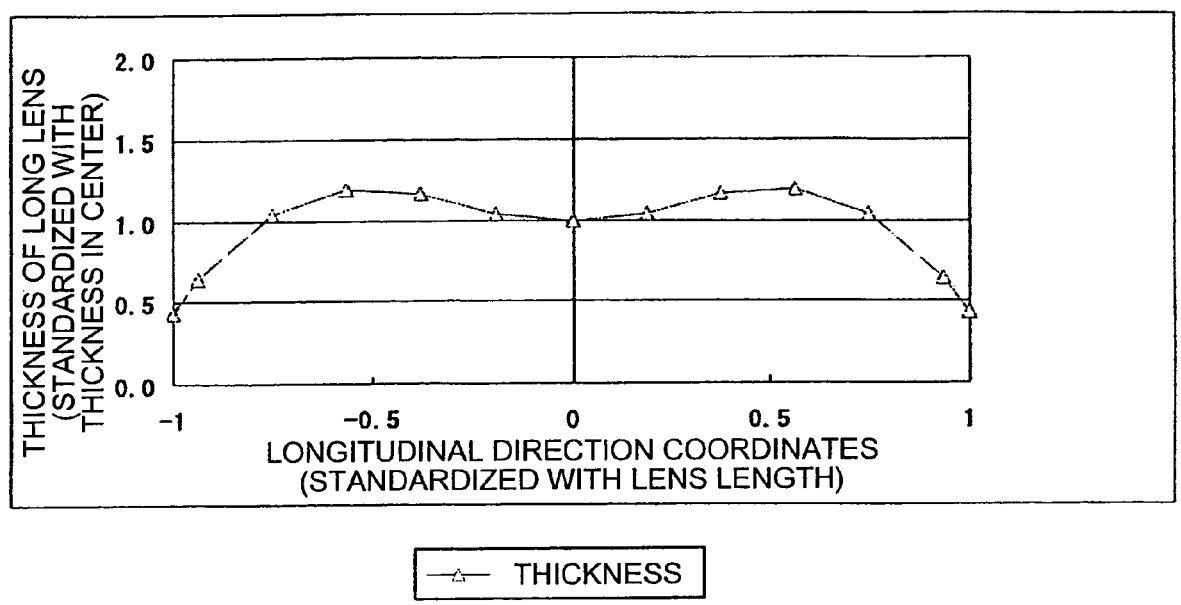
FIG. 29 is a graph of an example of thickness of the long optical element according to the first embodiment.
Figure 30A:
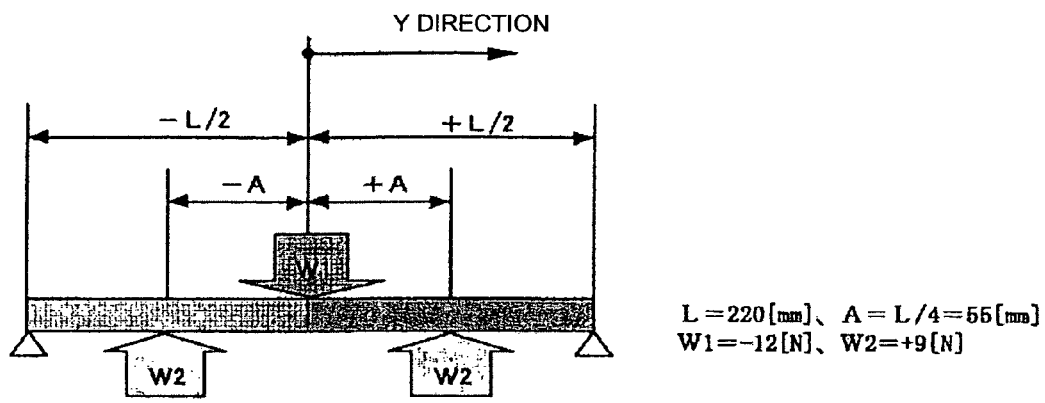
FIG. 30A is a diagram of the long optical element according to the first embodiment at the time when both ends thereof are supported to be rotatable and a load is applied thereto.
Figure 30B:
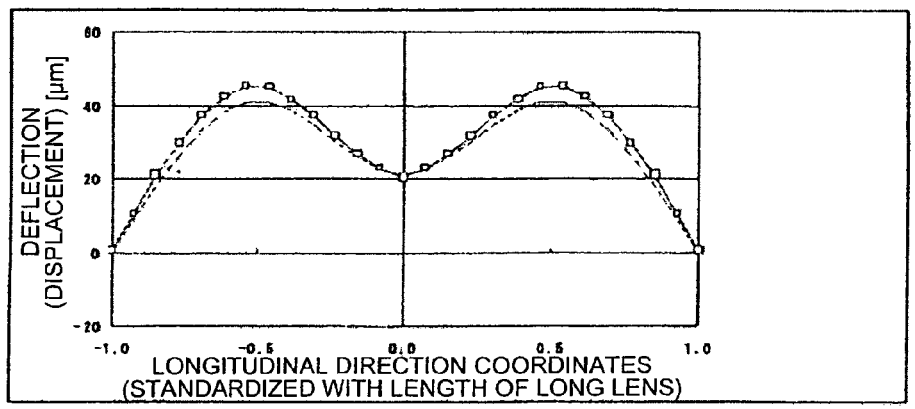
FIG. 30B is a graph of displacement of the long optical element.

The numerical range (±0.2L1 to ±0.4L1) is derived by regarding and modeling the long lens as a "beam" having a fixed section shown in FIG. 27. In this examination, a long lens shown in FIG. 28 is assumed. An "eccentricity degree" of the long lens, that is, a ratio of change d/d0 of "thickness d in the longitudinal direction at the time when thickness in the center of the long lens (in the optical axis direction) d0 is set to a reference (1.0)" is about 0.4 to 1.2 (see FIG. 29). Even in the long lens having the eccentricity degree of this order, as shown in FIGS. 30A and 30B, a result of calculating deflection regarding the long lens as a "beam" with a fixed section, that is, a fixed geometrical moment of inertia and a result of measurement with a sample of the long lens coincide with each other relatively well. It is evident that the numerical range has generality concerning long optical elements made of resin presently mounted on products of manufacturers.

Figure 22A:
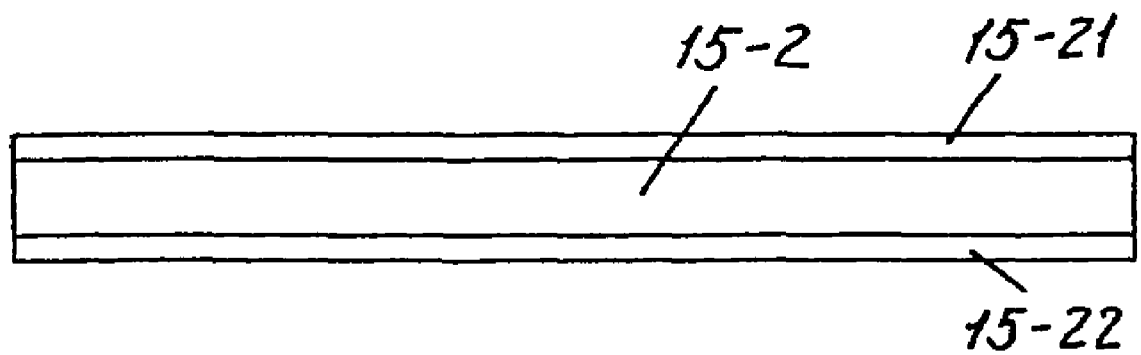
FIG. 22A is front view of an example of an external appearance of the long optical element according to the first embodiment.
Figure 22B:
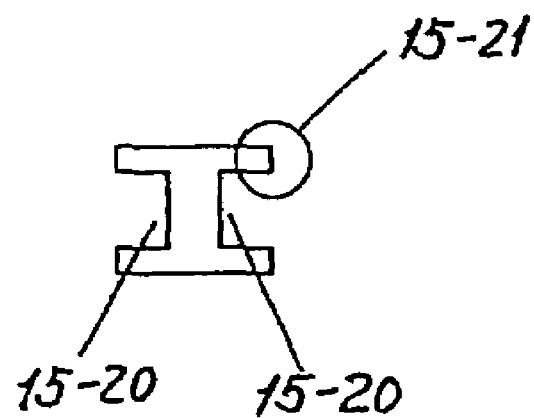
FIG. 22B is a side view of the example of an external appearance of the long optical element according to the first embodiment.

Note that, in general, in the case of a so-called "long optical element" made of resin mold, to maintain an optical surface shape created by molding, the ribs 15-21 and 15-22 are provided above and below the optical surface (see FIG. 22). Height in the sub-scanning direction of the ribs is sufficiently small compared with height in the sub-scanning direction of an optical surface 15-20 and a geometrical moment of inertia in a portion between optical surfaces 15-20 on an incidence surface side and an exit surface side dominantly works. Thus, an eccentricity degree between the optical surfaces only has to be considered.

A pressing force of the leaf spring is examined. As schematically explained about the shape of the long lens made of a plastic lens, it is sufficient to set adjusting screws in three places, that is, one place in the center and two places in the middle portions between the center and the peripherals, taking into account, for example, the following points. As the number of adjusting screws increases, it is likely that an adjustment process becomes complicated and adjustment time increases and, in the case of a usual optical system, the number of peaks of a scanning line on a surface to be scanned is about three at the maximum. As the number of peaks of a long lens shape increases, a bending amount decreases.

In a list of adjustment residuals at the time when the adjusting screws 62 are arranged in three places shown in FIG. 31, when the adjusting screws 62(c) and 62(d) are arranged in a range of Y=±40 mm, a pressing force of the adjusting screws (or leaf springs) with respect to the long lens is the largest and a pressing force of about 30 newtons is required. Thus, it is assumed that, taking into account a safety factor (=1.33), a pressing force F0 of the adjusting screws of about 40 newtons is required to correct bending of the long lens in all the initial shapes.

On the other hand, as it is well known from calculation in terms of strength of materials, when a geometrical moment of inertia I and a Young's modulus of a material are fixed and length is L and a pressing force to the center is F, deflection d in the center is represented by the following equation.

$$d(F \times L^3)/(48 \times EI) \tag{5}$$

In other words, to correct initial bending that causes the same deflection d, when the geometrical moment of inertia I of the long lens increases to be M times as large, the pressing force F is also required to be M times as large. When length of the long lens increases to be N times as large, the pressing force F is required to be $1/N^3$ times as large. Note that, when the length increases to be N times as large, initial bending of the long lens 15-2 also increases to be N times as large (because the initial bending is generally proportional to the length). To correct the bending, a pressing force is required to be N times as large. When effects of the three items described above are multiplied, a pressing force calculated from the following Equation 5 is required.

$$M \times (1/N^3) \times N = M \times (1/N^2) \tag{6}$$

In the examination of FIG. 31, the length L is 220 mm, the Young's modulus is 2500 MPa, and the geometrical moment of inertia I near the center is 2100 mm$^4$. More generally, when a geometrical moment of inertia is I1 mm$^4$ and length is L1 mm, when M=I1/2100 and N=L1/220 with Equation 6 as a coefficient, the pressing force F1 only has to be a value calculated from the following equation at the maximum.

$$F1, \max = F0 \times M \times (1/N^2)$$
$$= 40 \times (I1/2100) \times (220/L1)^2$$
$$= 920 \times (I1/L1^2)$$

When the geometrical moment of inertia near the center of the long lens 15-2 is I1 and the length thereof is L1, it is possible to set the pressing force F1 of the elastic member (the leaf spring) 65 with respect to the long lens 15-2 in the following range.

$$F1 \leq 920 \times (I1/L1^2) \tag{7}$$

Note that, in the case of a plastic material generally used as a long optical element (scanning lens) for an optical scanning device, the Young's modulus E is about 1500 to 2500 MPa. Equation 9 is generally established for plastic lenses presently produced industrially.

Figure 32:
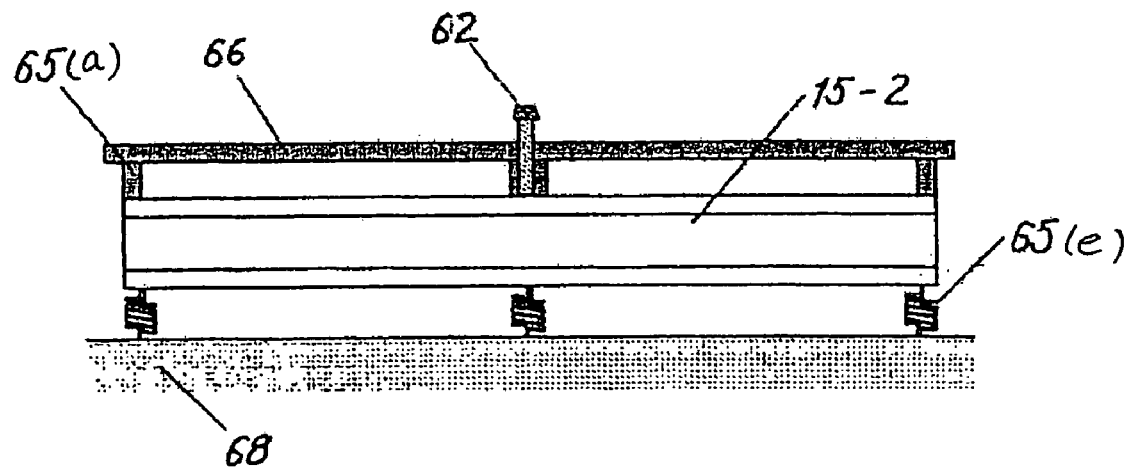
FIG. 32 is a front view of a comparative example for the holding mechanism for the long optical element according to the first embodiment.

An arrangement of an elastic member is examined. In the tenth and the eleventh examples, the constitution in which a long lens is pressed and fixed by an elastic member (a leaf spring) provided on an upper sheet metal serving as a holder member is adopted. As another constitution (a comparative example), it is also possible to adopt a constitution in which the leaf springs 65 serving as the elastic members are arranged between the long lens 15-2 and the optical housing bottom surface 68 as shown in FIG. 32. In this example, the three leaf springs 65 are used. However, in the case of such a constitution, it is necessary to set a downward pressing force from the outside against a pressing force (upward) of the leaf springs 65. Thus, it is likely that complication of the device, an increase in the number of components, and an increase in size of the device are caused. Therefore, it can be said that the constitutions described in the tenth and the eleventh examples are more desirable constitutions.

Figure 19E:
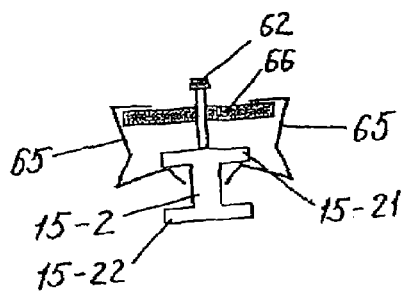
FIG. 19E is a side view of the tenth example of the holding mechanism for the long optical element according to the first embodiment shown with another example of a leaf spring.

As shown in FIG. 19D, the leaf springs 65(a) and 65(e) corresponding to the supporting portions 63 arranged at both the ends of the holder member 66 press both the ends of the long lens 15-2 and do not interfere with an optical path of a laser beam. Thus, a constitution for pressing a bottom surface of a long lens as in the figure may be adopted. Moreover, as shown in FIG. 19E, by providing the leaf springs 65 on an incidence surface side and an exit surface side of a long lens, it is possible to control generation of a rotation moment of the long lens in a surface shown in FIG. 19E, that is, a surface viewed from a side of the long lens and hold the long lens stably.

Conditions for the geometrical moment of inertia I and the length L of the long lens are examined. As explained concerning a pressing force of a leaf spring, a pressing force required for bending adjustment for a long lens is proportional to the geometrical moment of inertia I of the long lens and inversely proportional to a square of the length L thereof. Thus, when a coefficient P is defined as $I/L^2$ and L=220 mm and the geometrical moment of inertia I=2100 mm$^4$ are substituted, P=2100/2202=0.0434 mm$^2$ is obtained. When adjusting screws are provided in three places (to be capable of coping with three peaks of initial bending of the long lens), the pressing force F0 of the adjusting screws only has to be about 40 newtons at the maximum. As a more general representation, if the coefficient P is set in the following range, it is possible to adjust bending of the long lens with a pressing force equal to or less than 40 newtons.

$$P = I/L^2 \leq 0.0434 \text{ mm}^2 \tag{8}$$

A constitution that is applicable when the number of peaks of initial bending of the long lens is one, that is, a constitution in which an adjusting screw is provided in one place is examined. In long lenses mounted on products of manufacturers, when the number of peaks is three, a width of bending (PV) is generally about 40 μm at the maximum. On the other hand, when the number of peaks is one, the width of bending is often about 100 μm at the maximum (i.e., 100/40=2.5 times). When the number of peaks is one, compared with the case of three peaks, a substantial length of a portion to be subjected to bending adjustment is three times as large. The following equation is obtained by multiplying the right side of Equation 7 by a coefficient $[2.5 \times (\frac{1}{3})^2 = 0.277]$ obtained by multiplying these effects.

$$P = I/L^2 \leq 0.012 \text{ mm}^2 \tag{9}$$

The equation indicates conditions of a geometrical moment of inertia and length of the long lens that can be adjusted by a pressing force equal to or less than 40 newtons in the constitution including the adjusting screw in one place.

In the optical scanning device mounted with the holding mechanism for the long optical element explained above, it is possible to increase accuracy of a shape of a scanning line on a surface to be scanned of the long optical element. It is likely that a shape of the long optical element formed by the holding mechanism changes because of an influence of a change in elapsed time or environmental temperature and humidity. In such a case, it is sufficient to separately provide a detecting unit for detecting the change in the shape and change, for example, an amount of projection of a support member consisting of an adjusting screw and a Y rotation angle of the holding mechanism based on a result of detection by the detecting unit. It is possible to reduce sizes of the holding mechanism for the long optical element and the optical scanning device using the holding mechanism and realize a reduction in cost by using, for example, an actuator such as a stepping motor, which can be driven by a pulse signal, for changing the amount of projection of the adjusting screw and the Y rotation angle of the holding mechanism.

It is possible to predict a shape change of the long optical element by detecting a shape of a scanning line. Therefore, a scanning line shape on a surface to be scanned or a surface optically equivalent to the surface to be scanned may be detected instead of a shape of the long optical element. As means for detection, for example, it is sufficient to form the toner image for color misalignment detection 55a shown in FIG. 5 and use the detection sensor 56 for detecting the toner image.

Figure 35A:
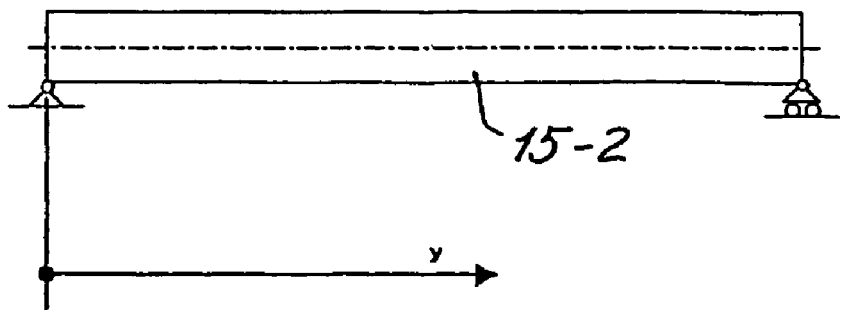
FIGS. 35A to 35C are front views of a state of deformation of the long optical element due to an action of an external force according to the first embodiment before the external force is applied, at the time when the external force is applied, and at the time when a bending moment is applied at both ends of the long optical element, respectively.
Figure 35B:
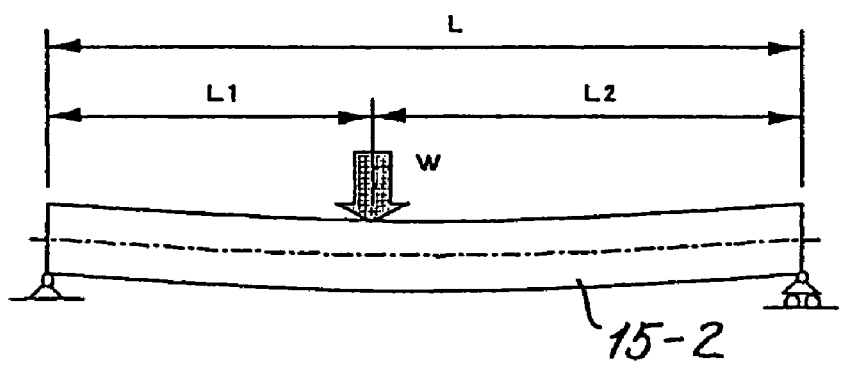

As shown in FIG. 35A, both the ends of the straight long lens 15-2 are simply supported (rotationally supported). FIG. 35B is a diagram of a long lens shape at the time when a load W is applied to a position of L1 (y=L1) from the left end of the long lens 15-2. In an area from the left end of the long lens to the load position ($0 \leq y \leq L1$), a long lens shape (a deflected curve: Vz) is represented by $$Vz=(WL1^3L2^3/6EIL) \times \{2(L-y)/L2+(L-y)/L1-(L-y)^3/L1L2^2\} \quad (10)$$

where I is a geometrical moment of inertia, E is a Young's modulus, and L is length of the long lens 15-2.

Note that, when the load W is applied to the center (y=L1=L/2) of the long lens 15-2, in an area from the left end to the center of the long lens 15-2 ($0 \leq y \leq L/2$), a long lens shape (a deflected curve: Vz) is represented by $$Vz=(WL^3/48EI) \times \{(3y/L)-(4y^3/L^3)\} \quad (11)$$

In an area from the center to the right end of the long lens ($L/2 \leq y \leq L$), a long lens shape is symmetrical to that represented by the equation with respect to y=L/2.

Figure 35C:
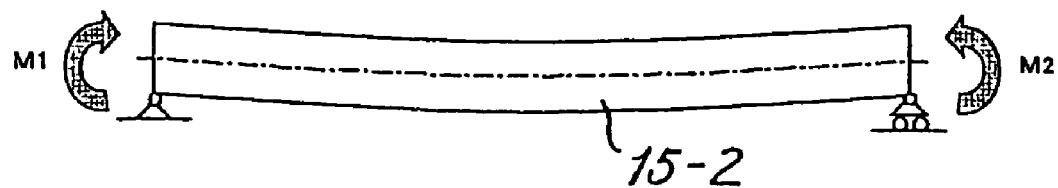

Bending correction for the long lens 15-2 at the time when a bending moment is applied to the long lens 15-2 from the outside is examined. FIG. 35C is a diagram of a long lens shape at the time when bending moments M1 and M2 are applied to the left and the right lends of the long lens 15-2, respectively. In an area from the left end to the right end of the long lens 15-2 ($0 \leq y \leq L$), a long lens shape (a deflected curve: Vz) is represented by $$Vz=(y/6EIL) \times \{(M1-M2)y^2-3M1 \cdot L \cdot y+(2M1+M2)L^2\} \quad (12)$$

Note that, when M1=M2=M, it is possible to modify the equation as follows.

$$Vz=(M/2EI) \times y(L-y) \quad (13)$$

A result of bending correction for the long lens 15-2 by an action of an external force is as described below. A shape at the time when the load W is applied to the center of the long lens 15-2 before bent shape adjustment (the long lens having initial bending) is derived by superimposition (addition) of an "initial shape of the long lens" and the "shape represented by Equation 10 or Equation 11 (a cubic polynomial)". Similarly, when the bending moments M1 and M2 are applied at both the left and the right ends of the long lens 15-2 before bent shape adjustment, the shape is obtained by superimposing the "initial shape of the long lens" and the "shape represented by Equation 12 or Equation 13 (a quadratic polynomial)".

Figure 34A:
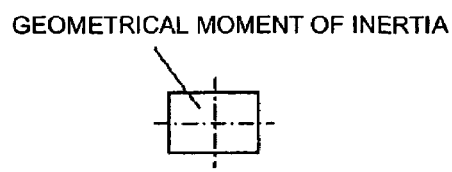
FIGS. 34A to 34C are diagrams of a state of bending correction for the long optical element according to an action of an external force according to the first embodiment.
Figure 34B:
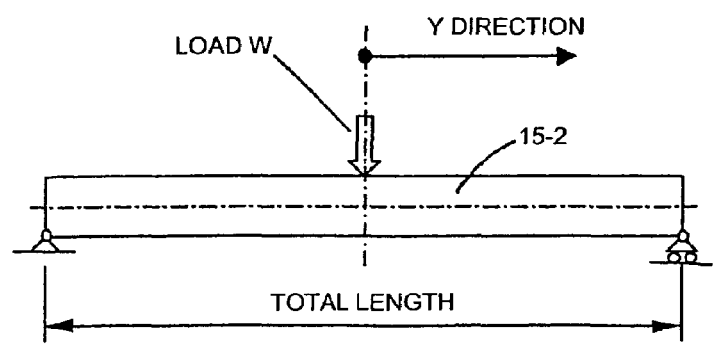
Figure 34C:
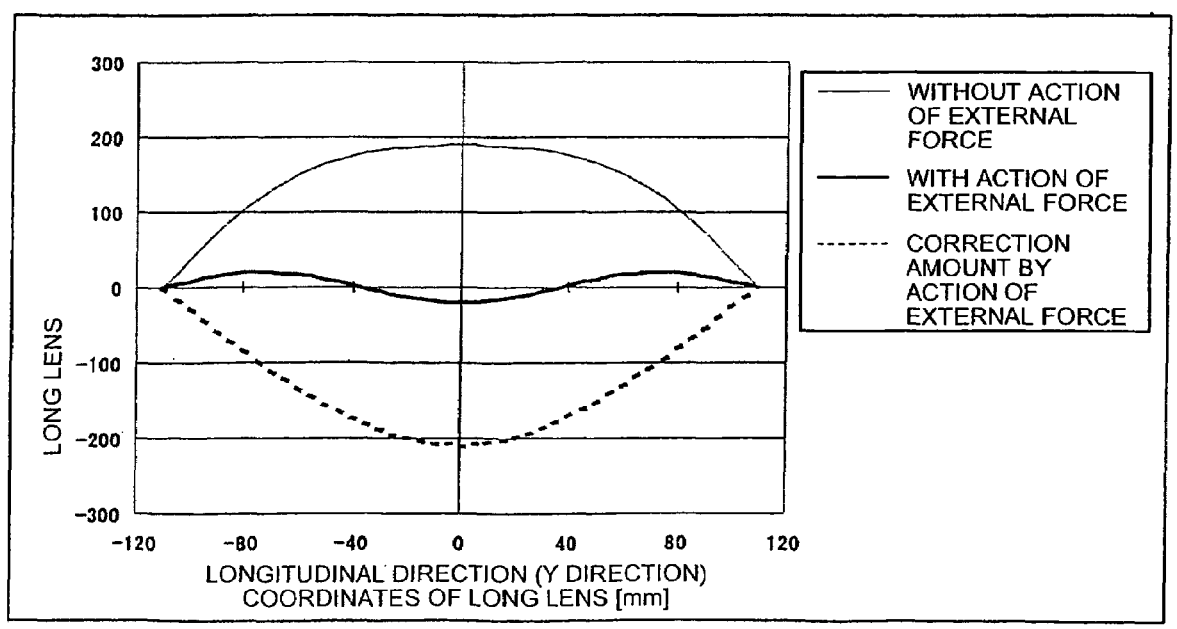

An example of the shape is shown in FIGS. 34A to 34C. As shown in FIGS. 34A and 34B, both ends of a long lens model made of resin (the Young's modulus E=2500 MPs) having the geometrical moment of inertia I of a section orthogonal to the longitudinal direction of 2133 mm$^4$ and the total length L of 220 mm are rotationally supported and the load of 5.0 newtons is applied to the center of the long lens. An initial shape (a shape before correction) of the long lens represented by a thin solid line in FIG. 34C assumes a shape "convex upward" (the number of peaks: 1) with a width (PV) of 190 μm. When the load (the external force) W is applied to the center of the long lens, a curve (PV is 40 μm and the number of peaks is three) of an M shape represented by a thick solid line in FIG. 34C is obtained. A broken line in FIG. 34 indicates a deflected curve at the time when the load W is applied to the center of an imaginary straight long lens. The broken line means a correction curve at the time when a load is applied to a long lens having an arbitrary shape, that is, a correction amount due to an action of an external force. In other words, it is possible to derive the curve of an M shape by superimposing the initial shape of the long lens and the correction curve one on top of another. Note that, as it is evident from Equation 11, the correction curve is a cubic curve.

In a shape adjustment process for the long lens, it is advisable to divide adjustment into rough adjustment and fine adjustment. As explained above, it is possible to eliminate a "large bending component" from the long lens before shape adjustment as the "rough adjustment" by applying one external force (load, bending moment, etc.) to the long lens 15-2. In an adjustment process after that, correction of a "shape of the long lens after eliminating the large bending component" only has to be performed as the "fine adjustment". When the fine adjustment is performed, it is possible to use another external force in addition to the external force used for the rough adjustment. Therefore, in general, adjustment accuracy (an adjustment residual amount) after the shape adjustment ends (at the time when the fine adjustment ends) depends on a shape (in particular, the number of peaks) at the time when the rough adjustment ends rather than a width (PV) in the initial shape (the shape before the rough adjustment). If the shape at the time when the rough adjustment ends is a shape with the number of peaks equal to or less than three, as described later, it is possible to perform adjustment capable of attaining high adjustment accuracy without complicating adjustment work.

As described above, it is possible to remove the "large bent shape" component in the long lens 15-2 before adjustment by applying at a preliminary assembly stage (a stage before starting adjustment work) in the "bending adjustment process for the long lens 15-2". By eliminating a large bending component at an initial stage in bending adjustment, it is possible to grasp a state (tendency) of bending of the long lens 15-2 and efficiently perform in the following steps. After molding conditions are stabilized and an individual difference of initial shapes is reduced or after it becomes possible to highly accurately predict an initial shape, it is possible to set an external force suitable for the initial shape, that is, the number of peaks and positions thereof. The external force suitable for the initial shape means the number of adjustment places by the external force and positions where the external force is applied.

It is unnecessary to increase a pressing force of an elastic member for pressing and fixing the long lens. It is possible to highly accurately perform bending correction for the long lens.

In a process from trial production to mass production of the long lens, molding conditions (e.g., molding temperature, molding pressure, and cooling time) for the long lens are optimized. From the viewpoint of production management, usually, a reduction of fluctuation (individual differences) among samples is often preferentially examined rather than a reduction of a size of bending (PV) of the long lens. Therefore, as described above, it is often possible to eliminate the large bending component of the long lens with a set value at the preliminary assembly stage.

On the other hand, when the molding conditions are not sufficiently stabilized, for example, immediately after changing the molding conditions according to a change of a molding material or correction of a die, instead of using the set value at the preliminary assembly stage, it is sufficient to eliminate the large bending component by applying an external force to the long lens and grasp a state (tendency) of bending in a first stage of an adjustment process, that is, first adjustment work after adjustment work is started. When initial bending occurs in the long lens, the initial bending often occurs in a symmetrical shape with respect to the center of the long lens. Therefore, it is desirable to symmetrically apply the external force to the long lens.

To realize highly accurate bending adjustment for the long lens, naturally, it is desirable that there are many adjustment places (the number of external forces applied to the long lens is large). However, as the number of adjustment places increase, an adjustment process becomes complicated and takes longer time. As a result, an increase in adjustment cost is caused. If there are three (or less) adjustment places, even when the respective adjustment places do not independently operate (when one external force applied affects other adjustment places), it is possible to relatively easily accomplish the adjustment work. If there are three adjustment places, it is possible to relatively easily perform highly accurate shape adjustment for a long lens of a curved shape having three peaks as described later. Note that, when there are four or more adjustment places and the respective adjustment places do not independently operate, adjustment work is complicated. Thus, it is difficult to complete highly accurate adjustment in a short time.

Figure 37:
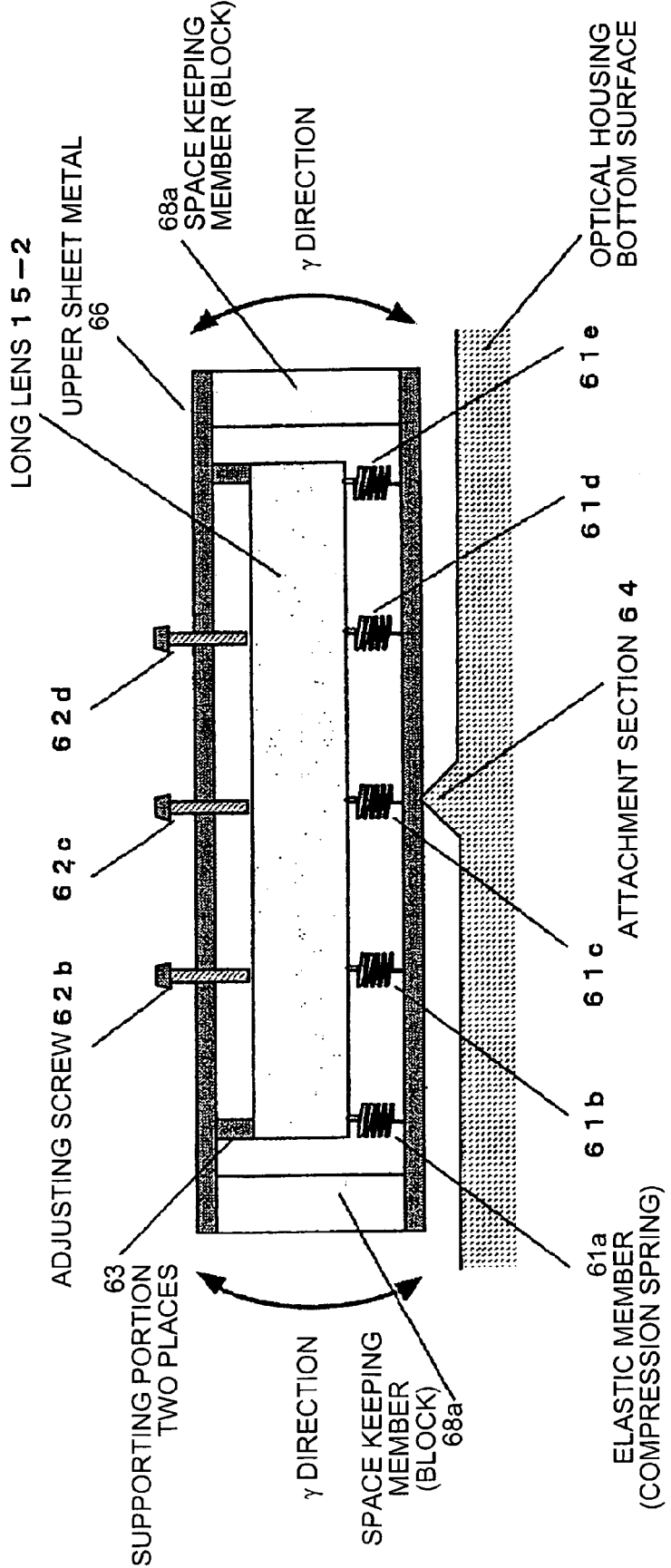
FIG. 37 is a front view of a fourteenth example of the holding mechanism for the long optical element according to the first embodiment.

FIG. 37 is a diagram of a thirteenth example of the holding mechanism for the long optical element. In FIG. 37, the long lens 15-2 is pressed against and fixed to the bent sections (the supporting portions) 63 formed on both the sides of the upper sheet metal 66 by two elastic members (compression springs) 61a and 61e provided on lower sides at both the ends of the long lens 15-2. Three adjusting screws (adjustment members) 62b, 62c, and 62d are screwed in the center and the middle portions between the center and both the ends of the upper sheet metal 66. Three compression springs 61b, 61c, and 61d are arranged to make it possible to compete against pressing forces of the adjusting screws 62b to 62d. It is possible to press and deform the long lens 15-2 by pushing in or pulling out the adjusting screws. The shape adjusting mechanism is arranged on the support member 64 provided on the optical housing bottom surface. It is possible to adjust rotation (tilt) in a direction of an arrow in the figure (the γ rotation direction) with the vertex of the support member 64 as a rotation axis using a not shown actuator (e.g., a stepping motor).

By adjusting pressed deformation and tilt of the long lens 15-2, more specifically, the "bus" of the long lens, it is possible to correct a scanning line shape ("scanning line bending" and "scanning line tilt") on a surface to be scanned (e.g., a photosensitive drum surface) in the optical scanning device including the long lens 15-2.

To realize improvement of adjustment resolution, it is possible to adopt the adjustment member 67 including the "adjusting screw having a taper section" 71 and the "roller (a cylindrical shape)" 70 explained with reference to FIGS. 20 and 33.

Figure 38:
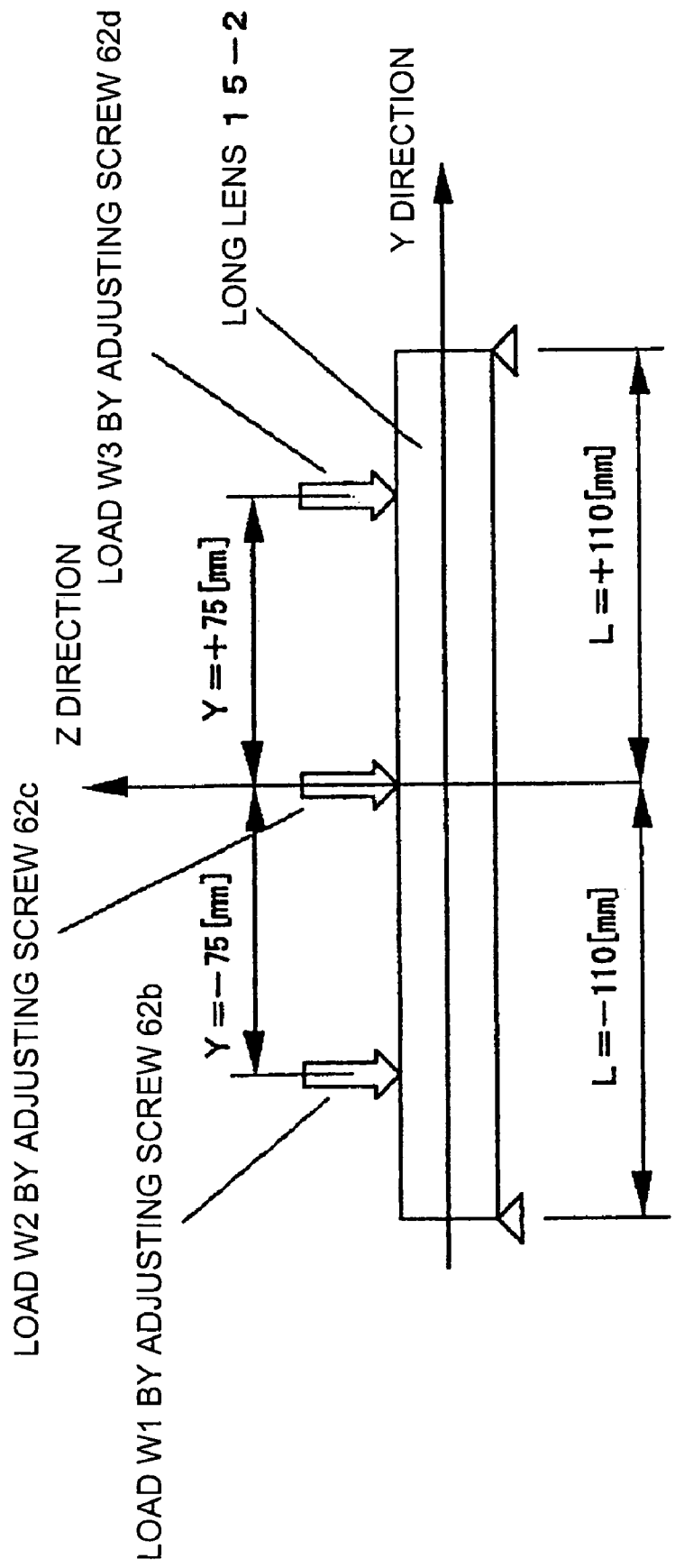
FIG. 38 is a front view of the shape adjusting mechanism for the long optical element according to the first embodiment including examples of numerical values.

An adjustment error at the time when the shape adjusting mechanism shown in FIG. 37 is applied in the model of the long lens schematically shown in FIG. 38 is examine. Both the ends of the long lens 15-2 having the length L from both the ends to the center in the longitudinal direction in a range of ±110 mm and the total length of 220 mm are simply supported (rotationally supported). Three loads W1 to W3 are applied as follows.

W1→Y=−75 mm (adjusting screw 62b)
W2→Y=0 mm (adjusting screw 62c)
W3→Y=+75 mm (adjusting screw 62d)

Note that the geometrical moment of inertia I and the Young's modulus E of a material are set to 2123 mm$^4$ and 2500 MPa, respectively.

Figure 36:
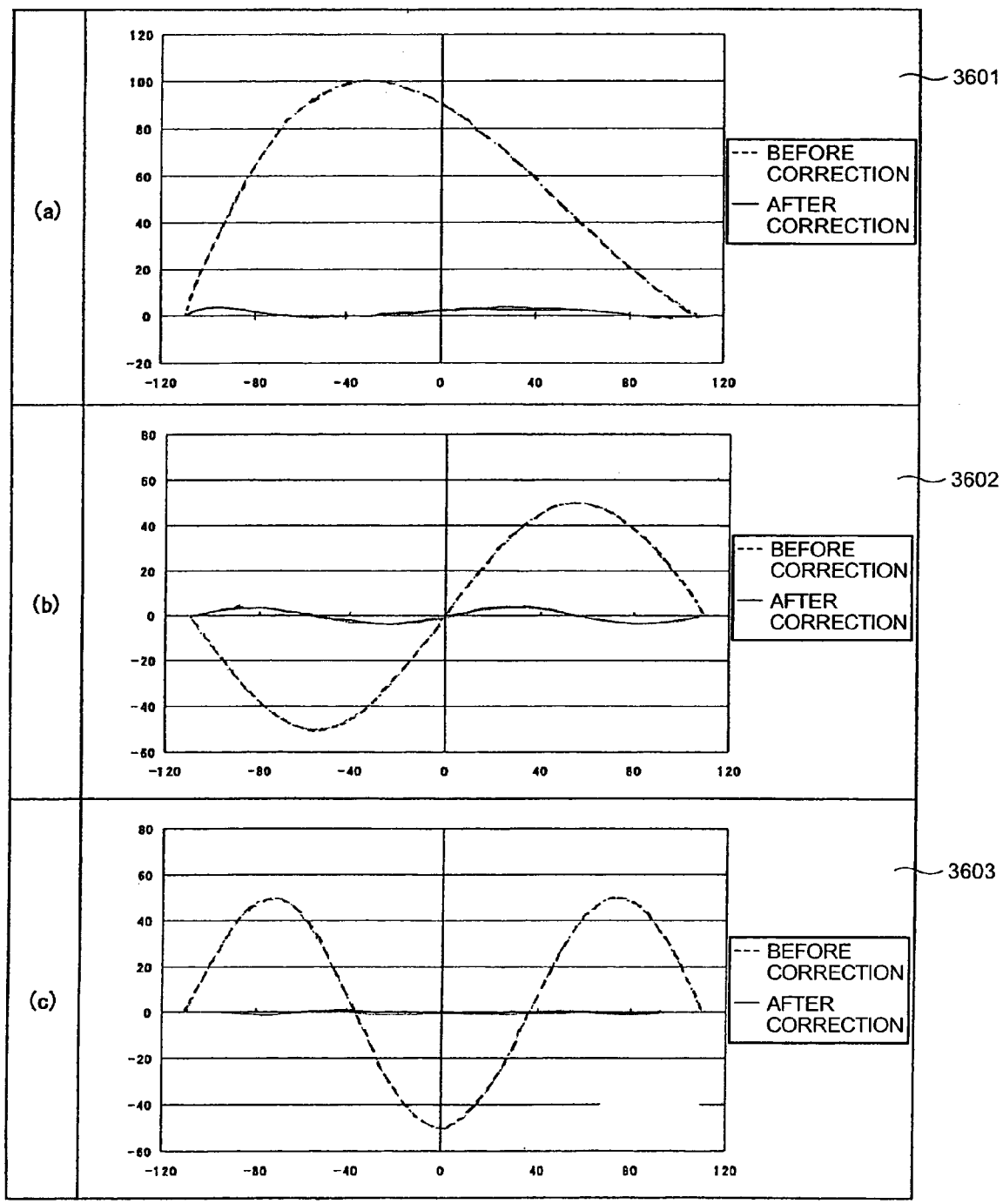
FIG. 36 is a graph of various modifications of the long optical element according to the first embodiment and examples of an adjustment residual shown in an imaginary fashion.

Three types (the number of peaks is one to three, PV is 100 μm) of imaginary shapes indicated by broken lines in sections denoted by reference numerals 3601 to 3603 in FIG. 36 are assumed as an initial shape of the long lens 15-2. An imaginary shape at the time when there is one peak is shown in the diagram denoted by reference numeral 3601. An imaginary shape at the time when there are two peaks is shown in the diagram denoted by reference numeral 3602. An imaginary shape at the time when there are three peaks is shown in the diagram denoted by reference numeral 3603.

Results obtained by deriving adjustment residuals at the time when long lenses with these initial shapes are subjected to bending adjustment with the loads W1 to W3 are indicated by solid lines in the sections denoted by reference numerals 3601 to 3603 in FIG. 36. It is desirable to set an adjustment residual to about 10 μm or less taking into account a change in a bent shape at the time of a temperature change and positioning accuracy among photosensitive drums. In this examination, an adjustment residual equal to or less than 7 μm could be attained. Results of the examination are shown in Table 1.

TABLE 1

| | PV of long lens shape [μm] | | | | | |
|---|---|---|---|---|---|---|
| Shape | Number of peaks | Before adjustment (*1) | After adjustment (adjustment residual) | Pressing force [N] (*2) | | |
| | | | | W1 | W2 | W3 |
| (a) Convex upward (asymmetric) | 1 | 100 | 4.2 | +9.0 | −0.7 | −2.9 |
| (b) Sin function | 2 | 100 | 6.8 | +11.5 | 0.0 | +11.5 |
| (c) Cos function | 3 | 100 | 1.9 | +33.2 | −31.8 | +33.2 |

In Table 1, "before adjustment" indicated by (*1) means a long lens shape in a state in which an external force is applied to the long lens to eliminate a large bending (quadratic polynomial or cubic polynomial) component at a preliminary assembly stage or at a first stage in an adjustment process, that is, "before fine adjustment". A plus sign of a part indicated by (*2) indicates a downward pressing force and a minus sign indicates an upward pressing force.

Note that, in this example, it is assumed that the imaginary shapes indicated by the broken lines in the sections denoted by reference numerals 3601 to 3603 in FIG. 36 are obtained by eliminating the large bending component (the cubic polynomial) with pressing (the load W2) of the adjusting screw 62c in the center of the long lens at the first stage (first adjustment work after adjustment work is started) of the adjustment process.

As shown in Table 1, if the number of peaks is equal to or less than three, it is possible to realize highly accurate adjustment with pressing forces equal to or less than 40 newtons (more accurately, equal to or less than 33.2 newtons). Note that, when a pressing force exceeds 40 newtons, limitations in terms of a layout of mechanisms (which make it difficult to reduce a size and weight) occur. For example, an elastic member (a coil spring, a leaf spring, etc.) for generating the pressing force is increased in size and an increase in rigidity of components constituting an adjusting mechanism is required. In addition, an increase in component cost is often caused.

On the other hand, if a long lens having a shape error (a width of a bent shape: PV) of a long lens shape before fine adjustment equal to or less than 10 μm is used, it is possible to reduce an external force (a pressing force) required for adjustment to 40 newtons or less. It is possible to realize a reduction in size/weight of the adjusting mechanism and a reduction in cost.

Figure 39:
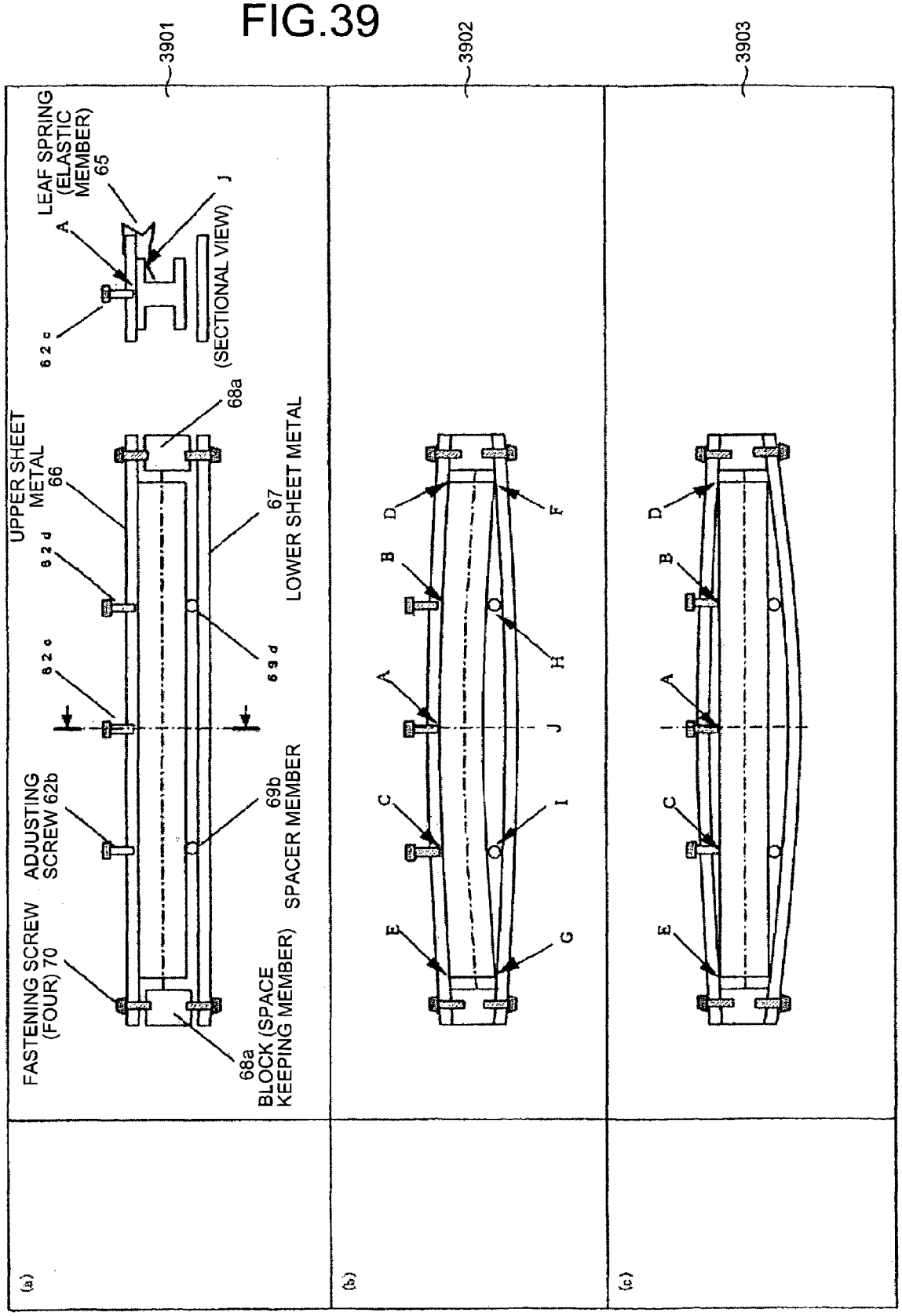
FIG. 39 is a front view of still another example of the long optical element according to the first embodiment before and after adjustment of a shape.

FIG. 39 is a diagram of a fourteenth example of the shape adjusting mechanism for the long lens. Components in the fourteenth example are schematically shown in a diagram denoted by reference numeral 3901. The "upper sheet metal 66" and a "lower sheet metal 67" serving as sheet metal components longer than the long lens 15-2 are arranged on the upper side and the lower side of the long lens 15-2. Space keeping members 68a consisting of blocks for keeping a space between the upper sheet metal 66 and the lower sheet metal 67 are arranged on both the left and the right sides of the long lens 15-2. Height in the vertical direction of the Space keeping members 68a is set slightly lower than the height of the long lens 15-2 (e.g., about several tens μm to several hundred μm). The three adjusting screws 62b, 62c, and 62d are screwed in the upper sheet metal 66. Two spacer members 69b and 69d are arranged immediately below the two adjusting screws 62b and 62d in the space between the lower sheet metal 67 and the long lens 15-2. Height of the spacer members 69b and 69d only has to be set to about several tens μm to several hundred μm according to data of other components such as thickness and width of the upper and the lower sheet metals 66 and 67 and height of the Space keeping members 68a.

The leaf spring 65 serving as the elastic member is provided in the upper sheet metal 66. A pressing force (an elastic force) of the leaf spring 65 acting on the long lens 15-2 is opposed to a pressing force generated by the remaining one of the adjusting screws (62c). Regardless of a push-in amount of the adjusting screw 62c, an upward pressing force (a pressing force to the upper sheet metal 66) is always applied to the long lens 15-2.

After arranging the respective components in this way, the upper sheet metal 66 and the lower sheet metal 67 are fastened to the two Space keeping members 68a by four fastening screws 70a to 70d. A state at this point is shown in a diagram denoted by reference numeral 3902. The long lens 15-2 is nipped at both the upper and the lower ends (indicated by signs D, E, F, and G) by the upper sheet metal 66 and the lower sheet metal 67 and held (fixed) inside the long lens shape adjusting mechanism according to the present embodiment. Height of the Space keeping members 68a is set lower than the height of the long lens 15-2 and the spacer members 69b and 69d are inserted between the long lens 15-2 and the lower sheet metal 67. Thus, in this state, the long lens 15-2 and the upper sheet metal 66 assume a shape "convex upward" and the lower sheet metal 67 assumes a shape "convex downward". In this case, the upper sheet metal 66 and the lower sheet metal 67 function as elastic members. In particular, the lower sheet metal 67 plays a function for elastically pressing the lower surface of the long lens 15-2 via the two spacer members 69b and 69d. This stage in shape adjustment is referred to as the "preliminary assembly stage".

As the next step of the preliminary assembly stage shown in the diagram denoted by reference numeral 3902, it is sufficient to correct a shape of the long lens 15-2 while appropriately adjusting push-in amounts and pull-out amounts of the adjusting screws 62b, 62c, and 62d. In this case, the shape of the long lens 15-2 may be directly monitored or "scanning line bending" on a surface to be scanned may be corrected using a result of monitoring according to a purpose. As described above, the leaf spring 65 is arranged to be opposed to the adjusting screw 62c provided in the center. Thus, it is possible to always keep the adjusting screw 62c in a state in which the adjusting screw 62c presses the long lens 15-2. On the other hand, it is possible to always keep the adjusting screws 62b and 62d provided in the middle portions in a state in which the adjusting screws 62b and 62d press the long lens 15-2 according to an action of a pressing force of the spacer members 69 generated by an elastic force of the lower sheet metal 67 serving as the elastic member.

In this way, the long lens 15-2 is elastically pressed and fixed in five places (A-J, B-H, C-I, D-F, and E-G) in the vertical direction. Thus, even if aged deterioration or a change in environmental temperature occurs, it is possible to control fluctuation in an adjustment value for a shape. A state in which bending adjustment ends is shown in a diagram denoted by reference numeral 3903. In this section, the long lens 15-2 is in a straight state. It is possible to adjust the long lens 15-2 of the shape "convex upward" to be in a substantially straight state at the preliminary assembly stage by pushing in the three adjusting screws 62b, 62c, and 62d to near a straight line connecting signs D and E at both the ends in the longitudinal direction of the long lens 15-2 (i.e., arranging signs A to E on one straight line). It goes without saying that, to create a desired (arbitrary) long lens shape (as a result, scanning line shape), push-in amounts of the three adjusting screws only has to be adjusted appropriately.

When the constitution in the fourteenth example is adopted, it is unnecessary to arrange an elastic member (a compression spring, etc.) on the lower side of the long lens compared with the adjusting mechanism according to the thirteenth example. Thus, it is possible to realize a reduction in size of the device and realize a reduction in cost.

Figure 40:
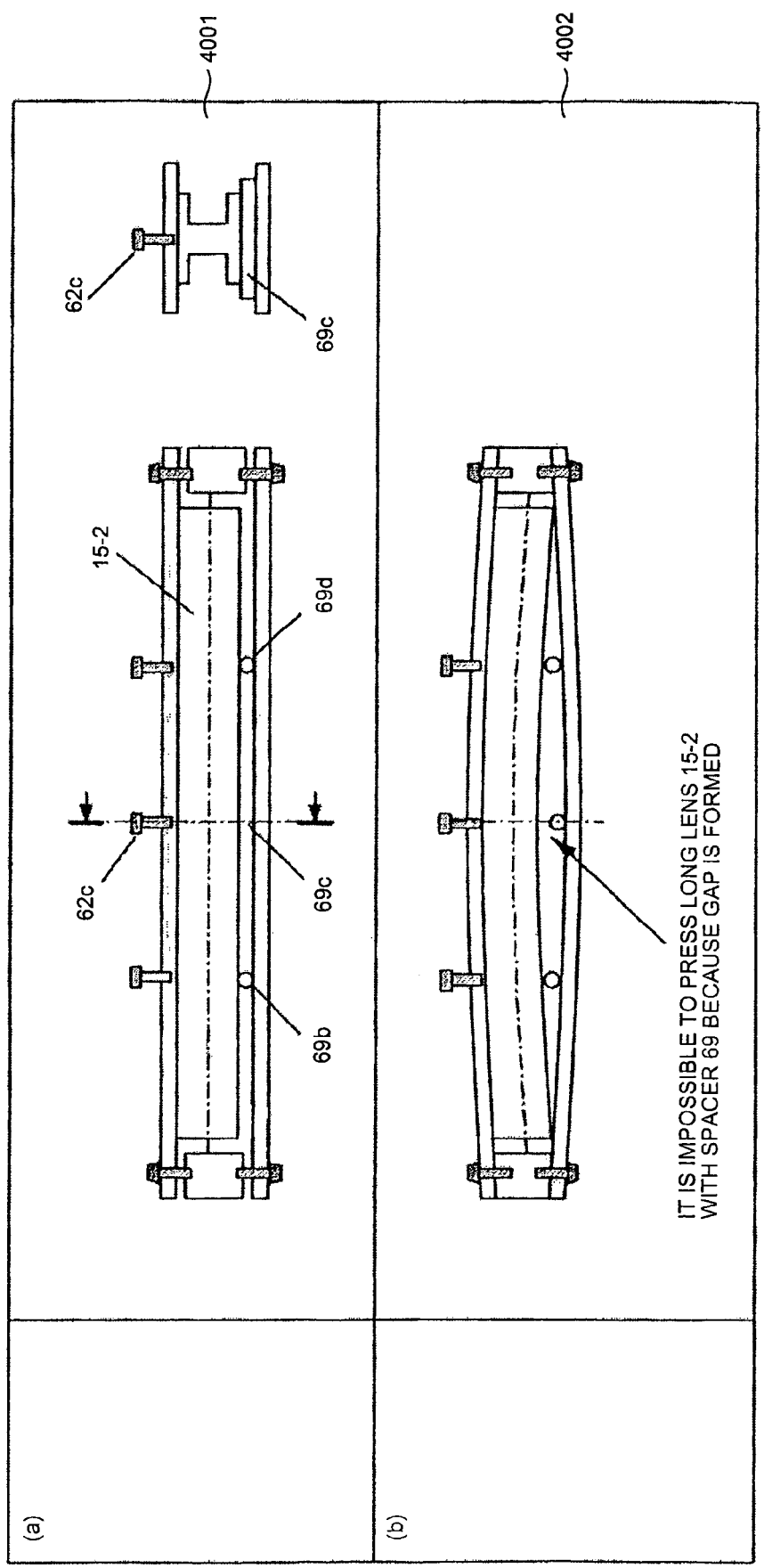
FIG. 40 is a front view of still another example of the long optical element according to the first embodiment before and after adjustment of a shape.

On the other hand, it is conceivable to insert a third spacer member 69c between the long lens 15-2 and the lower sheet metal 67 instead of the leaf spring 65 corresponding to the adjusting screw 62c in the center as shown in a diagram denoted by reference numeral 4001 in FIG. 40. However, in such a constitution, the lower sheet metal 67 is formed in a shape convex downward. Thus, as shown in a diagram denoted by reference numeral 4002, it is likely that the spacer member 69c corresponding to the adjusting screw 62c in the center does not come into contact with the long lens 15-2 and does not function as pressing means. Therefore, this is not a desirable constitution.

Figure 41:
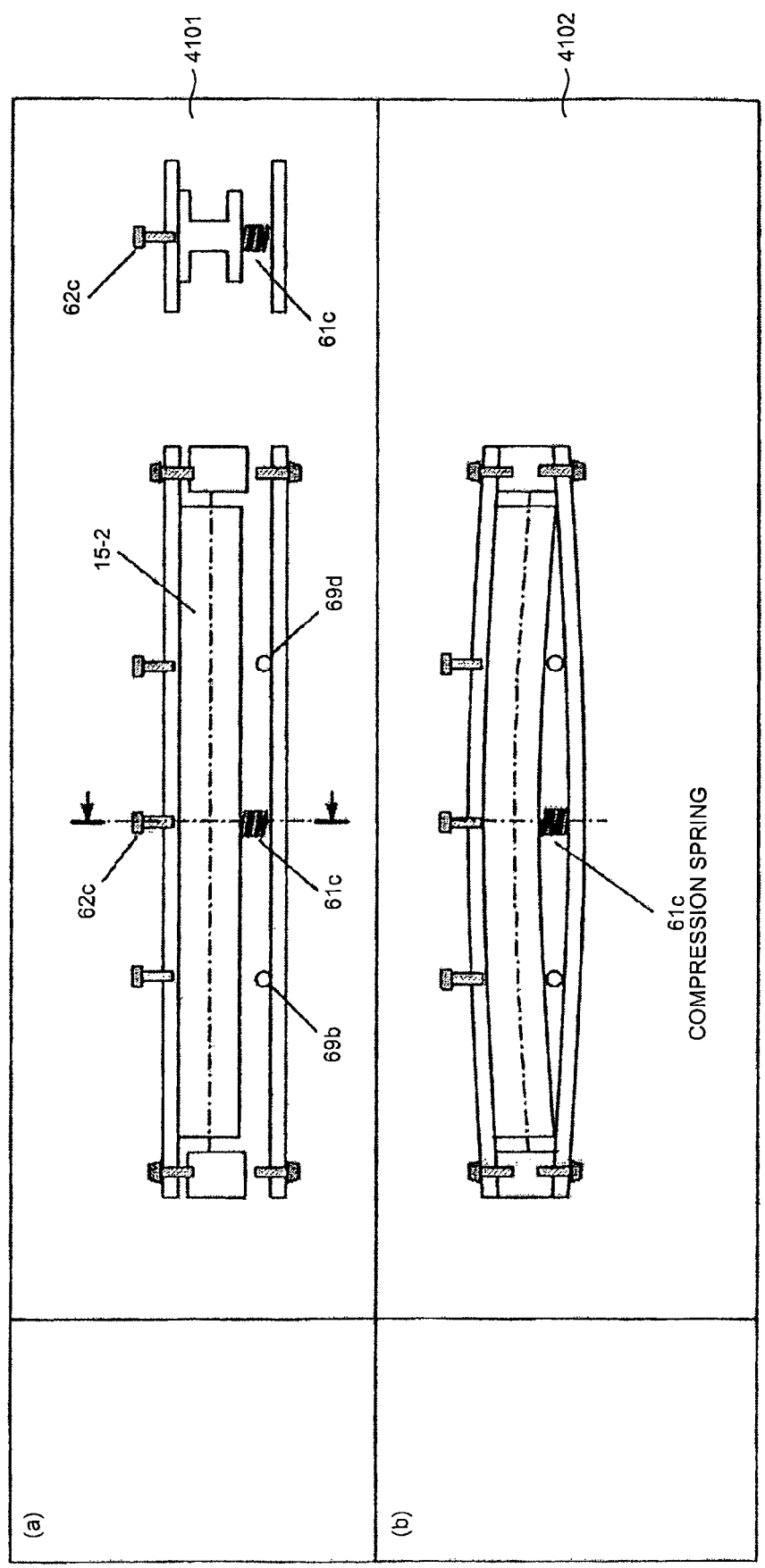
FIG. 41 is a front view of still another example of the long optical element according to the first embodiment before and after adjustment of a shape.

Note that, if the elastic member 61c (a leaf spring, a coil spring, etc.) generating an elastic force opposed to the adjusting screw 62c is arranged between the long lens 15-2 and the lower sheet metal 67 instead of the spacer member 69c as shown in a diagram denoted by reference numeral 4101 in FIG. 41, it is possible to always apply a pressing force to the long lens 15-2 as shown in a diagram denoted by reference numeral 4102 in FIG. 41. Therefore, this is a desirable constitution.

It is possible to implement the shape adjusting method for the holding mechanism for the long optical element and the long optical element according to the embodiments explained above in, for example, the optical scanning device shown in FIG. 1 already explained. In the optical scanning device, it is possible to improve accuracy of a shape of a scanning line on a surface to be scanned thereof.

It is likely that a shape of the long optical element held by the holding mechanism changes because of an influence of a change in any one of elapsed time and environmental temperature and humidity or both. In such a case, it is sufficient to separately provide a detecting unit for detecting the change in the shape and change an amount of projection of the support member (the adjusting screw) and the γ rotation angle of the holding mechanism based on a result of the detection by the detecting unit. It is possible to realize a reduction in size and a reduction in cost by using, for example, an actuator such as a stepping motor, which can be driven by a pulse signal, as a driving source for the adjusting screw and the holding mechanism.

It is also possible to predict a shape change of the long optical element by detecting a shape of a scanning line. Therefore, a scanning line shape on a surface to be scanned or a surface optically equivalent to the surface to be scanned may be detected rather than a shape of the long optical element. Since an arbitrary detection sensor only has to be selected and used as a detecting unit for a scanning line shape, a detailed explanation of the detecting unit is omitted.

It is advisable to apply the optical scanning device to an image forming apparatus and a four-drum tandem image forming apparatus to which the electrophotographic process is applied. These image forming apparatuses are as explained above. As in the image forming apparatus, in particular, the four-drum tandem image forming apparatus, when a color image is obtained by superimposing images formed by different photosensitive drums one on top of another, if there is a deviation in scanning line shapes on respective photosensitive drums, sub-scanning dot position deviation occurs. As a result, deterioration in a quality of an output image such as color misalignment of the output image is caused. Vibration at the time of transportation of an image forming apparatus after being assembled and adjusted in a factory and shipped from the factory or at the time of installation at a user destination, aged deterioration, rise of temperature in the apparatus due to continuous print output during use at the user destination, or the like often causes the deterioration in quality of an output image.

If the optical scanning device according to the embodiment is used as a device for executing an exposure process for an image forming apparatus that outputs an image by executing the electrophotographic process, it is possible to control a deviation in scanning line shapes among the photosensitive drums. Thus, it is possible to obtain a high-quality output image (with less color misalignment).

As in the four-drum tandem image forming apparatus shown in FIG. 6, it is advisable to form the toner image for color misalignment detection 55a for detecting color misalignment among the photosensitive drums on the transfer belt 31 and detect the toner image for detection 55 with the sensor for color misalignment detection 56. By adopting such a constitution, it is possible to derive a shape of a long lens (e.g., a second scanning lens) and adjust the long lens based on the shape. Since the detecting unit is provided on the transfer belt 31 close to an output image that is a final output rather than bending or tilt of the long lens itself or scanning line bending, it is possible to perform more highly accurate feedback adjustment and form a higher-quality image.

According to the holding mechanism for the long lens according to the present embodiment, it is possible to obtain effects described below. It is possible to satisfactorily keep a "deflection degree" of the long lens. It is also possible to correct a shape of a scanning line, that is, any one of scanning line bending and scanning line tilt or both by adjusting a deflective deformation amount of the long lens. It is also possible to adjust deflective deformation in a short time, easily, and highly accurately with a component constitution capable of reducing cost.

According to the optical scanning device including the holding mechanism for the long lens according to the present embodiment, it is possible to draw a scanning line with a satisfactory shape as intended on a surface to be scanned. It is also possible to correct deformation of a scanning line shape due to an influence of vibration, aged deterioration, a temperature change, or the like. It is also possible to detect a scanning line shape easily and highly accurately and correct the scanning line shape easily and highly accurately based on a result of the detection.

According to the image forming apparatus including the optical scanning device, it is possible to output a high-quality image. It is also possible to perform easy and highly accurate feedback correction of a deflective deformation amount of a long optical element by detecting the deflective deformation amount of the long optical element and form a higher-quality image.

According to the shape adjusting method or the shape adjusting device for the long optical element according to the present embodiment, it is possible to bend and deform the long optical element into a shape as intended and adjust the shape by using the holding mechanism for the long optical element that can obtain the effects described above and adjusting deflective deformation of the long optical element with the adjustment member for the long optical element.

Figure 42:
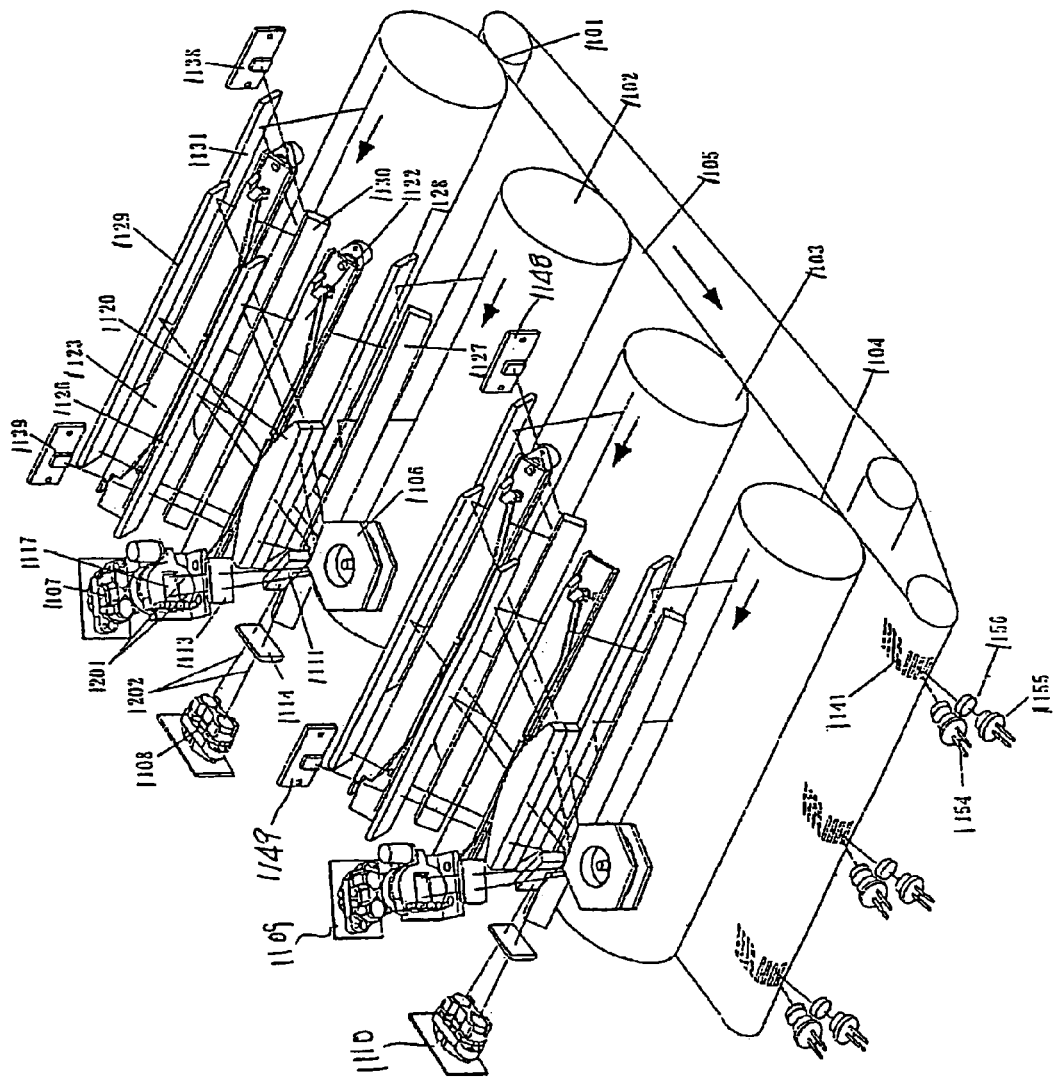
FIG. 42 is a perspective view of an example of an optical scanning device according to a second embodiment of the present invention.

FIG. 42 is an optical scanning device applicable to a tandem image forming apparatus that performs scanning using four stations according to a second embodiment of the present invention. In the optical scanning device consisting of the four stations, two stations are arranged on the left and the right of the device, respectively. One polygon mirror serving as a deflector is arranged for the two stations and shared by the two stations. The respective stations individually constitute optical scanning units and are arranged in parallel with optical scanning directions on a surface to be scanned aligned. Four photosensitive drums 1101, 1102, 1103, and 1104 corresponding to the respective stations are arranged at equal intervals along a moving direction of a transfer belt 1105 and sequentially form toner images of different colors. The toner images of the respective colors formed by the respective photosensitive drums are transferred on to a not-shown transfer member to be superimposed one on top of another to form a color image.

The optical scanning device for scanning the respective photosensitive drums is integrally constituted by a not-shown housing and uses light beams to perform scanning with polygon mirrors 1106. Since rotation directions of the polygon mirrors 1106 are identical, images are drawn such that positions for start drawing the images coincide with one another. According to the present embodiment, a pair of semiconductor lasers is arranged for each of the photosensitive drums and scanning is performed with one line pitch shifted according to recording density in a sub-scanning direction to scan two lines at the same time. Since constitutions of the respective optical scanning units are identical, the optical scanning unit on one side having the polygon mirror 1106 in the center is explained. Light source units are arranged such that emitting positions are different in the sub-scanning direction for each of the light source units, according to the present embodiment, light source units 1107 and 1108 are arranged such that emitting positions are different by a predetermined height, 6 mm according to the present embodiment. A laser beam 1201 from the light source unit 1108 is bent by an incidence mirror 1111 and made incident on the polygon mirror 1106 with a main scanning direction thereof brought close to a laser beam 1202 from the light source unit 1107 directly traveling to the polygon mirror 1106. Each of the light source units 1107 and 1108 has a coupling lens that condenses divergent light radiated from the semiconductor laser serving as a light source therefor, changes the divergent light to a substantially parallel light beam, and couples the light beam to the following optical system. According to the present embodiment, the coupling lens is referred to as a first focusing optical system.

Cylindrical lenses 1113 and 1114 are arranged between the respective light source units 1107 and 1108 and the polygon mirror 1106. The cylindrical lenses 1113 and 1114 have planes on one side and convex cylindrical surfaces consisting of a curvature common in the sub-scanning direction on the other and are arranged such that optical path lengths to a deflection point of the polygon mirror 1106 are equal. Respective light beams are converged only in the sub-scanning direction such that a line image long in the main scanning direction is formed near a deflective reflection surface of the polygon mirror 1106. The cylindrical lenses 1113 and 1114 constitute a second focusing optical system and are arranged in combination with a scanning and focusing optical system described later such that the deflection point and the surfaces of the photosensitive drums are in a conjugate relation. Consequently, the cylindrical lenses 1113 and 1114 form an optical face tangle correction optical system.

An unparallel flat plate 1117 is arranged between the light source unit 1107 and the cylindrical lens 1113. The unparallel flat plate 1117 is a glass substrate with one of the sides thereof slightly tilted in the sub-scanning direction. The unparallel flat plate 1117 is subjected to rotation control around an optical axis to adjust a relative scanning position with respect to a beam from the reference light source unit 1107.

The polygon mirror 1106 has six deflective reflection surfaces and is constituted in two stages according to the present embodiment. The polygon mirror 1106 is formed in a shape with a windage loss reduced by providing a groove such that a middle portion not used for deflection is slightly smaller in diameter than an inscribed circle of the polygon mirror 1106. Thickness of one layer of the polygon mirror 1106 is about 2 mm. Note that phases of upper and lower polygon mirror stages are identical.

The polygon mirror 1106 is driven to rotate at constant speed by a not-shown motor and deflects and reflects a laser beam from the light source unit with the respective deflective reflection surfaces. A scanning and focusing optical system serving as a third focusing optical system is arranged on a course of the laser beam deflected. The scanning and focusing optical system has a focusing lens 1120 serving as a first scanning lens. The focusing lens 1120 is also integrally molded or joined in two layers. The respective layers of the focusing lens 1120 are formed in a non-arc surface shape with power given such that a beam moves at constant speed on a photosensitive member surface in the main scanning direction following rotation of the polygon mirror 1106. Anamorphic lenses 1122 and 1123 serving as second scanning lenses for each beam are arranged on the course of the beam after transmitted through the focusing lens 1120. The focusing lens 1120 and the anamorphic lenses 1122 and 1123 constitute the scanning and focusing optical system. Beams are condensed on the surfaces of the photosensitive drums 1101 and 1102 to form a light spot. Scanning is performed with the light spot to form latent images on the surfaces of the photosensitive drums 1101 and 1102 and record images.

In the embodiment shown in FIG. 42, the two stations explained above form a pair and another pair of stations are arranged in parallel with the pair. In total, the four stations are arranged at equal intervals. The four stations are color stations of yellow, magenta, cyan, and black, respectively. Optical paths for the respective color stations are bent by a plurality of mirrors such that respective optical path lengths from the polygon mirrors to the photosensitive member surfaces coincide with one another and incidence positions and incidence angles with respect to the respective photosensitive drums arranged at equal intervals are equal. According to the present embodiment, three mirrors are arranged for one station.

The laser beam 1201 from the light source unit 1107 passes through the cylindrical lens 1113 and is deflected on the upper stage of the polygon mirror 1106. Then, The laser beam 1201 passes through the upper layer of the focusing lens 1120 and is reflected on a mirror 1126. The laser beam 1201 passes through the anamorphic lens 1122 and is reflected on the mirrors 1127 and 1128 to be guided to the photosensitive drum 1102 and form a magenta image in a second station.

The beam 1202 from the light source unit 1108 passes through the non-parallel flat plate 1117 and the cylindrical lens 1114 and is reflected on the incidence mirror 1111 and deflected on the lower stage of the polygon mirror 1106. Then, the beam 1202 passes through the lower layer of the focusing lens 1120 and is reflected on a mirror 1129. The beam 1202 passes through the anamorphic lens 1123 and is reflected on the mirrors 1130 and 1131 to be guided to the photosensitive drum 1101 and form a yellow image in a first station.

The remaining one pair of optical scanning units have the same constitution. Thus, a detailed explanation of the optical scanning units is omitted. Briefly, a beam from the light source unit 1109 is guided to the photosensitive drum 1104 and forms a black image in a fourth station. A beam from the light source unit 1110 is guided to the photosensitive drum 1103 and forms a cyan image in a third station.

Figure 43:
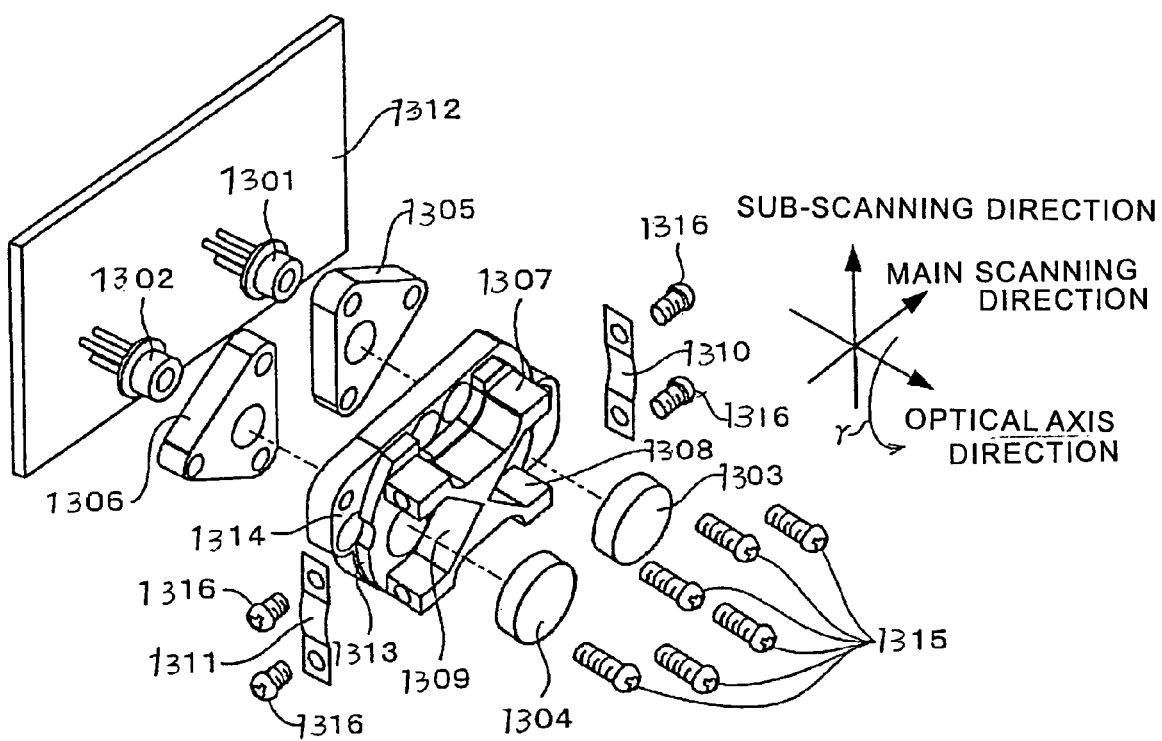
FIG. 43 is a disassembled perspective view of an example of a light source unit according to the second embodiment.

FIG. 43 is a perspective view of a light source unit. All light source units have an identical constitution. Semiconductor lasers 1301 and 1302 and coupling lenses 1303 and 1304 are arranged symmetrically in the main scanning direction with respect to an emission axis for each color scanning unit. The semiconductor lasers 1301 and 1302 are pressed into base members 1305 and 1306 from rear sides thereof with outer peripheries of packages fitted in the base members 1305 and 1306, respectively. The respective base members 1305 and 1306 are in abutment against a rear surface of a holder member 1307.

The base members 1305 and 1306 are in abutment against and held on the rear surface of the holder member 1307 with screws 1313 inserted through from front sides of the holder member 1307 at three points, respectively, screwed in the base members 1305 and 1306. Outer peripheries of the coupling lenses 1303 and 1304 are bumped against V grooves 1308 and 1309 formed to open in a direction opposite to the holder member 1307. The coupling lenses 1303 and 1304 are moved closer to the inner side by leaf springs 1310 and 1311 and fixed by screws 1316.

In this case, the coupling lenses 1303 and 1304 are fixed by adjusting an arrangement on abutment surfaces (surfaces orthogonal to optical axes) of the base members 1305 and 1306 such that light emitting points of the semiconductor lasers 1301 and 1302 are on optical axes of the coupling lenses 1303 and 1304 and adjusting positions on the V grooves (on the optical axes) such that emitted lights from the coupling lenses 1303 and 1304 become parallel light beams.

The optical axes of the emitted lights are tilted to a direction crossing each other with respect to emission axes. According to the present embodiment, tilt of a printed board 1312 serving as a support member is set such that a position of the crossing is near a reflection surface of the polygon mirror 1106.

The printed board 1312, on which a driving circuit is formed, is mounted to a pedestal vertically provided on the holder member 1307 and fixed by screws. Lead terminals of the respective semiconductor lasers 1301 and 1302 are inserted into through holes and soldered. Consequently, the light source units 1107, 1108, 1109, and 1110 are integrally constituted.

The light source units are positioned by inserting cylindrical sections 1313 of the holder member 1307 in engagement holes formed at different heights on a wall surface of the housing in which the optical scanning device is built. Abutment surfaces 1314 are bumped against the wall surface to screw the light source unit on the housing.

In this case, it is possible to adjust a beam spot interval on the surface to be scanned of the beams emitted by the two semiconductor lasers 1301 and 1302 to a scanned line pitch P corresponding to recording density by adjusting a tilt amount γ with the cylindrical section 1313 as a reference.

It is possible to increase the number of light beams used for scanning the photosensitive drums 1101, 1102, 1103, and 1104 by constituting a light source unit using a plurality of semiconductor lasers and combining a plurality of light source units as according to the present embodiment. This makes it possible to increase output speed of the image forming apparatus mounted with the optical scanning device. Conversely, when the output speed is not increased, it is possible to reduce rotation speed of the polygon motor. Thus, it is possible to reduce power consumption, calorific power, and the like and constitute an optical scanning device taking the environment into account.

In the embodiment described above, the semiconductor laser is used as the light source. It is possible to obtain equivalent effects by using a semiconductor laser array (a laser diode array: LDA), in which a plurality of light emitting points are arranged in array monolithically, as the light source. It is sufficient to couple divergent light beams emitted from the light emitting points with a common coupling lens and combines a plurality of pairs of the semiconductor layer array and the coupling lens to constitute a light source unit. Another light source may be constituted by using a surface-emitting laser array in which a plurality of light emitting points are arranged in array two-dimensionally.

Figure 44:
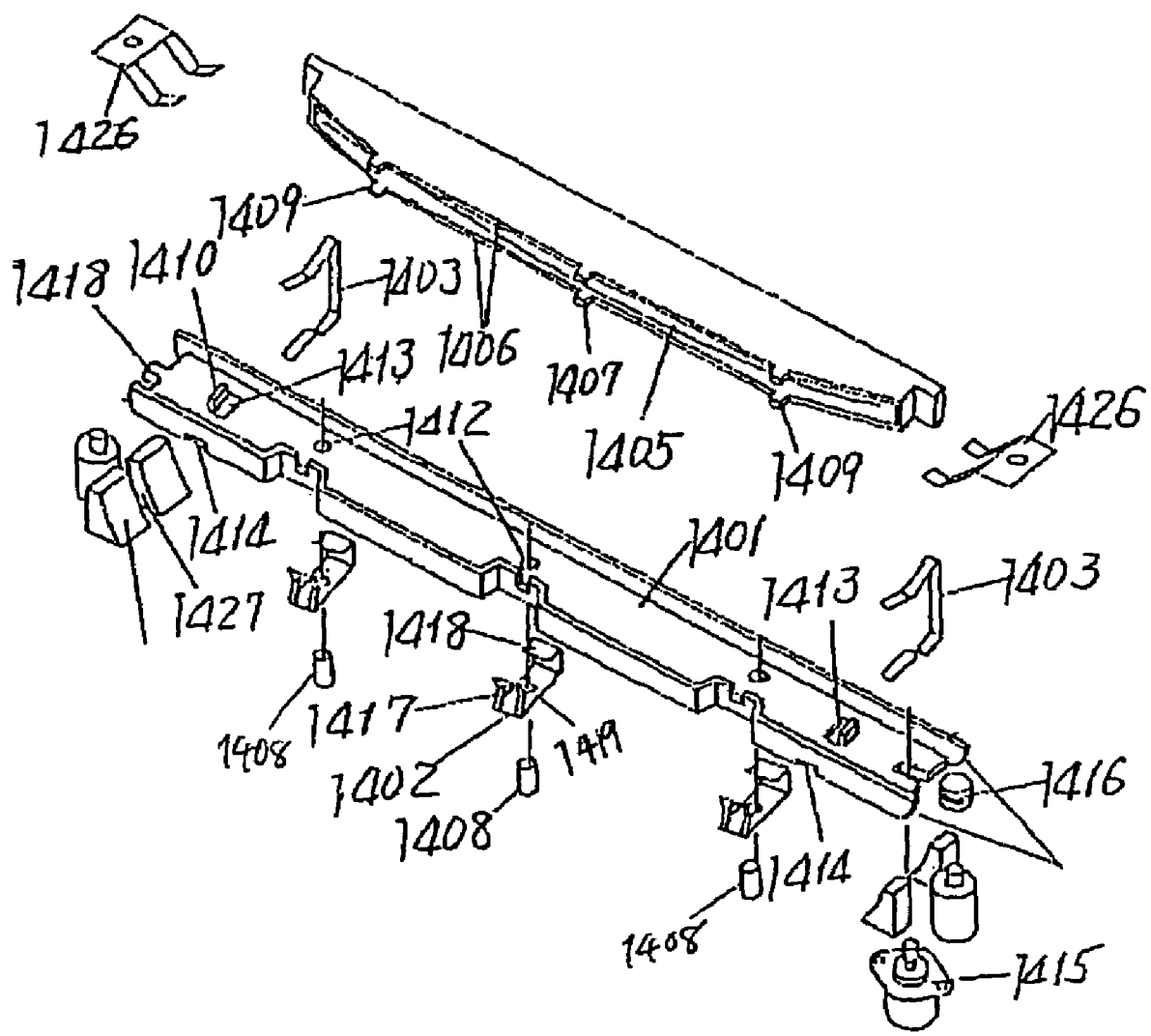
FIG. 44 is a disassembled perspective view of an example of an optical element holding structure according to the second embodiment.

FIG. 44 is a diagram of an example of a constitution of a support housing for an anamorphic lens that is a kind of a scanning lens constituting the scanning and focusing optical system. In FIG. 44, an anamorphic lens 1405 is made of resin. A rib section 1406 is formed to surround a lens section and a projection 1407 for positioning is formed at an edge on one side in the center in a longitudinal direction thereof. The anamorphic lens 1405 is supported by a support plate 1401. The support plate 1401 is formed in a channel shape by bending edges on both sides in a width direction of a long and slender sheet metal. The projection 1407 of the anamorphic lens 1405 engages with a cutout section formed in a bent section of the support plate 1401. A lower surface of the rib section 1406 is bumped against raised bent sections 1410 formed in positions close to one end in the longitudinal direction of the support plate 1401 to position the anamorphic lens 1405 in the longitudinal direction. The anamorphic lens 1405 positioned and the support plate 1401 are urged and nipped from above and below by a pair of leaf springs 1403 near both ends in the longitudinal direction. The anamorphic lens 1405 is held by the support plate 1401. The leaf springs 1403 are fitted in from the outside with the anamorphic lens 1405 laid on the support plate 1401. One ends of the leaf springs 1403 are stuck out to the inner side of the support plate 1401 from openings 1413 formed in a bottom of the support plate 1401. The ends of the leaf springs 1403 are inserted into openings 1414, which are formed in a base of the bent section of the support plate 1401, and fixed.

Screw holes 1412 are formed in the center in the longitudinal direction of the support plate 1401. Adjusting screws 1408 are screwed in the screw holes 1412 from a bottom surface side of the support plate 1401. Leaf springs 1402 are arranged in positions of the adjusting screws 1408 to be astride in the width direction of the support plate 1401 and hold the support plate 1401 from the bottom surface side. Bent sections at both ends of the leaf springs 1402 are hooked on an inner side on an upper surface of a lower side rib of the anamorphic lens 1405. The adjusting screws 1408 pierce through holes 1419 of the leaf springs 1402 and are screwed into the screw holes 1412 of the support plate 1401 to attach the leaf spring 1402. A lower surface of the rib of the anamorphic lens 1405 is in abutment against tips of the adjusting screws 1408. The leaf springs 1402 urge the anamorphic lens 1405 to be pressed against the support plate 1401. Consequently, the lower surface of the rib of the anamorphic lens 1405 is surely in abutment against the tips of the adjusting screws 1408. According to the present embodiment, the adjusting screws 1408 are arranged not only in the center in the longitudinal direction of the anamorphic lens 1405 but also near both the ends thereof, thus, three places in total.

In a long plastic optical element like the anamorphic lens 1405, warp tends to occur in the longitudinal direction, in particular, a direction orthogonal to a scanning surface because of molding conditions, residual stress, and the like. An amount of warp depends on a difference of a mold. The amount of warp may be several tens microns. A direction of warp also depends on a difference of a mold. Since the anamorphic lens 1405 is long and has low rigidity, deformation (warp) tends to occur in the anamorphic lens 1405 when only slight stress is applied thereto. The anamorphic lens 1405 is also deformed by a difference in thermal expansion if there is a temperature distribution in upper and lower parts thereof when an ambient temperature changes. Therefore, it is extremely difficult to highly accurately correct bending and scanning line tilt among respective stations.

In the embodiment described above, a shape of the anamorphic lens 1405 is kept stable by laying the anamorphic lens 1405 along the support plate 1401. Even if stress is locally applied to the anamorphic lens 1405 at the time of tilt adjustment described later, the anamorphic lens 1405 is not deformed. In other words, linearity of a bus is maintained. The support plate 1401 mounted with the anamorphic lens 1405 is positioned by fitting a projection 1418 formed at one end in the longitudinal direction in a recess 1427 provided on the housing side. Tips of leaf springs 1426 with the bases fixed to the housing side are interposed between the bottom surface of the anamorphic lens 1405 and an attachment surface of the housing to urge the one end of the anamorphic lens 1405 upward in FIG. 44.

On the other side (on the right side in FIGS. 44 and 45A) of the support plate 1401, a stepping motor 1415 is fixed to the housing and the like. A feed screw formed at a tip of a shaft of the stepping motor 1415 is screwed in a screw hole of a movable cylinder 1416 that pierces through a fitting hole formed in the support plate 1401 and is fastened to the support plate 1401. According to rotation of the stepping motor 1415, it is possible to displace the other end side of the support plate 1401 in a sub-scanning direction (a height direction of the anamorphic lens) by leading the other end side with the screw hole of the movable cylinder 1416 and the feed screw of the stepping motor 1415. Consequently, it is possible to adjust rotation of the other end side of the support plate 1401 with an engagement section of the projection 1418 at one end side of the support plate 1401 as a fulcrum together with the other end side of the anamorphic lens 1405 in a surface orthogonal to an optical axis following normal and reverse rotations of the stepping motor 1415. A direction of the rotation is set as γ. The bus of the anamorphic lens 1405 in the sub-scanning direction tilts following the rotation. A scanning line serving as a focusing position of the anamorphic lens 1405 is tilted.

In the embodiment shown in FIG. 42, stepping motors are arranged in anamorphic lenses of the first to the third stations in order from the right side with directions at rotation fulcrum ends aligned and perform tilt adjustment for each unit such that scanning lines of the first to the third stations are parallel to a reference scanning line of the fourth station at the left end.

Figure 45A:
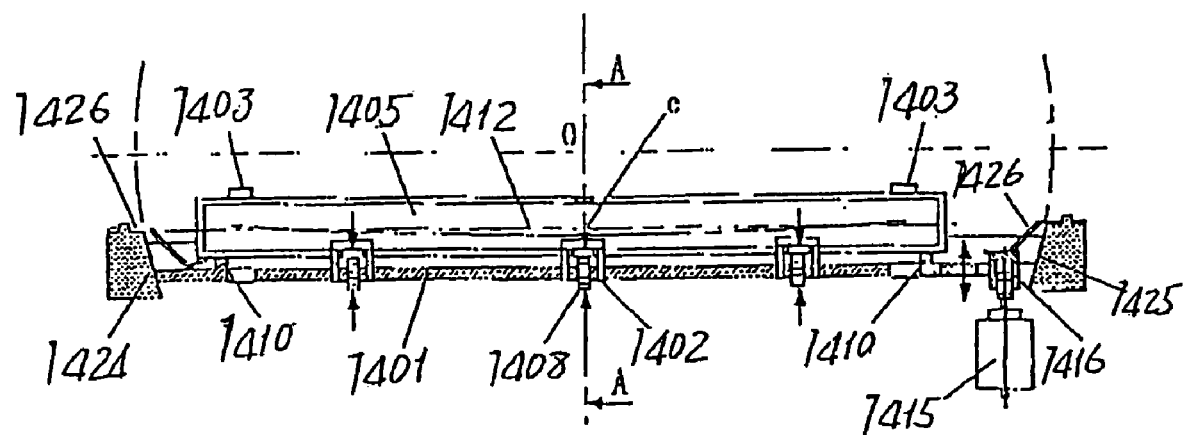
FIG. 45A is a partial sectional front view of the optical element holding structure according to the second embodiment.
Figure 45B:
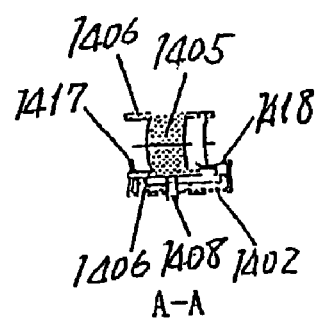
FIG. 45B is a side sectional view of the optical element holding structure according to the second embodiment.

FIGS. 45A and 45B are diagrams of a mounting state of the anamorphic lens 1405 viewed from the optical axis direction. Both the ends in the longitudinal direction of the anamorphic lens 1405 are supported at upper ends of the raised bent sections 1410 formed in the support plate 1401. Three places of the anamorphic lens 1405, that is, the center in the longitudinal direction and positions close to the raised bent sections 1410 are supported at the tips of the adjusting screws 1408. When a projection amount of the adjusting screws 1408 is less than height of the raised bent sections 1410, a bus of the anamorphic lens 1405 warps to be convex downward because of an attraction force due to elasticity of the leaf springs 1402. Conversely, when a projection amount of the adjusting screw 1408 exceeds the height of the raised bent sections 1410, the anamorphic lens 1405 is pushed by the adjusting screws 1408 and warps to be convex to an upper side. Therefore, it is possible to curve a focal line of the anamorphic lens 1405 in the sub-scanning direction and correct scanning line bending by adjusting the adjusting screws 1408. In general, scanning line bending is caused by an arrangement error, warp at the time of molding, and the like of an optical element forming an optical system. It is possible to correct linearity by curving the anamorphic lens 1405 in a direction in which bending of the scanning line is cancelled. Alternatively, it is possible to set directions and amounts of curves the same among scanning lines.

It is advisable to arrange the adjusting screws 1408 in a plurality of places along the main scanning direction. As in an example shown in FIGS. 44, 45A and 45B, it is also possible to correct bending in an M shape or a W shape by arranging the adjusting screws 1408 in three places between the center in the longitudinal direction and the raised bent sections 1410 at both the ends of the anamorphic lens 1405. According to the present embodiment, the adjusting screws 1408 are provided in all the anamorphic lenses. The anamorphic lenses are adjusted such that scanning lines of the respective stations are straight at the time of assembly.

When internal temperature of the image forming apparatus rises, even if initial adjustment is performed highly accurately, a temperature distribution difference in the main scanning direction and the sub-scanning direction occurs in an optical element made of plastic and a member holding the optical element. Warp occurs in the optical element or the warp changes. Consequently, a scanning line bending amount or a scanning line tilt amount on a surface to be scanned changes.

Thus, according to the present embodiment, methods of reducing the change in scanning line bending or scanning line tilt at the time when a temperature distribution difference occurs in an optical element or a member holding the optical element because of a temperature change are proposed. As one of the methods, materials of adjusting screws that correct and adjust the optical element, that is, the adjusting screws 1408 in FIGS. 44, 45A, and 45B are varied depending on arrangement places. When the materials of the respective adjusting screws 1408 are different, since coefficients of linear expansion of the respective adjusting screws are different, a difference occurs in an extension amount due to temperature rise. Consequently, since an amount of pushing in the optical element differs depends on a place, it is possible to reduce the change at the time when a temperature distribution difference occurs.

As shown in FIGS. 45A and 45B, when the anamorphic lens 1405 is pressed toward the support plate 1401 from an upper direction by the leaf springs 1403, in general, a portion near the center of the lens warps in the upper direction because of an influence of a frictional force acting between the raised bent section 1410 and the anamorphic lens 1405. Materials of the respective adjusting screws 1408 are varied such that a force canceling the warp acts. If a coefficient of linear expansion of adjusting screws in peripheries of the anamorphic lens 1405 is set large and a coefficient of linear expansion of an adjusting screw near the center is set small, an amount of change is larger in the peripheries than in the center. As a result, it is possible to cancel a force that causes the warp of the anamorphic lens 1405.

In the case of the present embodiment, the anamorphic lens 1405 is pressed by the adjusting screws from the side of the support plates 1401 that supports the anamorphic lens 1405. When the anamorphic lens 1405 is pressed by the adjusting screws from the opposite side of the support plate 1401, conversely, it is possible to cancel the warp of the anamorphic lens 1405 by setting a coefficient of linear expansion of the adjusting screws in the peripheries small and setting a coefficient of linear expansion of the adjusting screw near the center large. In other words, when the anamorphic lens 1405 is pressed from the support plate 1401 side, a coefficient of linear expansion of the adjusting screws 1408 is set larger in the periphery of the anamorphic lens 1405. When the anamorphic lens 1405 is pressed from the opposite side of the support plate 1401, a coefficient of linear expansion of the adjusting screws 1408 is set smaller in the periphery of the anamorphic lens 1405. Consequently, it is possible to cancel the warp of the anamorphic lens 1405.

Figure 46:
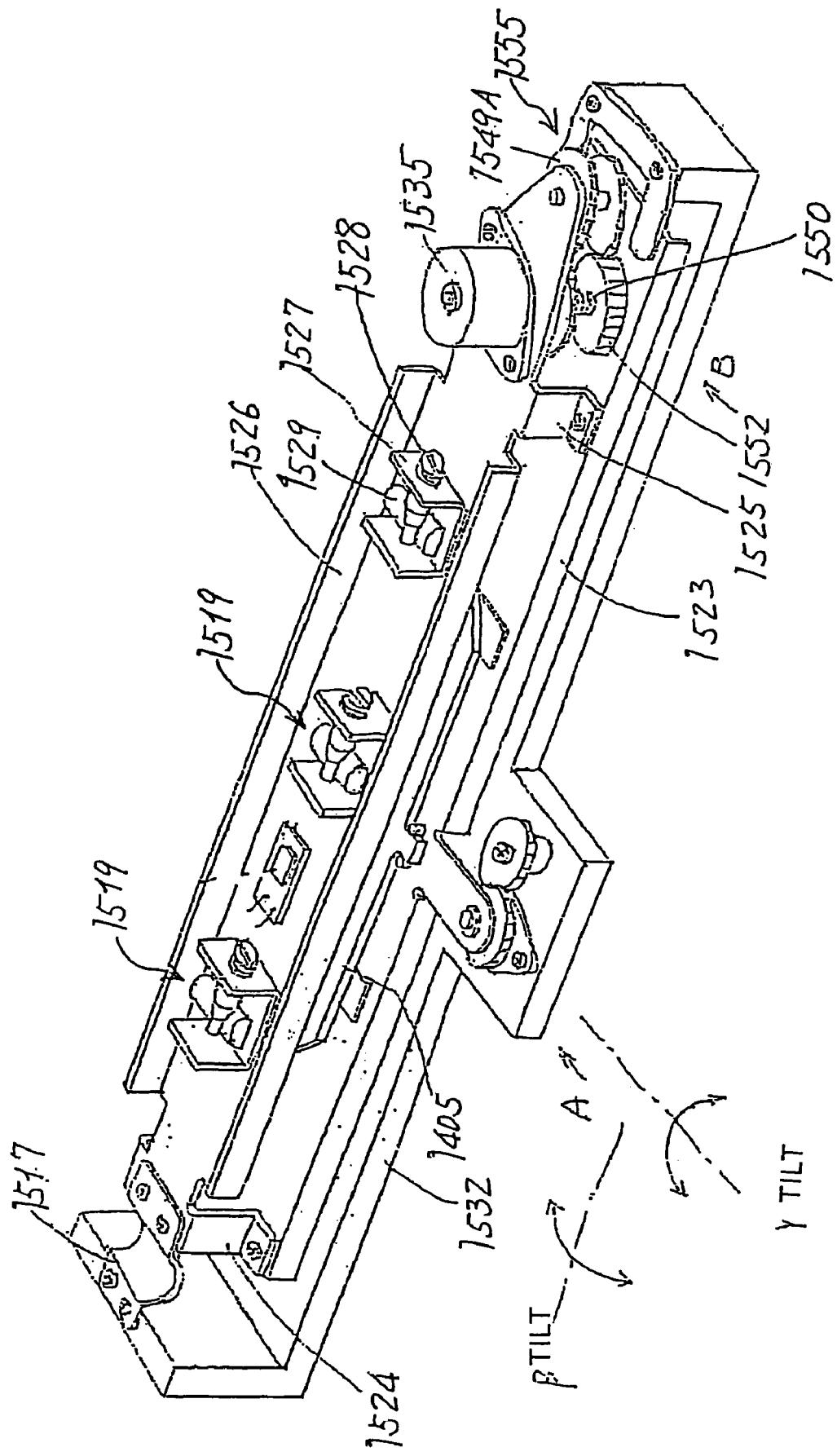
FIG. 46 is a perspective view of another example of the optical element holding structure according to the second embodiment.

In an example shown in FIG. 46, the anamorphic lens 1405 is nipped by an upper sheet metal 1526 and a lower sheet metal 1523 from both sides in the sub-scanning direction of the anamorphic lens 1405. Adjusting mechanisms for pressing the anamorphic lens 1405 are provided in places in the longitudinal direction of the upper sheet metal 1526, that is, a raised bent section (equivalent to the raised bent section 1410 in FIGS. 44 and 45A) of the lower sheet metal 523 and offset positions.

In the case of this example, in general, the portion near the center of the anamorphic lens 1405 also warps in the upper direction because of an influence of a frictional force applied to the anamorphic lens 1405 by the leaf springs and the lens supporting portion. When the sheet metals 1526 and 1523 are supported from the upper and lower directions, the adjusting screws are also deformed by being nipped by the sheet metals 1526 and 1523. To cancel the warp of the anamorphic lens 1405 in such a case, when the anamorphic lens 1405 is pressed from the support plate side, the adjusting screws in the peripheries of the lens is made less easily deformable compared with the adjusting screw near the center of the lens. When the anamorphic lens 1405 is pressed from the opposite side of the support plate, the adjusting screw near the center of the lens is made less easily deformable compared with the adjusting screws in the peripheries of the lens. In other words, the adjusting screws are made less easily deformable against warp of the lens.

As a method of canceling the warp, there is a method of varying thickness of the adjusting screws and a contact area of the adjusting screws and the anamorphic lens 1405 depending on arrangement places. When the anamorphic lens 1405 is pressed by the adjusting screws from the support plate side, thickness of the adjusting screws on the peripheral side of the anamorphic lens 1405 is set large. When the anamorphic lens 1405 is pressed from the opposite side of the support plate, thickness of the adjusting screw near the center of the lens is set large. Consequently, it is possible to cancel the warp of the anamorphic lens 1405. In other words, when the anamorphic lens 1405 is pressed from the support plate side, the contact area of the adjusting screws with the anamorphic lens 1405 is set larger in the periphery of the anamorphic lens 1405. When the anamorphic lens 1405 is pressed from the opposite side of the support plate, the contact area is set larger near the center of the anamorphic lens 1405. Consequently, it is possible to cancel occurrence of warp against stress caused by deformation of the anamorphic lens 1405.

Figure 47:
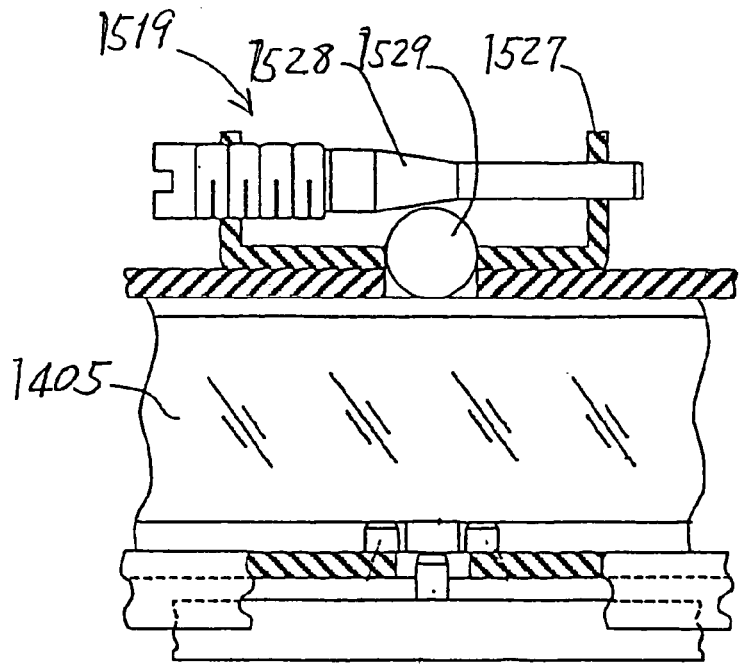
FIG. 47 is a front sectional view of an example of an optical element press adjusting mechanism according to the second embodiment.

In FIGS. 46 and 47, reference numeral 1519 denotes a pressing adjusting mechanism according to a method different from the method using the adjusting screws. The pressing adjusting mechanism 1519 includes a bracket 1527, a taper pin 1528, and a roller 1526 fixed on the upper sheet metal 1526. Square holes of an identical shape are opened in a bottom surface of the bracket 1527 bent in a C shape and the upper sheet metal 1526. The roller 1529 is inserted in the square holes. The taper pin 1528 is supported by a hole and a screw hole of the bracket 1527 from a direction orthogonal to an axis of the roller 1529. A taper section of the taper pin 1528 is in abutment against the roller 1529. By adjusting a rotation position of the taper pin 1528, the taper pin 1528 is led by the screw hole of the bracket 1527 to move in an axial direction. The taper pin 1528 linearly moves in a direction for tightening the roller 1529 and a direction for loosening the roller 1529 depending on a rotation direction. It is possible to correct scanning line bending by tightening the roller 1529 with the taper pin 1528 to press and bend the anamorphic lens 1405 in the sub-scanning direction.

Figure 48:
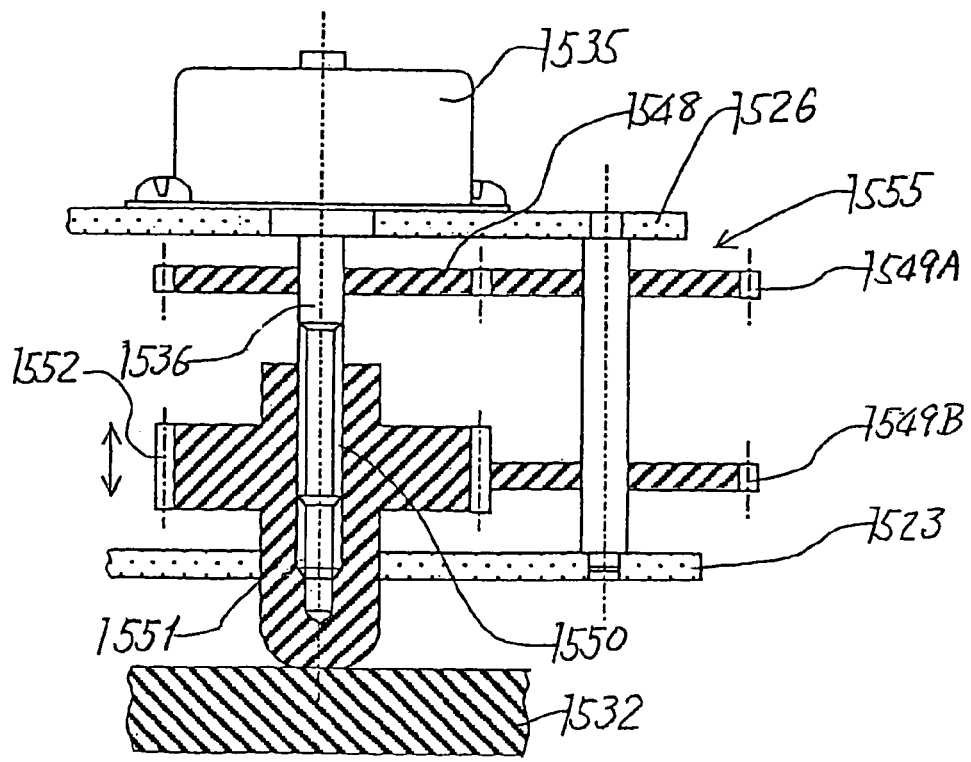
FIG. 48 is a front sectional view of an example of a position control mechanism for an optical element according to the second embodiment.

In FIG. 48, a scanning line tilt adjusting mechanism mainly includes a stepping motor 1535 attached to the other end of the upper sheet metal 1526. A thread of a predetermined pitch is cut in a shaft 1536 of the stepping motor 1526. A thread section 1550 of the shaft 1536 is screwed in a nut section 1551. A spur gear 1552 is formed on an outer side of the nut section 1551. A spur gear 1548 is formed integrally with the motor shaft 1536. The spur gear 1548 meshes with another spur gear 1549A. The spur gear 1549A and a spur gear 1549B substantially integral with the spur gear 1549A constitute a double gear. The spur gear 1549B on the lower side meshes with the spur gear 1552. The spur gears 1548 and 1552 have substantially the same diameter and the spur gears 1549A and 1549B also have substantially the same diameter. However, the numbers of teeth of the spur gears are made different to constitute a differential screw mechanism 1555 such that a slight rotation difference occurs between the spur gear 1548 integral with the motor shaft 1536 and the spur gear 1552 integral with the nut section 1551. Therefore, when the stepping motor 1526 is normally and reversely rotated, a rotation difference occurs between the thread section 1550 and the nut section 1551. The nut section 1551 slightly moves up and down together with the spur gear 1552. A bearing section for the gears is provided between the upper and the lower sheet metals 1526 and 1523. The differential screw mechanism 1555 is constituted integrally with the holding member for the anamorphic lens 1405. A rotation center of the spur gear 1552 extends downward through the lower sheet metal 1523 and is in abutment against a support plate 1532. The support plate 1532 corresponds to the support plate 1401 in the embodiment shown in FIGS. 44 and 45A.

The differential screw mechanism 1555 is constituted such that the motor shaft 1536 and the nut section 1551 are rotated in the same direction by the gears. Since the gear difference is provided in the gears, when the motor 1535 is driven, a rotation phase difference occurs between the motor shaft 1536 and the nut section 1551. The nut section 1551 slightly moves in a thrust direction. According to the movement of the nut section 1551, the support plate 1532 and the anamorphic lens 1405 tilt by a very small angle, respectively, with the one end in the longitudinal direction as a fulcrum. This makes it possible to improve resolution of scanning line tilt adjustment. Compared with the conventional adjustment resolution obtained by only screws and nuts, it is possible to obtain adjustment resolution higher by one digit or more.

In the anamorphic lens 1405 nipped and integrated by the upper and the lower sheet metals 1526 and 1523, the fulcrum positions in or integrated with the support plate 1532 serving as the lens holder comes into contact with the bottom surface of the lower sheet metal 1523. The anamorphic lens 1405 can rotate with the contact point as a fulcrum. Therefore, when the stepping motor 1535 is driven, the anamorphic lens 1405 swings like a seesaw with a direction substantially parallel to the lens optical axis as a rotation axis (this swinging is referred to as "γ tilt") to perform scanning line tilt adjustment. Both ends of the upper and the lower sheet metals 1526 and 1523 are pressed in the sub-scanning direction by the leaf springs fastened to the lens holder 1532 and keep the state after adjustment. The lens holder 1532 is shown in the figure as a separate member but may be formed integrally with an optical housing.

Figure 49:
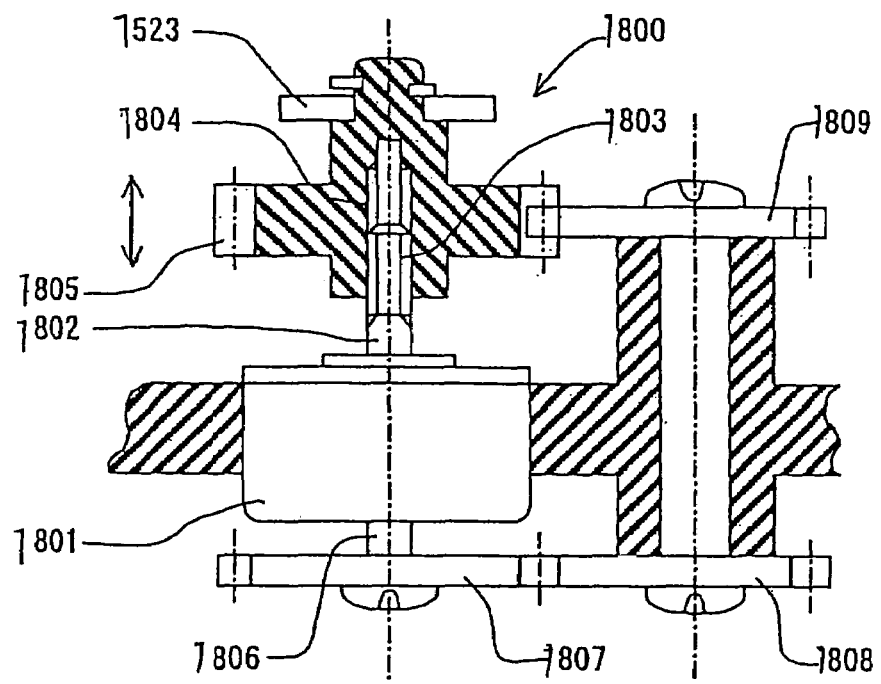
FIG. 49 is a front sectional view of an example of a position control mechanism for an optical element according to the second embodiment.

In FIG. 49, a projected section projected in an optical axis direction is provided near the optical axis of the lower sheet metal 1523. A shaft of a nut section 1804 constituting a differential gear is rotatably fit in a hole provided at a tip of the projected section and is prevented from coming off in a thrust direction by an E ring or the like. A stepping motor 1801, from which shafts 1802 and 1806 extend in both directions, is attached to an appropriate supporting portion, for example, an optical housing. A thread section 1803 formed in one shaft 1802 is screwed in the nut section 1804. A spur gear 1807 is integrally attached to the other shaft 1806 of the motor 1801. The spur gear 1807 meshes with a spur gear 1808. The spur gear 1808 is substantially integral with a spur gear 1809 to constitute a double gear. The spur gear 1809 meshes with a spur gear 1805 formed on an outer peripheral side of the nut section 1804. In the gears explained above, under the same principle as the differential screw mechanism explained with reference to FIG. 48, the nut section 1804 slightly moves in a direction orthogonal to the optical axis according to normal and reverse rotations of the motor 1801. As described above, the projected section projected in the optical axis direction is fit in the nut section 1804 near the optical axis of the lower sheet metal 1523. Thus, it is possible to subject the anamorphic lens 1405 to β tilt with the fulcrum as a rotation center according to the slight movement of the nut section 1804. The "β tilt" means rotating the anamorphic lens 1405 with a direction substantially orthogonal to the optical axis and parallel to a deflected scanning surface as a rotation axis. This makes it possible to perform scanning line position correction.

In a differential gear mechanism 1800, it is possible to realize a reduction in space by using a double-shaft type stepping motor as the stepping motor 1801, attaching a thread to one side of the shaft and attaching a spur gear to the other side of the shaft, and constituting a bearing section of the double gear, where a phase difference of a thread and a nut is provided, integrally with the optical housing. As a distance from the fulcrum to a nut fitting hole of the lower sheet metal (length of an arm) is set longer, it is possible to improve adjustment resolution in a β tilt direction. In an optical simulation, when a scanning lens is subjected to β tilt, a scanning line position and scanning line bending change simultaneously. However, the variation of the scanning line bending is 1/10 or less compared with the variation of the scanning line position. For example, even if the scanning line position is changed by 50 μm, the variation of the scanning line bending is 5 μm or less, which does not cause a practical problem.

Note that the anamorphic lens has been explained as a lens molded from resin. However, the anamorphic lens may be a lens made of glass. It is possible to adjust the lens made of glass in the same manner as the lens molded from resin.

In FIG. 42, on a scanning start side and a scanning end side of an image recording area, when two optical scanning stations sharing one polygon mirror are set as one unit, substrates 1138 and 1139 and substrates 1148 and 1149 mounted with photo sensors are arranged for each of the units to detect scanning beams in the respective stations. According to the present embodiment, the substrates 1138 and 1140 form a synchronization detecting sensor and are shared to take timing for starting drawing an image on the respective photosensitive drums based on a detection signal thereof. On the other hand, the substrates 1139 and 1141 form an end detection sensor. The end detection sensor measures a time difference of detection signals between the end detection sensor and the synchronization detecting sensor to detect a change in scanning speed and resets a reference frequency of a pixel clock for modulating the respective semiconductor lasers serving as the light sources by multiplying the reference frequency inversely proportional to the change in scanning speed detected. This makes it possible to stably keep a full width magnification of images recorded by the respective stations on the transfer belt 1105.

Figure 50:
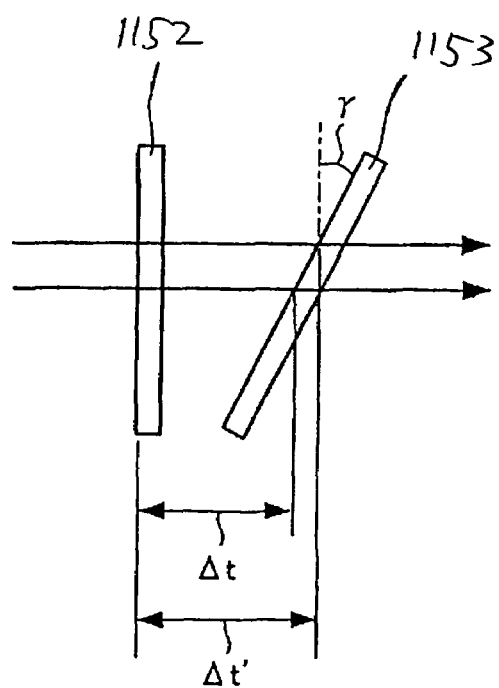
FIG. 50 is a diagram of a sensor arrangement of a scanning beam detection sensor according to the second embodiment.

By constituting any one of the sensors with a photo diode 1152 vertical to the main scanning direction and a photo diode 1153 unparallel to the main scanning direction as shown in FIG. 50, a time difference Δt between the photo diode 1152 and the photo diode 1153 is measured. This makes it possible to detect deviation Δy of a sub-scanning position of a light beam. The deviation Δy of the sub-scanning position is represented as follows using a tilt angle γ of the photo diode 1153 and scanning speed V of the light beam.

$$\Delta y = (V/\tan \gamma) \cdot \Delta t$$

According to the present embodiment, by controlling rotation phases of optical axis deflecting units described later or the polygon mirrors to always keep Δt constant, it is possible to maintain an irradiation position such that sub-scanning registrations of respective color images are not shifted. Moreover, if the sensors are arranged on both the scanning start side and the scanning end side, it is possible to detect a difference of sub-scanning position deviations at the respective ends, that is, scanning line tilt.

According to the embodiment explained above, scanning positions of the other stations are adjusted to the reference station in the respective units and a state of superimposition of images of the reference stations in the respective units is detected between the units to uniformly correct timing for starting drawing an image and a period of a pixel clock for one unit. As the state of superimposition of images, detection patterns of toner images formed on the transfer belt 1105 is read by the reference stations of the respective unit and a magnification in the main scanning direction, a sub-scanning registration, and scanning line tilt as relative deviation to periodically perform correction control.

Concerning the main scanning direction, correction control is performed by resetting a modulated pixel clock based on a result of the detection. Concerning the sub-scanning direction, as shown in FIGS. 48 and 49, correction control is performed by controlling a position of the anamorphic lens with the stepping motor. After a correction process ends, these patterns are cleaned by a cleaning bias roller and removed from the transfer belt 1105.

The correction control is performed at timing such as start of the apparatus or between jobs. When the number of prints per one job is large, to control deviation due to a temperature change during that period, the job is interrupted in the middle and corrected.

Figure 51:
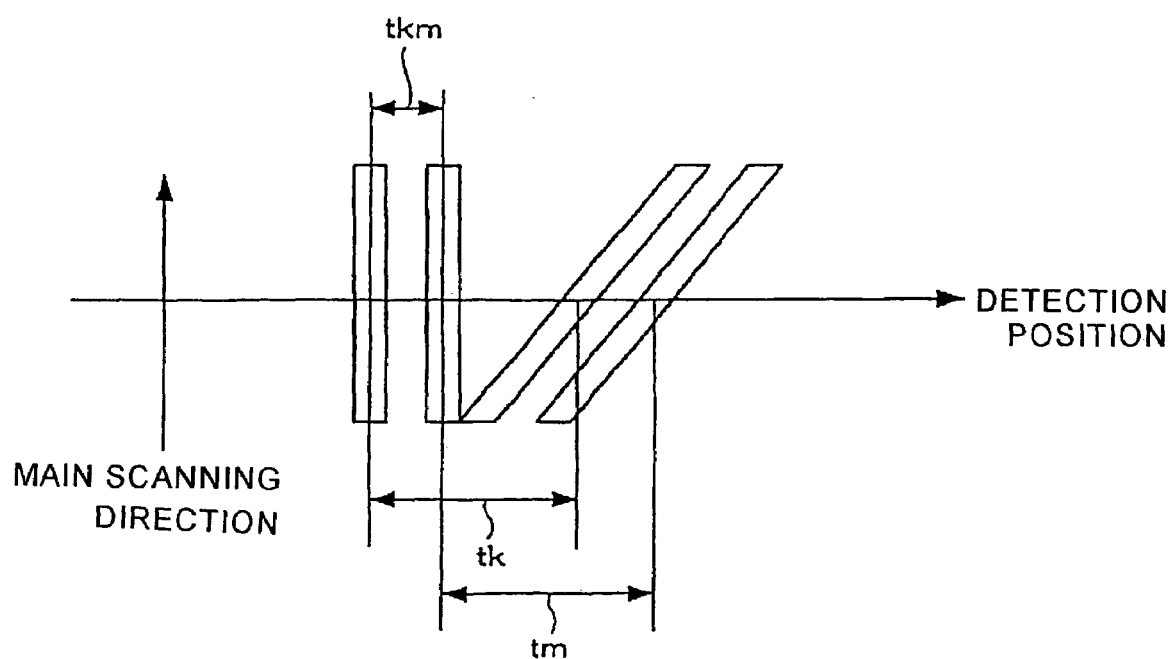
FIG. 51 is a diagram of another example of the sensor arrangement of the scanning beam detection sensor according to the second embodiment.

As shown in FIG. 42, the detecting unit includes a light-emitting diode (LED) element 1154 for lighting, a photo sensor 1155 that receives reflected light, and a pair of condensing lenses 1156. In the embodiment shown in FIG. 42, the detecting units are arranged in three places, namely, the center and both left and right ends of an image. A line pattern tilted by about 45 degrees with respect to the main scanning line is formed on the transfer belt 1105 using black and magenta toner images serving as references in the respective units. A detection time difference is read according to movement of the transfer belt 1105. An example of the reading of a time difference is shown in FIG. 51. Toner images on a detection line are read according to movement of a transfer member, that is, the transfer belt 1105. A vertical direction in the figure corresponds to the main scanning direction. Sub-scanning registrations of respective colors are calculated from a difference between a detection time difference tmk and a logical value t0. Main scanning registrations of respective colors are calculated from a difference between detection time differences tk and tm.

Figure 52:
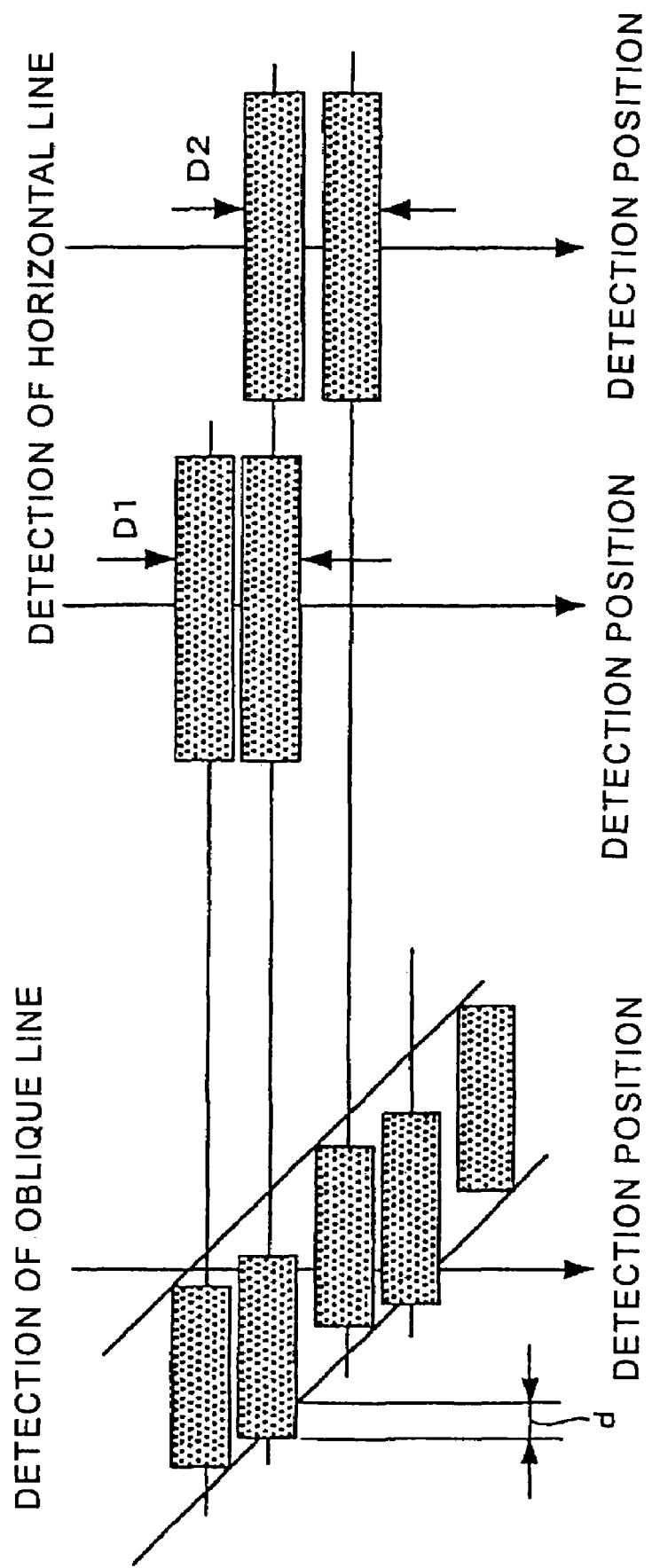
FIG. 52 is a diagram of examples of a position and width of a scanning line on a surface to be scanned.

This pattern is formed by a plurality of light sources, according to the present embodiment, two beams. Thus, as shown in FIG. 52, unevenness occurs by d in the main scanning direction because of a wavelength difference between the light sources. A line width is different depending on a combination as indicated by D1 and D2 in the sub-scanning direction because of a pitch error. In the case of two beams, when a line interval scanned by one surface of the polygon mirror is narrowed, an interval between the line and the next line scanned by an adjacent surface is widened.

Thus, according to the present embodiment, all the light sources are used, a line width extending over at least three lines or more is set along a detection position to form a line pattern such that a beam from any one of the light sources is used for scanning on adjacent two or more surfaces of the polygon mirror, and both edges of the line is detected along the detection position to calculate a middle point of the edges. This makes it possible to detect averaged deviation including all pitch errors. There is the same effect as detecting deviation individually for each of the light sources to calculate an average value. The detection is not affected by fluctuation in a pitch and fluctuation in a main scanning magnification.

It is likely that a line width changes in every detection depending on from which light source the drawing of a line pattern is started. Thus, it is necessary to always form a leading row of the line pattern with a specific light source.

On the other hand, in the unit, as shown in FIG. 50, it is possible to always monitor scanning position deviation among the stations using the photo diodes 1152 and 1153. According to the present embodiment, the photo diodes 1152 and 1153 are arranged at both ends of a scanning area in the main scanning direction to make it possible to also detect scanning line tilt. A registration position and tilt are automatically corrected by feedback correction and controlled to be adjusted to a reference scanning position of a station. Concerning a main scanning magnification, magnification change among the stations is always monitored based on detection times of a synchronization detection signal and an end detection signal as described above. A reference frequency of a pixel clock for modulating respective semiconductor lasers is corrected such that the main scanning magnification coincides with a magnification of the reference station. Thus, it is possible to correct color misalignment of all the stations if only states of superimposition of images in the reference stations among the respective units are adjusted to one another. In this way, according to the present embodiment, periodic correction by toner image detection is minimized to keep superimposition accuracy of respective color images without consuming time for interrupting a print operation.

As shown in FIG. 42, the foul stations are divided into pairs of two stations. The stations are scanned by the polygon mirror rotating in the identical direction to align scanning directions of the respective stations to make it less likely that misregistration occurs even if fluctuation in a magnification in the main scanning direction occurs and make it possible to cope with correction among the units only with electrical correction. Consequently, time required for the correction is reduced.

Figure 67:
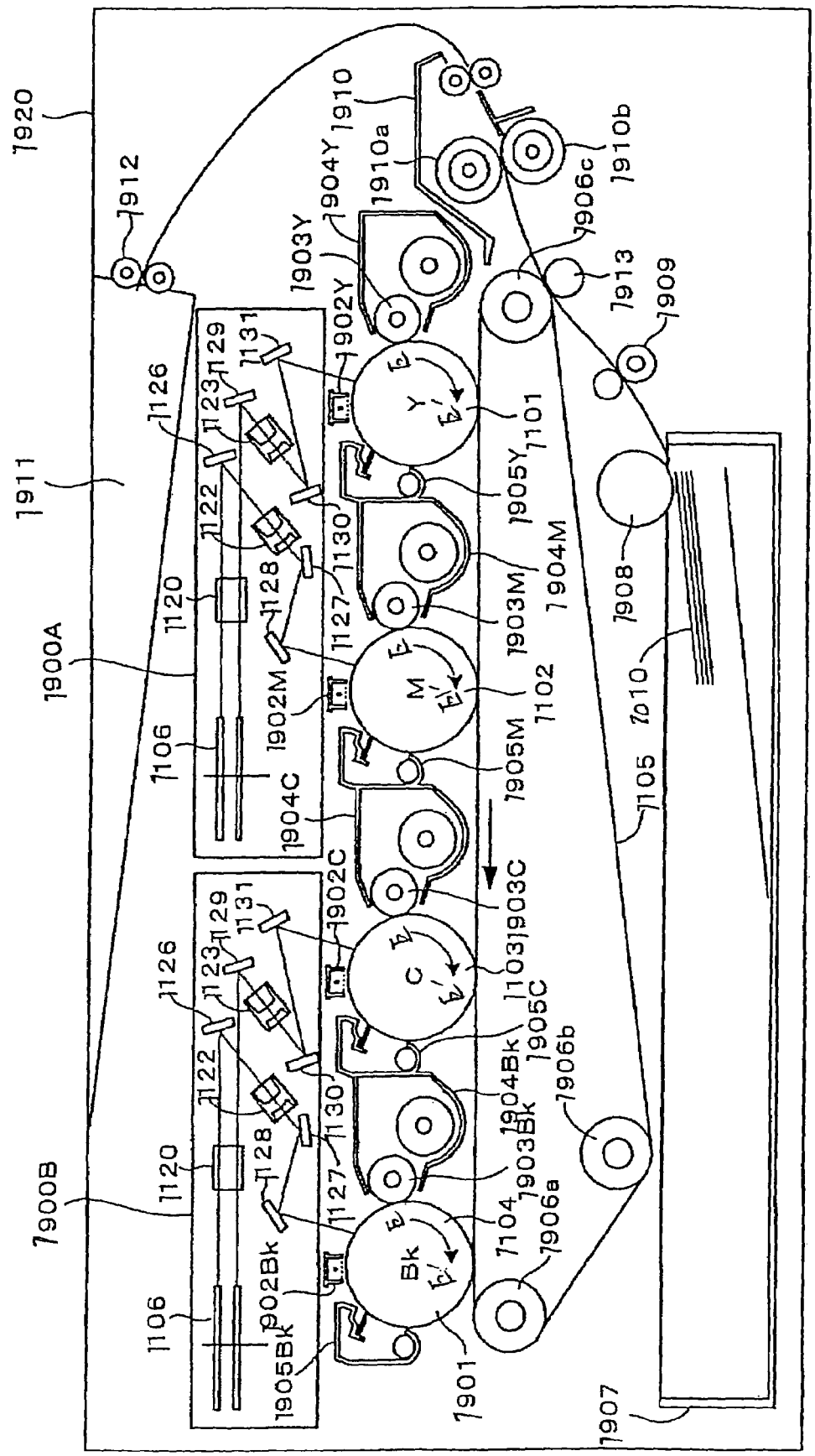
FIG. 67 is a schematic of an entire color image forming apparatus.

FIG. 67 is a diagram of an example of a tandem image forming apparatus mounted with the optical scanning device. One image forming station includes four photosensitive drums and process units arranged around the photosensitive drums. Since constitutions of the respective stations are the same, a photosensitive drum 1901 and process units around the photosensitive drum 1901 are explained below. The photosensitive drum 1901 rotates in a direction from E to E'. Around the photosensitive drum 1901, a charger 1902 that charges the photosensitive drum 1901 to a high voltage, a developing roller 1903 that deposits a charged toner on an electrostatic latent image recorded by an optical scanning device 1900 and visualizes the electrostatic latent image, a toner cartridge 1904 that supplies a toner to the developing roller 1903, and a cleaning case 1905 that scrapes off and stores a toner remaining on the photosensitive drum 1901 are arranged. Images are simultaneously recorded on the photosensitive drum 1901 by a plurality of lines according to scanning for each of deflective reflection surfaces of a polygon mirror as described above. The image forming stations are arranged in parallel in a moving direction of a transfer belt 1906. Toner images of yellow, magenta, cyan, and black are sequentially transferred onto the transfer belt 1906 to be timed to coincide with one another and are superimposed one on top of another to form a color image. The respective image forming stations basically have the identical constitution except that toner colors are different.

On the other hand, transfer sheets are pulled out one by one from a sheet feeding tray 1907 by a sheet feeding roller 1908 and sent to be timed to coincide with start of recording in the sub-scanning direction by a registration roller pair 1909. The color image on the transfer belt 1906 is transferred onto the transfer sheet. Subsequently, the color image is fixed on the transfer sheet by a fixing roller 1910. The transfer sheet is discharged to a sheet discharge tray 1911 by a sheet discharge roller 1912.

Note that, in the invention, a counter scanning system may be adopted. In the counter scanning system, a single polygon mirror is used, four stations are divided into pairs of two stations and arranged to be symmetrically opposed to each other with the single polygon mirror in the center, and laser beams are made incident on the polygon mirror from both sides thereof and deflected in opposite directions to be used for scanning.

Moreover, it is advisable to make it possible to connect the image forming apparatus and an electronic arithmetic apparatus (a computer, etc.), an image information communicating system (a facsimile, etc.), and the like via a network to be capable of communicating with one another. This makes it possible to form an information processing system that can process outputs from a plurality of apparatuses with one image forming apparatus. If a plurality of image forming apparatuses are connected on the network, it is possible to learn states of the respective image forming apparatuses from respective output requests, for example, a state of congestion of jobs, whether a power supply is on, and whether an image forming apparatus is broken. It is possible to select an image output apparatus with a best state (most suitable for a desire of a user) and perform output by learning the states of the respective image forming apparatuses.

Since the optical scanning device according to the present embodiment is mounted on the image forming apparatus, it is possible to reduce the number of times of correction for irradiation position deviation that is performed as a measure against color misalignment and color change that occur during a job. This makes it possible to realize improvement in productivity. Since the number of times of formation of detection patterns is also reduced, the number of times of pattern formation for deviation correction is reduced. This makes it possible to reduce an amount of a toner consumed by the pattern formation. Thus, it is possible to realize a reduction in power consumption and control of consumption of consumables.

According to the optical scanning device according to the present embodiment, it is possible to reduce occurrence of scanning line bending due to deformation of a scanning optical element caused by a temperature change with a simple method.

It is possible to form a high-quality image by applying the optical scanning device according to the present embodiment to an image forming apparatus.

According to a third embodiment of the present invention, a color image forming apparatus 1920 mounted with the optical scanning device 1900 according to the present embodiment has the same structure as that shown in FIG. 67. Thus, an explanation of the color image forming apparatus 1920 is omitted.

Figure 53:
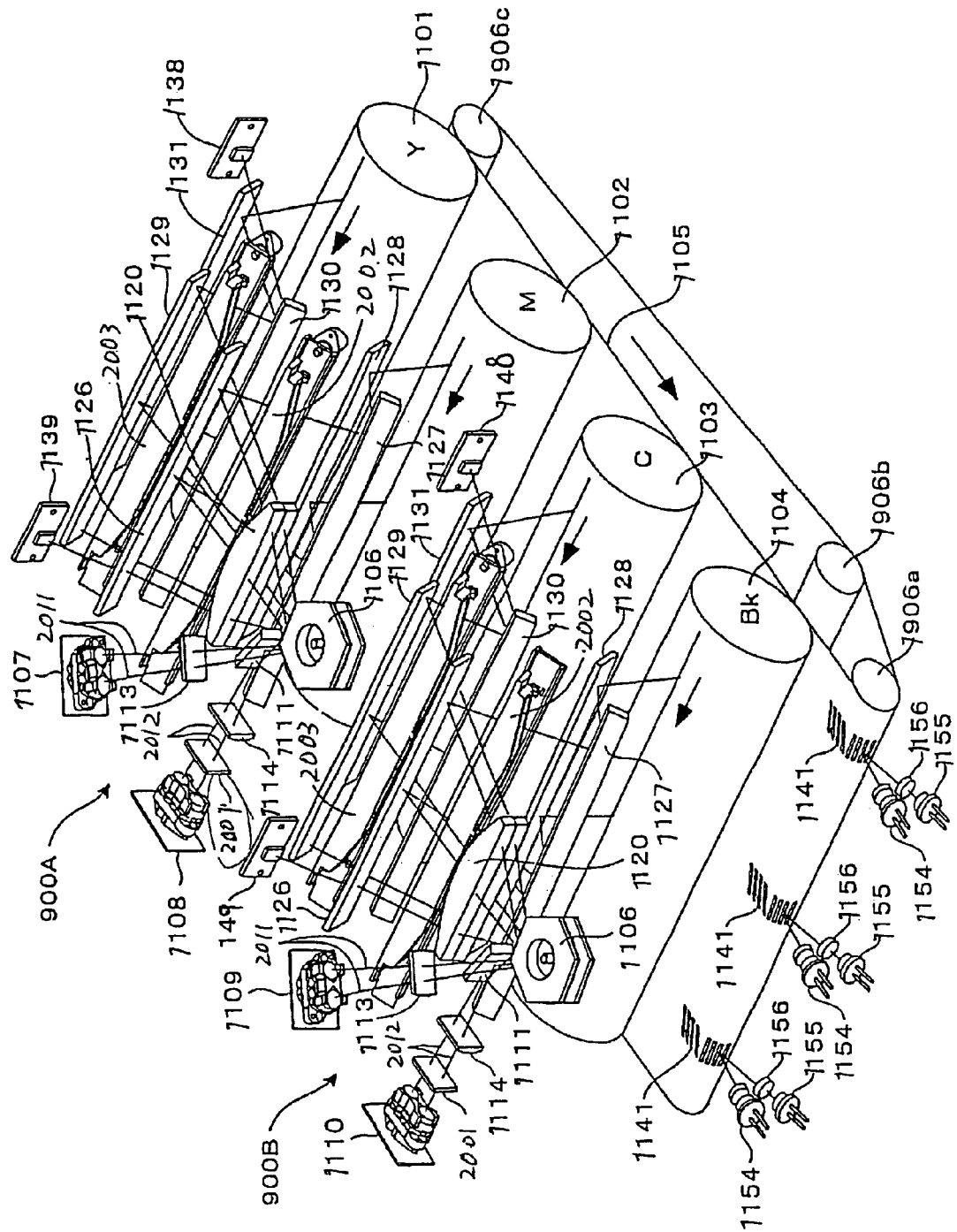
FIG. 53 is a schematic perspective view of an optical scanning device in a third embodiment of the present invention.

As shown in FIG. 53, the optical scanning device 1900 includes an optical scanning unit 900A corresponding to image forming stations for yellow and magenta and an optical scanning unit 900B corresponding to image forming stations for cyan and lack. The optical scanning unit 900A and the optical scanning unit 900B are arranged in parallel with scanning directions thereof aligned.

The four photosensitive drums 1101, 1102, 1103, and 1104 are arranged at equal intervals along a moving direction of the intermediate transfer belt 1105 and sequentially transfers toner images of different colors while superimposing the toner images one on top of another to form a color image.

As shown in the figure, the optical scanning device 1900 for scanning the respective photosensitive drums 1101, 1102, 1103, and 1104 includes the optical scanning units 1900A and 1900B and uses light beams to perform scanning with the polygon mirrors 1106 serving as rotary polygon mirrors.

Since rotation directions of the polygon mirrors 1106 are identical, images are drawn such that positions for starting drawing images of the respective polygon mirrors 1106 coincide with one another.

According to the present embodiment, a pair of semiconductor lasers described later are arranged for each of the photosensitive drums 1101, 1102, 1103, and 1104 and scanning is performed with one line pitch shifted according to recording density in the sub-scanning direction to scan two lines at the same time.

Since constitutions of the respective optical scanning units 1900A and 1900B are identical, one of the optical scanning units is explained below. Light source units are arranged such that emitting positions are different in the sub-scanning direction for each of the light source units, according to the present embodiment, the light source units 1107 and 1108 are arranged such that emitting positions are different by a predetermined height, 6 mm according to the present embodiment. A laser beam 2201 from the light source unit 1108 is returned by the incidence mirror 1111 and made incident on the polygon mirror 1106 with a main scanning direction thereof brought close to a laser beam 2202 from the light source unit 1107 directly traveling to the polygon mirror 1106.

The cylindrical lenses 1113 and 1114 have planes on one side and convex cylindrical surfaces consisting of a curvature common in the sub-scanning direction on the other and are arranged such that optical path lengths to a deflection point of the polygon mirror 1106 are equal. Respective light beams 2011 and 2012 are converged to be linear in the main scanning direction on a deflection surface. The cylindrical lenses 1113 and 1114 are arranged in combination with a toroidal lens described later such that the deflection point and the surfaces of the photosensitive members are in a conjugate relation in the sub-scanning direction. Consequently, the cylindrical lenses 1113 and 1114 form an optical face tangle correction optical system.

An orientation of liquid crystals of a liquid crystal deflection element 2001 changes when a potential distribution is given in the sub-scanning direction. When a refractive index distribution occurs, the liquid crystal deflection element 2001 tilts a direction of a ray and adjusts a relative scanning position with respect to the beam 2011 from the reference light source unit 1107.

The polygon mirror 1106 is a hexagonal mirror and constituted in two stages according to the present embodiment. The polygon mirror 1106 is formed in a shape with a windage loss reduced by providing a groove such that a middle portion not used for deflection is slightly smaller in diameter than an inscribed circle of the polygon mirror 1106.

Thickness of one layer of the polygon mirror 1106 is about 2 mm. Note that phases of upper and lower polygon mirror stages are identical. The fθ lens 1120 is also integrally molded or joined in two layers. The respective layers of the fθ lens 1120 are formed in a non-arc surface shape with power given such that a beam moves at constant speed on a photosensitive member surface in the main scanning direction following rotation of the polygon mirror 1106. The fθ lens 1120 focuses respective beams in a spot shape on the photosensitive member surface in conjunction with toroidal lenses 2002 and 2003 arranged for each of the beams to record a latent image.

In each color station (image forming station), a plurality of return mirrors, three return mirrors according to the present embodiment, arranged such that respective optical path lengths from the polygon mirror 1106 to the photosensitive member surface serving as a surface to be scanned coincide with one another and incidence positions and incidence angles with respect to the respective photosensitive drums 1101, 1102, 1103, and 1104 arranged at equal intervals are equal.

The beam 2011 from the reference light source unit 1107 passes through the cylindrical lens 1113 and is deflected on the upper stage of the polygon mirror 1106. Then, the beam 2201 passes through the upper layer of the fθ lens 1120 and is reflected on the return mirror 1126. The beam 2201 passes through the toroidal lens 2002 and is reflected on the return mirrors 1127 and 1128 to be guided to the photosensitive drum 1102 and form a magenta image in a second image forming station.

The beam 2012 from the light source unit 1108 passes through the liquid crystal deflection element 1117 and the cylindrical lens 1114 and is reflected on the incidence mirror 1111 and deflected on the lower stage of the polygon mirror 1106. Then, the beam 2012 passes through the lower layer of the fθ lens 1120 and is reflected on the return mirror 1129. The beam 2012 passes through the toroidal lens 2003 and is reflected on the return mirrors 1130 and 1131 to be guided to the photosensitive drum 1101 and form a yellow image in a first image forming station.

The other optical scanning unit 900B has the same constitution. Thus, a detailed explanation of the optical scanning unit 900B is omitted. Briefly, a beam from the light source unit 1109 is guided to the photosensitive drum 1104 and forms a black image in a fourth image forming station. A beam from the light source unit 1110 is guided to the photosensitive drum 1103 and forms a cyan image in a third image forming station.

Figure 54:
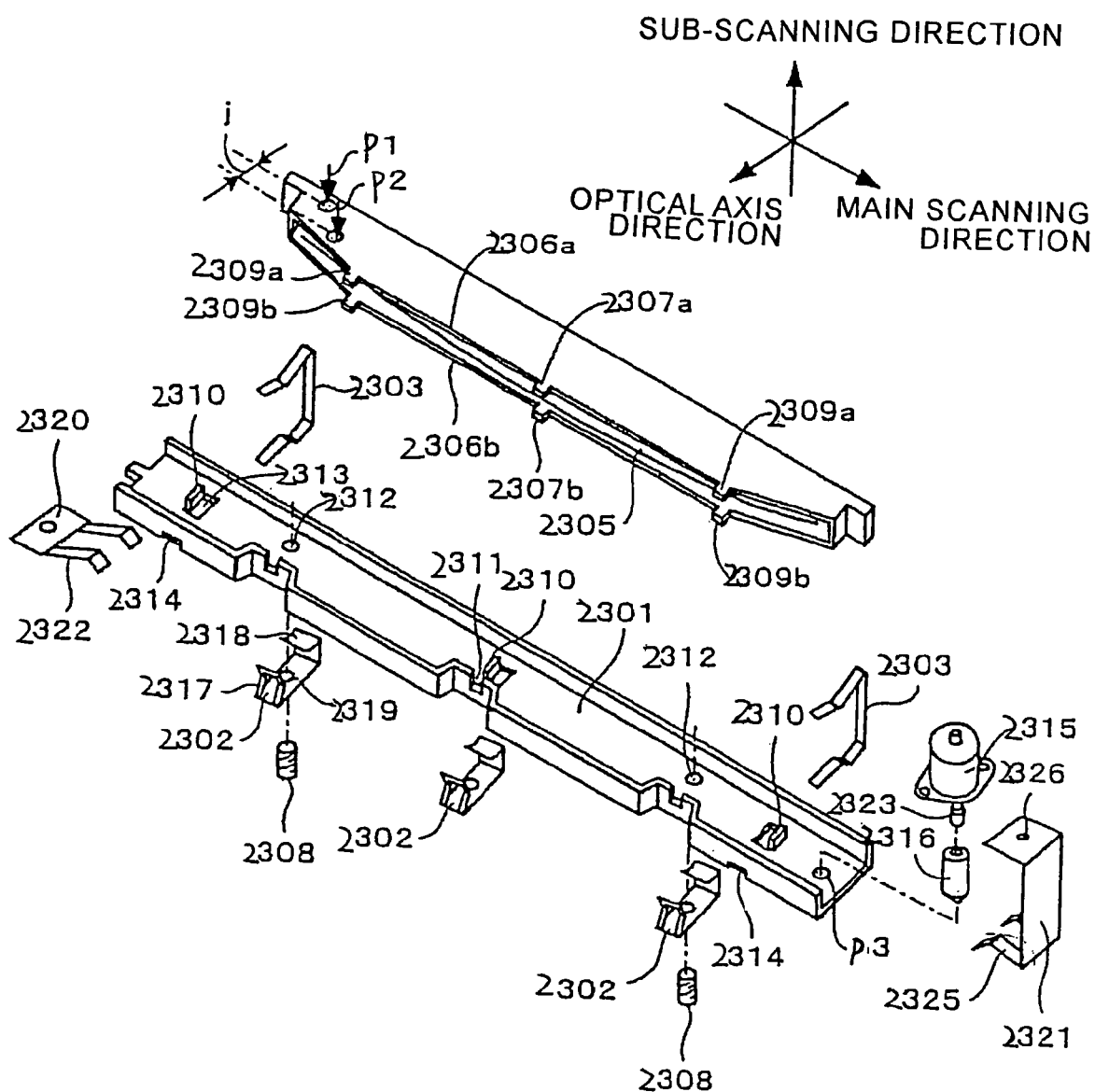
FIG. 54 is a perspective view of an engagement relation between a toroidal lens and a support plate according to the third embodiment.

A constitution of a support housing held by a toroidal lens is shown in FIG. 54.

A toroidal lens 2305 (identical with the toroidal lenses 2002 and 2003) is made of resin. Ribs 2306a and 2306b are formed in upper and lower portions thereof to surround a lens section. Projections 2307a and 2307b for positioning are formed in upper and lower portions in the center thereof.

A support plate 2301 serving as a support member for supporting the toroidal lens 2305 is formed of a sheet metal in a C shape. The projection 2307b on the lower side of the toroidal lens 2305 is engaged with a cutout 2311 formed in a raised bent section. A lower surface of the rib 2306b on the lower side is received in raised bent section 2310 serving as support points at three points consisting of a place near the center in the main scanning direction and both ends in the main scanning direction.

The rib 2306a on the upper side is urged from an upper surface thereof by a pair of leaf springs 2303 serving as urging members to press both the ends. Leaf springs 2302 serving as urging members are hooked on an inner side (an upper surface) of the rib 2306b on the lower side to press the center of the rib 2306b. Consequently, the lower surface of the toroidal lens 2305 is surely brought into abutment against and held by the three raised bent section 2310.

The leaf sprigs 2303 are fit in from the outer side with the toroidal lens 2305 laid on the support plate 2301. One ends of the leaf springs 2303 are stuck out to the inner side of the support plate 2301 from openings 2313 and fixed.

Figure 56:
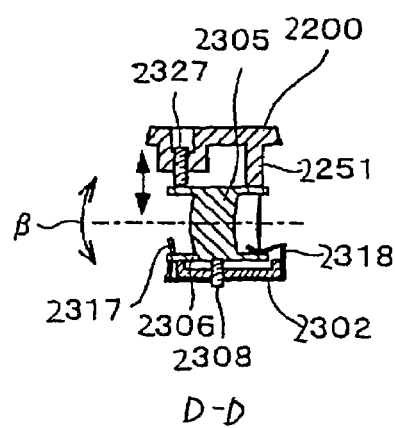
FIG. 56 is a sectional view along line D-D in FIG. 55.

Screw holes 1412 are formed in the center in the longitudinal direction of the support plate 1401. Adjusting screws 1408 are screwed in the screw holes 1412 from a bottom surface side of the support plate 1401. Leaf springs 1402 are arranged in positions of the adjusting screws 1408 to be astride in the width direction of the support plate 1401 and hold the support plate 1401 from the bottom surface side. As shown in FIG. 56, an eaves section of a bent section 2318 of the leaf spring 2302 is hooked on a rear side of the rib 2306*b* on the lower side and an opening of a bent section 2317 is engaged with the projection 2307*b* on the lower side to fix the leaf spring 2302.

Adjusting screws 2308 serving as adjustment members are screwed in screw holes 2312 in middle portions between the center and both the ends of the support plate 2301. The leaf springs 2302 are fit in from the outer side in the same manner and hooked on the inner side of the rib 2306*b* on the lower side and fixed in the same manner. The leaf springs 2302 urge the rib 2306*b* such that the lower surface of the rib 2006*b* comes into abutment against tips of the adjusting screws 2308. Holes 2319 of the leaf springs 2302 are holes through which the adjusting screws 2308 are inserted.

The toroidal lens 2305 is long and has low rigidity. Thus, when slight stress is simply applied to the toroidal lens 2305, deformation (warp) tends to occur. The toroidal lens 2305 is also deformed by a difference in thermal expansion if there is a temperature distribution in upper and lower parts thereof when an ambient temperature changes. Therefore, the toroidal lens 2305 is laid along the support plate 2301 to keep a shape thereof stably and is prevented from being deformed even if stress is locally applied at the time of tilt adjustment described later. In other words, linearity of a bus is maintained.

Note that, although the support plate 2301 is formed by plastic machining using a sheet metal according to the present embodiment, any material may be used as long as the material has bending rigidity larger than that of the toroidal lens 2305.

The toroidal lens 2305 mounted with the support plate 2301 is positioned in the main scanning direction by fitting the projection 2307*a* on the upper side formed in the center of the lens in a recess 2250 provided on a bottom surface of a housing 2200.

A support point 2251 in the sub-scanning direction projecting from the bottom surface of the housing 2200 and a tip of an adjusting screw 2353 serving as an adjustment member screwed in the bottom surface are in abutment against the upper surface of the rib 2306*a* on the upper side. On the other end side in the main scanning direction, a tip of a movable cylinder 2316 screwed in a feed screw 2323 formed in a shaft of a stepping motor 2315 fixed on the housing 2200 side is in abutment against the support plate 2301.

In other words, the toroidal lens 2305 mounted with the support plate 2301 is received at three points consisting of P1 and P2 on the upper surface of the toroidal lens 2305 and P3 on the supper surface of the support plate 2301 and urged by the leaf springs 2322 and 2325 and held.

Therefore, the movable cylinder 2316 is displaced in the sub-scanning direction (a height direction of the toroidal lens) according to rotation of the stepping motor 2315. It is possible to tilt the toroidal lens 2305 with a line connecting P1 and P2 as a rotation axis following normal and reverse rotations of the stepping motor 2315.

If a distance in the main scanning direction from P1 to P2 is sufficiently small compared with a distance from P1 to P3, it is possible to regard that rotation adjustment (rotation adjustment in a γ direction shown in FIG. 55) is performed with an axis substantially parallel to an optical axis as a rotation axis. A bus 2354 of the toroidal lens 2305 in the sub-scanning direction tilts according to the rotation adjustment to tilt a scanning line serving as a focusing position of the toroidal lens 2305.

According to the present embodiment, the adjustment constitution described above is arranged in the toroidal lenses of the first and the third image forming stations with directions at ends of rotation fulcrums aligned. Tilt adjustment is performed such that the other scanning line is parallel to scanning lines of the second and the fourth image forming stations serving as references for each of the optical scanning units.

Moreover, since P1 and P2 are arranged apart from each other in the optical axis direction (an interval j), if the adjusting screw 2353 is screwed in and out (rotation operation), it is possible to perform rotation adjustment (rotation adjustment in a β direction shown in FIG. 56) with an axis orthogonal to a sub-scanning section as a rotation axis. The optical axis of the toroidal lens 2305 tilts. It is possible to cause bending as one form of a variation of a scanning line of a quadratic function curve shape on a surface to be scanned as disclosed in the conventional example.

Therefore, it is possible to perform high-quality image formation without color misalignment or color change without deteriorating productivity.

Figure 55:
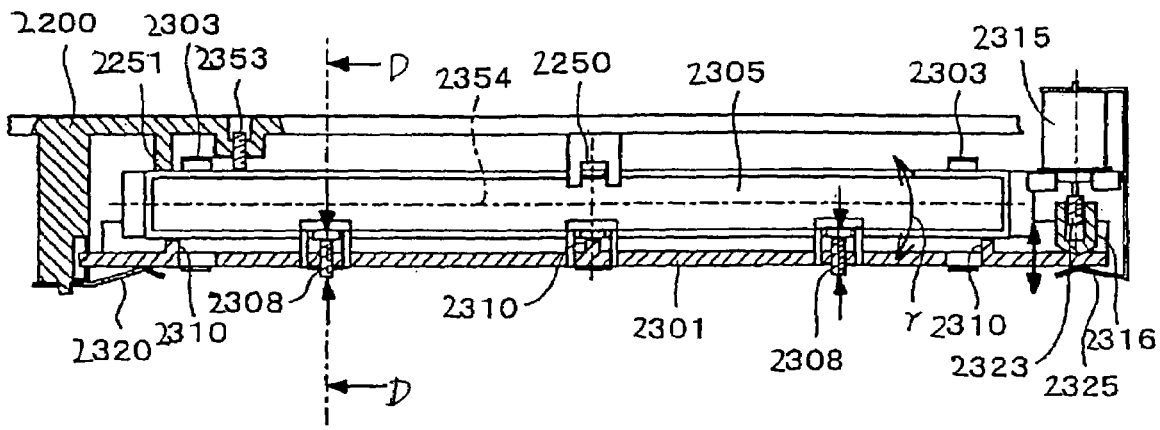
FIG. 55 is a schematic front view of a first scanning line bending correcting unit serving as a first scanning-line-variation correcting unit for the toroidal lens, a second scanning line bending correcting unit serving as a second scanning-line-variation correcting unit, and a focal line curving unit serving as a focal-line varying unit.

FIG. 55 is a diagram of a mounting state of the toroidal lens 2305 viewed from the optical axis direction. Since the toroidal lens 2305 is assembled from the lower surface of the housing 2200, on the figure, an upper side is the bottom surface of the housing 2200.

The center and both the ends in the main scanning (longitudinal) direction of the toroidal lens 2305 are supported at the edges of the raised bent sections 2310 and the middle portions thereof are supported at the tips of the adjusting screws 2308. When a projecting amount of the adjusting screws 2308 is smaller than the raised bent sections 2310, the bus 2354 of the toroidal lens 2305 is pulled to the lower side by the leaf springs 2302 to have a W shape in appearance.

Conversely, when the projecting amount exceeds the raised bent section 2310, the bus 2354 has an M shape. Note that, when the projecting amount of the adjusting screw 2308 is equal to the raised bent section 2310, the bus 2354 is straight. Therefore, the focal line of the toroidal lens 2305 is curved in the sub-scanning direction by adjusting the adjusting screws 2308. It is possible to cause scanning line bending of a cubic function curve component or a quadratic function curve component. In other words, when scanning line bending of a cubic function curve component or a quadratic function curve component occurs, it is possible to straighten the scanning line by causing bending of the scanning line that offsets the bending of the scanning line of the cubic function curve component or the quadratic function curve component.

A first scanning line bending correcting unit serving as a first scanning-line-variation correcting unit includes the support plate 2301, the housing 2200, the adjusting screws 2353, the leaf springs 2302 and 2303, and the leaf springs 2322 and 2325. A function of the first scanning line bending correcting unit is substantially performed by the adjusting screws 2353.

The first scanning-line-variation correcting unit decenters an optical axis of an optical element having a convergent action at least in the sub-scanning direction among optical elements constituting a focusing optical system in the sub-scanning direction with respect to an incident ray to change a scanning line. Thus, it is possible to surely cause a change (e.g., bending) of a focal line of a quadratic function curve component. Consequently, for example, it is possible to bring a bending shape closer to a straight shape and perform high-quality image formation without color misalignment or color change.

Since an attachment position of the optical element is adjustable around an axis orthogonal to the sub-scanning section, it is possible to realize the adjustment only by controlling height of receiving the optical element. It is possible to perform high-quality image formation without color misalignment or color change at low cost without requiring a complicated adjusting mechanism.

A second scanning line bending correcting unit or a focal line curving unit serving as a second scanning-line-variation correcting unit or a focal-line varying unit includes the support plate 2301, the housing 2200, the adjusting screws 2308, the leaf springs 2302 and 2303, and the leaf springs 2322 and 2325. A function of the second scanning line curve correcting unit or the focal line curving unit is substantially performed by the adjusting screws 2308.

Figure 63:
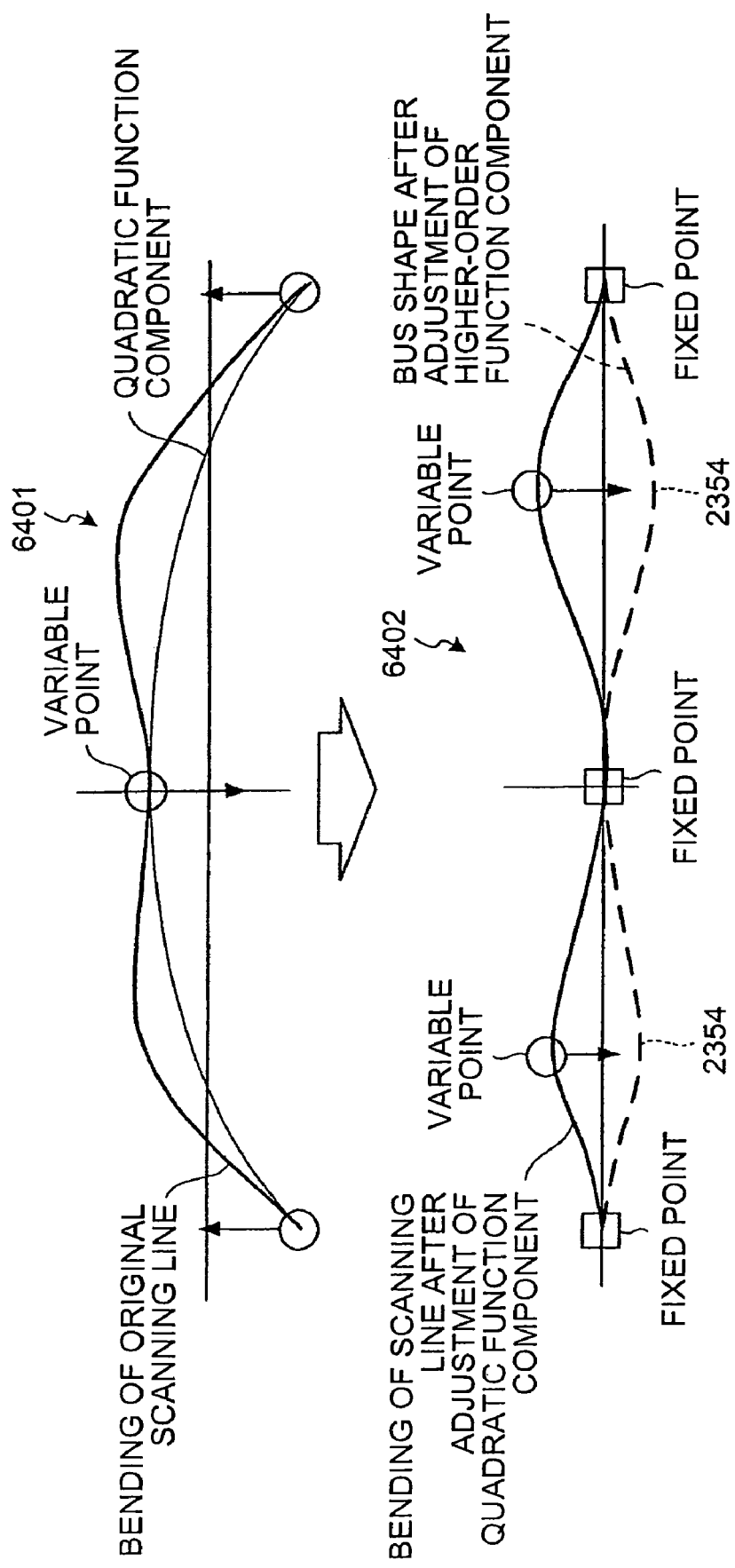
FIG. 63 is a diagram of correction for scanning line bending.

FIG. 63 is a diagram of a state of bending correction for a scanning line according to the present embodiment. As shown in a diagram denoted by reference numeral 6401 in FIG. 63, initial scanning line bending indicated by a bold solid line has a shape including a quadratic function curve component and a higher-order function curve component.

As described above, when the adjusting screws 2353 are adjusted, a bent shape changes to fall in the center and rise at both the ends to take a W or M shape (the M shape is shown in the figure). Thus, shown in a diagram denoted by reference numeral 6402 in FIG. 63, the bending is corrected until both the ends and the center are placed on an identical straight line. This correction is correction for the quadratic function curve component.

In this way, at least one portion and the other portions in the main scanning direction of the scanning line are aligned on the identical straight line. Thus, the quadratic function curve component is surely offset. For example, it is possible to bring the bent shape closer to a straight shape and perform high-quality image formation without color misalignment or color change.

Moreover, as shown in a diagram denoted by reference sign 6402 in FIG. 63, the bending is corrected to lower projected portions on the left and the right. The projected portions on the left and the right are bending of the scanning line after adjusting the quadratic function curve component (a higher-order function curve component). In this case, the center and both the ends are hardly displaced even if the adjusting screws 2308 are screwed in and out because the center and both the ends are fixed in the raised bent sections 2310. In the diagram denoted by reference numeral 6402 in FIG. 63, fixed points correspond to the raised bent portions 2310 and variable points correspond to positions where the adjusting screws 2308 act.

Therefore, if the bus 2354 of the toroidal lens 2305 is adjusted into a shape with bending reversed as indicated by a broken line in the diagram denoted by reference numeral 6402 in FIG. 63, the original bending is offset. It is possible to bring the scanning line close to a straight line. This correction is correction for the cubic or higher-order function curve component.

It is possible to easily and surely perform correction without causing complexity by dividing scanning line bending into a quadratic function curve component and a cubic or higher-order function curve component and correcting the quadratic function curve component and the higher-order function curve component with means corresponding thereto, respectively. As a result, it is possible to improve accuracy in entire correction.

Since it is possible to reduce time required for correction (adjustment), it is possible to reduce energy consumption required for production per one image forming apparatus in a manufacturing line. This contributes to a reduction in manufacturing cost.

Scanning line bending is divided into a quadratic function curve component requiring only overall adjustment and a higher-order function curve component requiring local adjustment to select optimal correction methods for the quadratic function curve component and the higher-order function curve component, respectively. Consequently, it is possible to surely correct even a change component (e.g., a curve component) for which correction has been conventionally difficult. Thus, efficiency of adjustment work improved.

When a quadratic function curve component is negligible according to a characteristic of a manufacturing line, only a second scanning line curve correcting unit corresponding to a cubic or higher-order function curve component may be mounted.

According to the present embodiment, correction in a manufacturing site is considered. However, when there is a portable or transportable detecting device that can detect scanning line bending at the same level as the manufacturing site, a service person can carry out correction even after manufacturing. Even if scanning line bending occurs after shipment of a product because of an environmental condition of use or the like, it is possible to cope with the bending. It is possible to perform high-quality image formation without color misalignment or color change over a long period of time.

According to the present embodiment, the optical scanning device can act on the identical toroidal lens 2305 and cause scanning line bending in a quadratic function curve shape and scanning line bending in a cubic or higher-order function curve shape. The optical scanning devices are arranged in all the toroidal lenses and adjust scanning lines of respective image forming stations to be straight at the time of assembly.

The present invention is not limited to this. For example, to cause scanning line bending of a quadratic function curve shape, the optical scanning device may act on the fθ lens 1120 or act on a lens different from a lens for causing scanning line bending of a higher-order function curve shape.

As described above, the same effect is obtained by decentering an incident ray with respect to an optical axis of a lens rather than decentering an optical axis in the sub-scanning direction with respect to a ray made incident on the lens. In other words, in FIG. 53, it is sufficient to subject the return mirrors 1126 and 1129 arranged on an upstream side of the toroidal lenses 2002 and 2003 to rotation adjustment (rotation adjustment in the β direction shown in FIG. 56) with an axis orthogonal to the sub-scanning section as a rotation axis.

Figure 64:
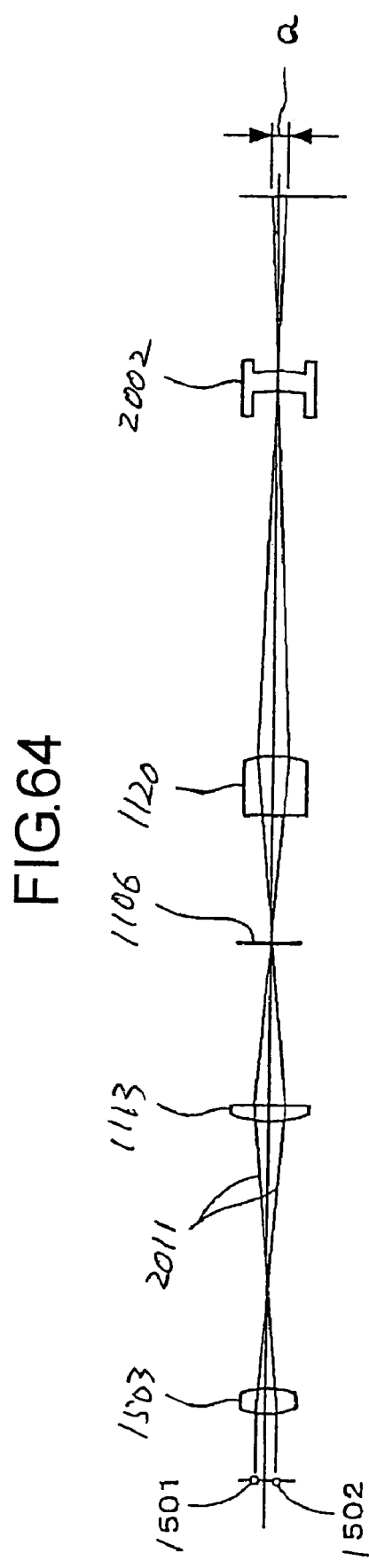
FIG. 64 is a diagram of an arrangement relation for bringing beams close to one another with a toroidal lens.

FIG. 64 is a diagram of the sub-scanning section of the optical system. The beams 2011 emitted from the respective light sources 1501 and 1502 of the light source unit 1107 pass through the coupling lens 1503, pass through the cylindrical lens 1113, and are reflected by the polygon mirror 1106. Then, the beams 2011 pass through the fθ lens 1120 and cross with each other near the toroidal lens 2003.

This is because, if the respective beams pass portions apart in the sub-scanning directions in the toroidal lens 2003, when the toroidal lens 2003 is tilted according to the tilt correction, since a difference of main scanning magnifications occurs between the beams or shapes of bending are different between the beams, it is difficult to uniformly correct the bending with the method of operating a lens shape. The beams are brought close to each other in by the toroidal lens 2003 to prevent the differences between the beams from occurring as much as possible.

FIG. 62 is a diagram of an example of a method of electrically aligning (adjusting) tilts of scanning lines. In the respective optical scanning units, as described above, tilts of the other image forming stations are adjusted to tilt of the reference image forming station with the mechanical correcting mechanism. However, among the optical scanning units, tilts of the reference image forming stations of the respective optical scanning units are electrically adjusted to one another.

As shown in a diagram denoted by reference numeral 6301 in FIG. 62, when it is assumed that a difference of tilts of the reference image forming stations is S, a coefficient k is decided such that the remainder ΔS obtained by dividing S by a scanning line pitch P is minimized. A main scanning area is divided into k+1 areas. A recording position for image data is shifted such that timing for drawing an image is staggered for each of the areas divided.

For example, since k is 3 in this example, image data along the main scanning direction equivalent to one line is equally divided into four as shown in a diagram indicated by reference numeral 6302 in FIG. 62. When the image data is stored in a line buffer, the image data is inputted with timing for recording the image data sequentially shifted in such a manner that timing for one line is shifted in a second area from the left, timing for two lines is shifted in a third area, and timing for three lines is shifted in a fourth area.

In other words, a constitution of the image data in the original line is rearranged such that the image data is recorded by scanning one line earlier in the second area and the image data is recorded by scanning three lines earlier in the fourth area.

Note that it is possible to make jaggy (step-like jaggy) that occurs in this boundary portion less conspicuous according to a smoothing technology for, for example, gradually changing a pulse width.

Similarly, it is also possible to apply the method to correction of scanning line bending.

Since tilt components are obtained if scanning line bending is approximated by a polygonal line, it is possible to treat the scanning line bending in the same manner as the example described above. Thus, the number of divisions only has to be set for each of the tilt components.

Therefore, at least one of the first scanning line bending correcting unit and the second scanning line bending correcting unit may be replaced with the electrical adjusting system. In other words, a mechanical correcting unit and an electrical correcting unit may be mixed in one optical scanning unit.

As shown in FIG. 53, the substrates 1138 and 1139 and the substrates 1140 and 1141 mounted with the photo sensors for each of the optical scanning units are arranged on the scanning start side and the scanning end side of the image recording area and detect beams used for scanning in the respective image forming stations.

According to the present embodiment, the substrates 1138 and 1140 form a synchronization detecting sensor and are shared to take timing for starting drawing an image based on a detection signal thereof.

On the other hand, the substrates 1139 and 1141 form an end detection sensor. The end detection sensor measures a time difference of detection signals between the end detection sensor and the synchronization detecting sensor to detect a change in scanning speed and resets a reference frequency of a pixel clock for modulating the respective semiconductor lasers as serving by multiplying the reference frequency inversely proportional to the change in scanning speed detected. This makes it possible to stably keep a full width magnification of images recorded by the respective image forming stations on the transfer belt 1105.

As explained with reference to FIG. 50, by constituting any one of the sensors with the photo diode 1152 vertical to the main scanning direction and the photo diode 1153 unparallel to the main scanning direction, a time difference Δt between the photo diode 1152 and the photo diode 1153 is measured. This makes it possible to detect deviation Δy of a sub-scanning position of a light beam.

Moreover, if the sensors are arranged on both the scanning start side and the scanning end side, it is possible to detect a difference of sub-scanning position deviations at the respective ends, that is, scanning line tilt.

A constitution of a light source unit is the same as the constitution shown in FIG. 43 in the second embodiment, an explanation of the constitution is omitted.

Figure 65:
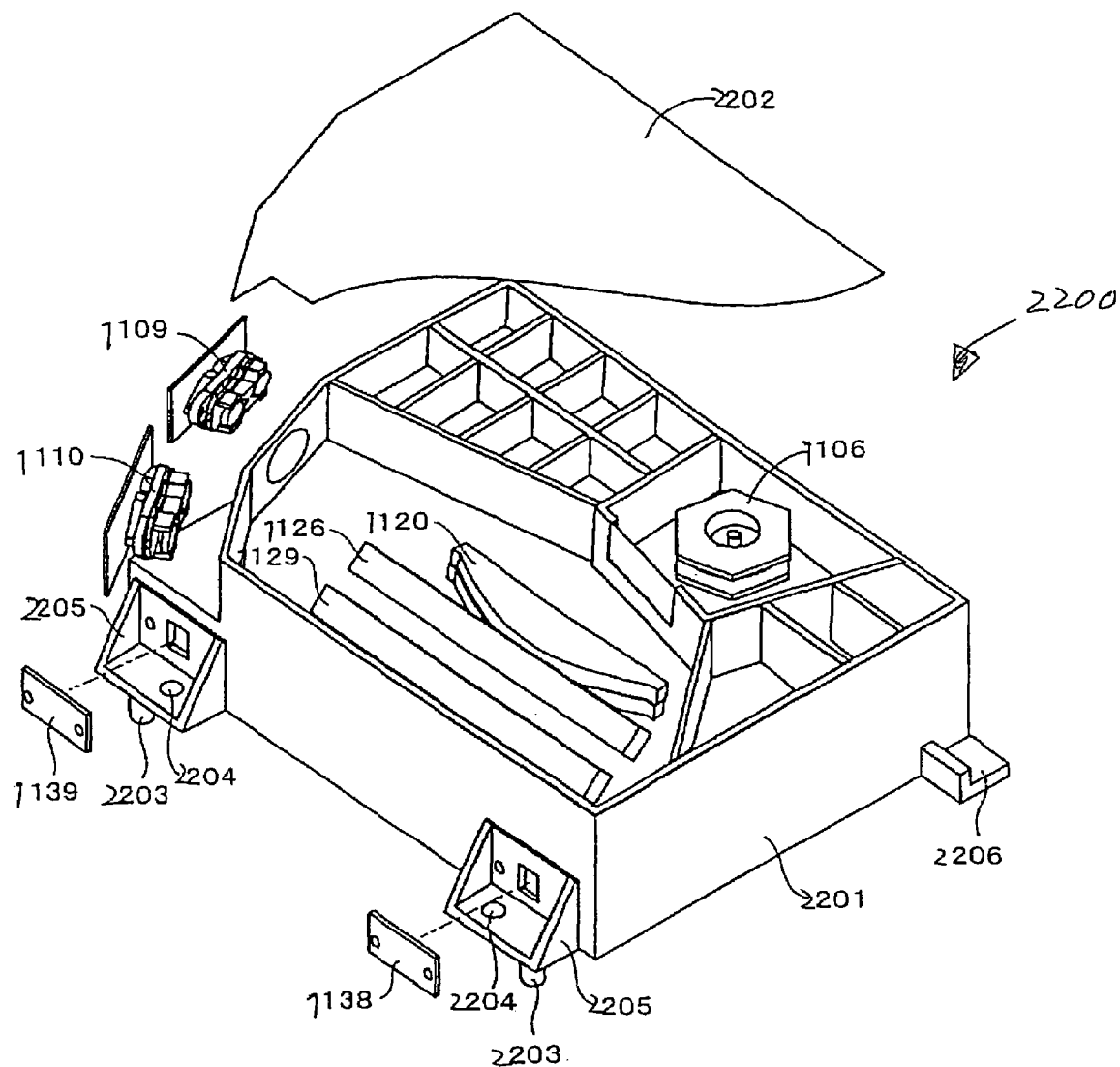
FIG. 65 is a perspective view of a constitution of a housing in which the optical scanning device is housed.
Figure 66:
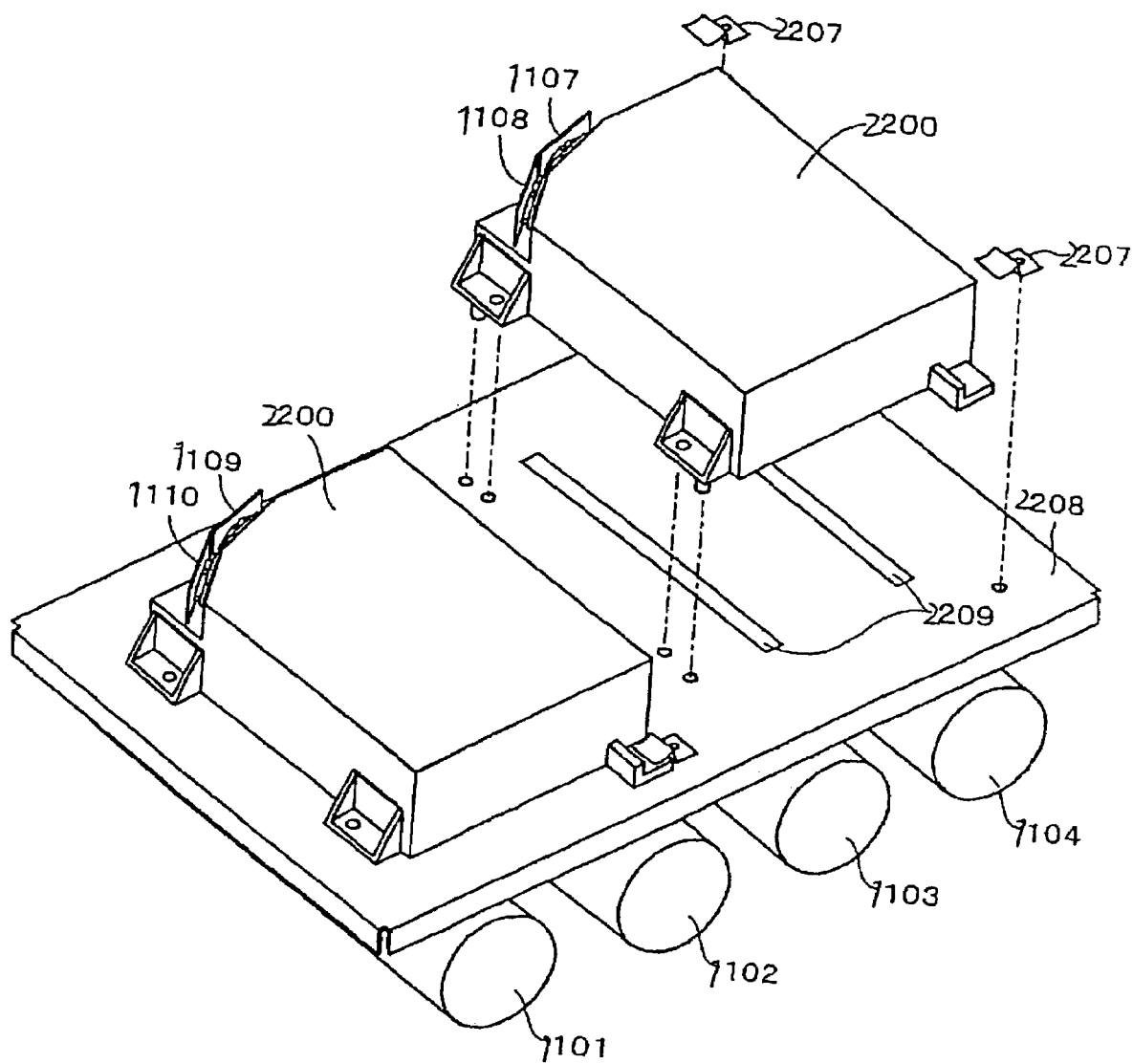
FIG. 66 is a perspective view of a constitution of the housing in which the optical scanning device is housed.

FIGS. 65 and 66 are diagrams of a constitution of the housing 2200 in which the optical scanning device is housed.

Optical elements constituting the optical systems such as the light source units 1109 and 1110, the polygon mirror 1106, and the fθ lens 1120 are mounted in predetermined portions of a housing 2201, respectively, and sealed by a cover 2202.

Although not shown in the figure, a toroidal lens and the like are mounted from a lower side of the housing 2200 and integrally provided in a unit. According to the present embodiment, stations of yellow and magenta and stations of cyan and black are housed in separate housings 2200 as units, respectively.

The housing 2200 is molded from resin. Four supporting portions are formed on outer walls. In a pair of supporting portions 2205 on the front side, positioning pins 2203 and screw through holes 2204 are formed. The supporting portions 2205 are mounted on a support member 2208 constituting a body frame with the positioning pins 2203 as references.

On the other hand, a pair of supporting portions 2206 on the polygon motor side are only pressed from above by leaf springs 2207 and are not bound on a setting plane.

This makes free expansion of the housing 2200 in a conveyance direction of the intermediate belt 1105 possible and makes it less likely that deformation of the housing 2200 due to heat generation of the polygon motor occurs. The support member 2208 is common to the respective light source unit and is formed of a sheet metal. The support member 2208 is arranged to partition the photosensitive drums 1101, 1102, 1103, and 1104. Respective beams are irradiated on the photosensitive drums 1101, 1102, 1103, and 1104 through openings 2209.

Figure 58:
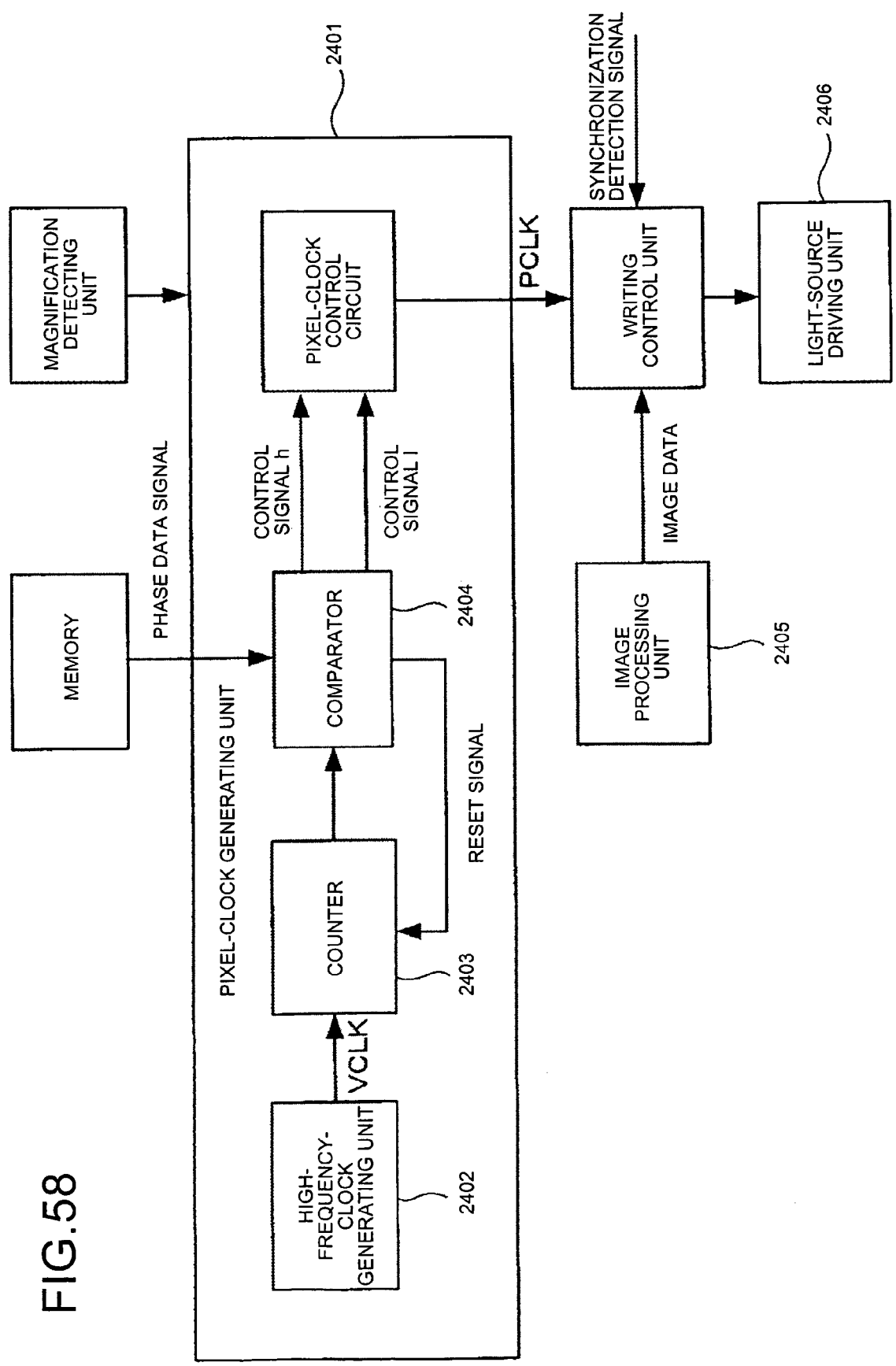
FIG. 58 is a block diagram of a writing control circuit.

FIG. 58 is a block diagram of a writing control circuit. In a pixel clock generating unit 2401, a counter 2043 counts a high-frequency clock VCLK generated by a high-frequency clock generating circuit 2402. A comparator 2404 compares a count value of the counter 2403 and a set value L set in advance based on a duty ratio and a phase data H that is given from the outside as transition timing for a pixel clock and indicates a phase shift amount. When the count value coincides with the set value L, the comparator 2404 outputs a control signal l indicating a falling edge of a pixel clock PCLK. When the count value coincides with the phase data H, the comparator 2404 outputs a control signal b indicating a rising edge of the pixel clock PCLK.

In this case, the counter 2403 is reset simultaneously with the control signal h and performs counting from 0 again. This makes it possible to form a continuous pulse train.

In this way, the phase data H is given for each clock to sequentially generate the pixel clock PCLK with a pulse period changed. According to the present embodiment, the pixel clock PCLK is obtained by dividing the high-frequency clock VCLK into eight. It is possible to change a phase of the pixel clock PCLK with resolution of ⅛ clock.

Figure 59:
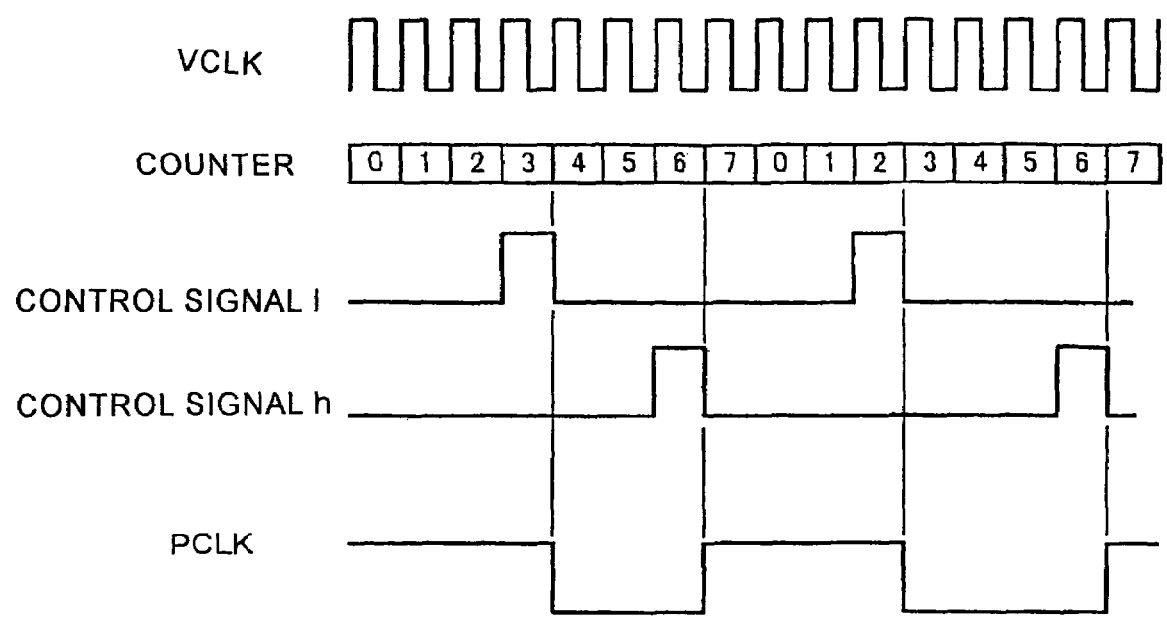
FIG. 59 is a timing chart in which a phase is delayed by ⅛ clock.

FIG. 59 is a timing chart of an example in which a phase is delayed by ⅛ clock.

When a duty is assumed to be 50 percent, the set value L of 3 is given to the counter 2403. The counter 2403 counts 4 and the pixel clock PCLK is built up. When a phase is delayed by ⅛ clock, the phase data H of 6 is given to the counter 2403. The pixel clock PCLK is built up at 7 counts. Since the counter 2403 is reset simultaneously, the pixel clock PCLK is built down at 4 counts again.

In other words, adjacent pulse periods are reduced by ⅛ clock.

The pixel clock PCLK generated in this way is given to a light source driving unit 2405. The light source driving unit 2405 allocates image data read by an image processing unit 2406 to respective pixels with the pixel clock PCLK as a reference to generate modulated data and drives the semiconductor lasers 1501 and 1502.

It is possible to correct distortion of a partial magnification error along a scanning direction by arranging pixels for shifting a phase at predetermined intervals in this way.

The electrical correction of a scanning line is controlled by the image processing unit 2406. The correction is performed by subjecting a vector image to raster expansion, dividing to shift the expanded image in the main scanning direction, and forming a new raster image.

Figure 61:
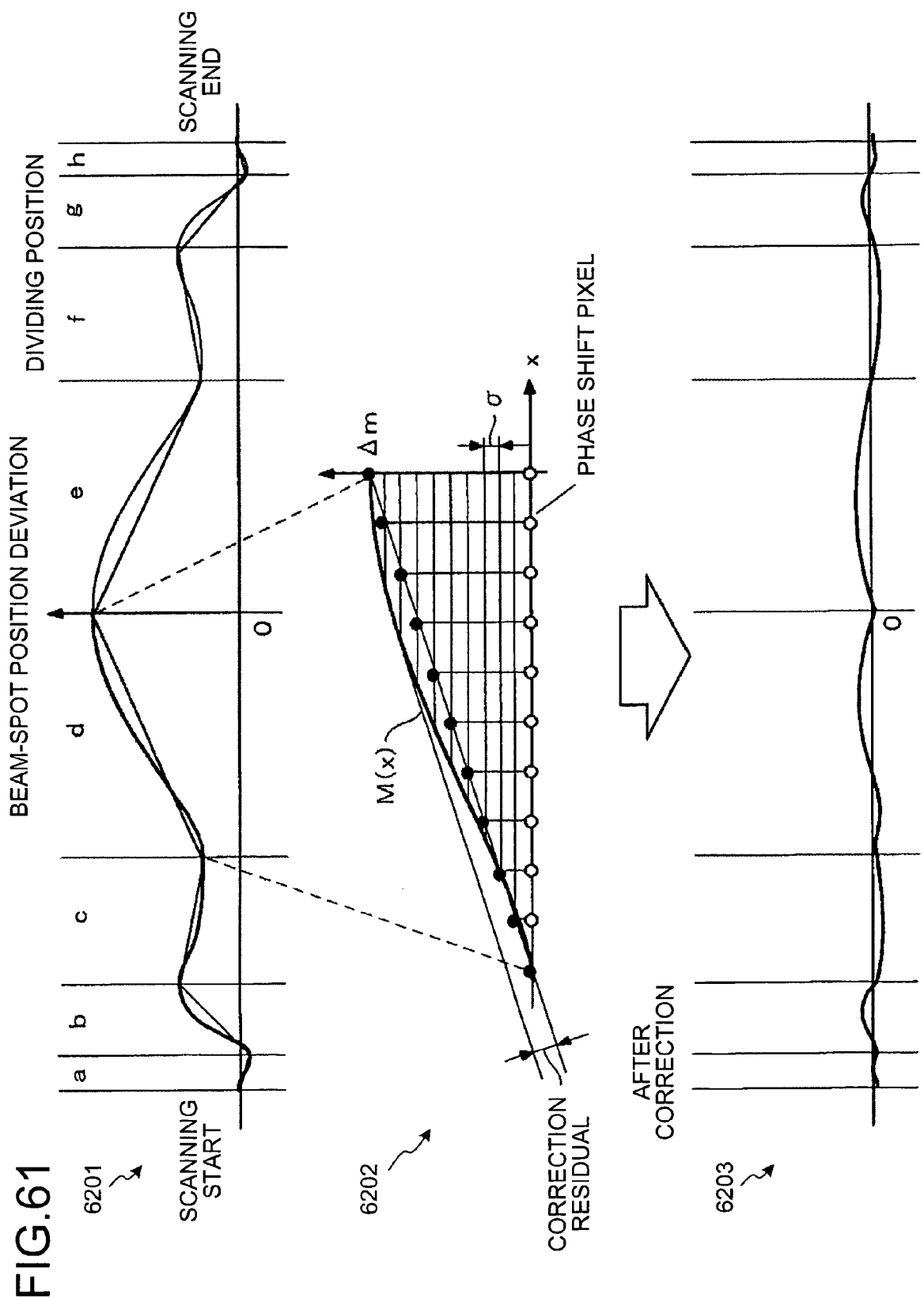
FIG. 61 is a diagram of a method of correcting partial distortion of a magnification error along a scanning direction.

According to the present embodiment, as shown in a diagram denoted by reference numeral 6201 in FIG. 61, a main scanning area is divided into a plurality of sections. An interval of pixels for shifting a phase and a shift amount are set for each of the section divided as described below and given as data. An enlarged section d is shown in a diagram denoted by reference numeral 6202. Phase data after correction is shown in a diagram denoted by reference numeral 6203.

When a change in a magnification with respect to a main scanning position x is L(x), a change in beam spot position deviation M(x) is represented by an integral value of L(x).

$$M(x)=\int L(x)dx$$

Assuming that correction is performed to reduce beam spot position deviation to 0 at a start point and an end point of the divided section, when deviation of a divided section width following a change in a magnification in an arbitrary divided section is Δm, resolution of phase shift is σ, and the number of pixels in the divided section is N, an interval of pixels for shifting a phase is indicated by the following equation.

$$D=N/(\Delta m/\sigma)$$

where D is an integer. A phase only has to be shifted by σ for every D pixels. According to the present embodiment, σ is ⅛ pixel.

Therefore, in this case, a beam spot position deviation residual is the largest just in a middle position of the divided section. Respective dividing positions and the number of divided sections only have to be decided such that the residual is within an allowable range.

Figure 60:
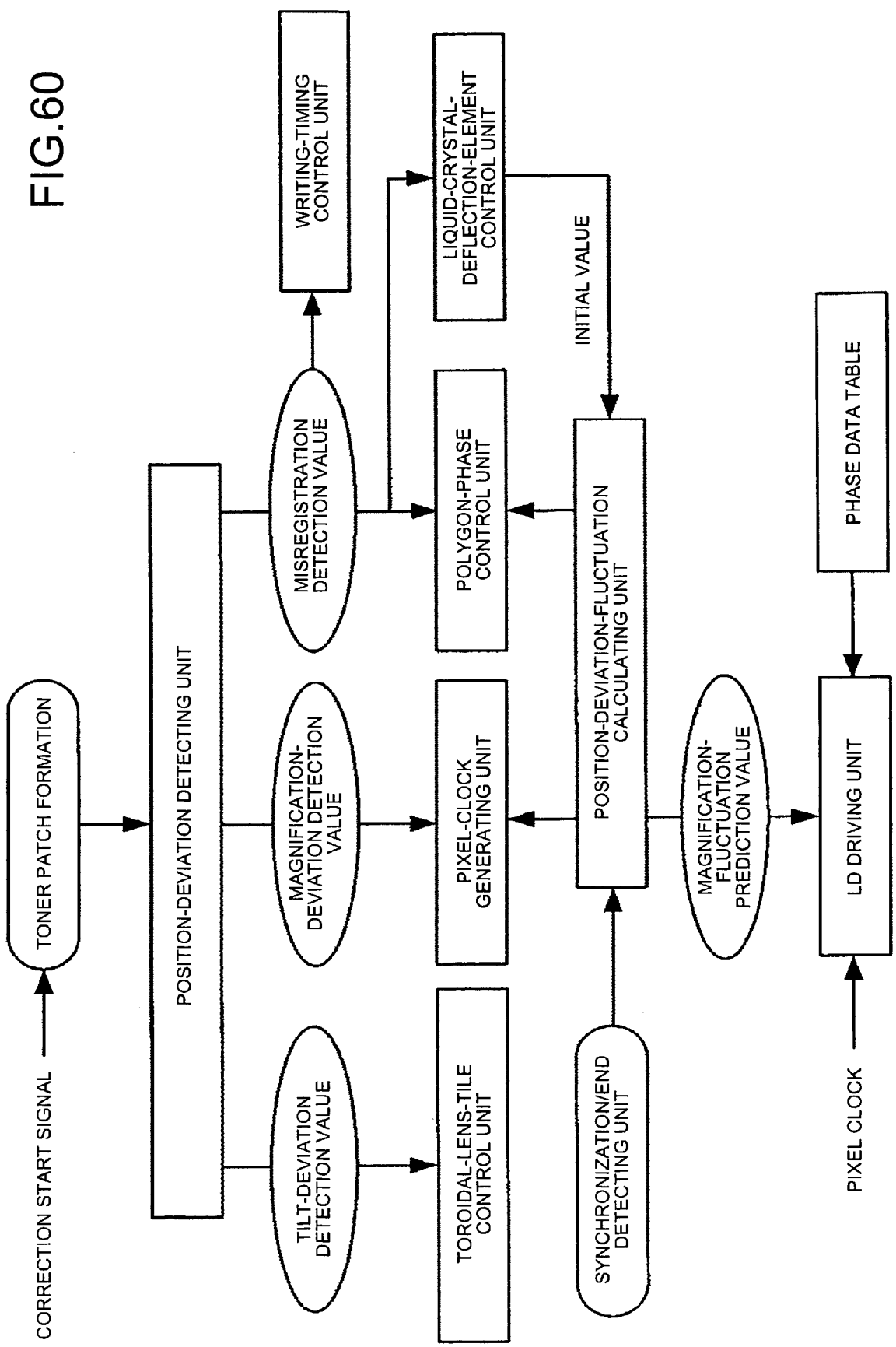
FIG. 60 is a block diagram of control for beam spot positional deviation.

FIG. 60 is a block diagram of beam spot position deviation control according to the present embodiment. As described above, scanning positions of the other image forming stations are adjusted to the reference image forming station in the respective optical scanning unit, a state of superimposition of images of the reference image forming stations of the respective optical scanning units is detected among the optical scanning unit, and timing for starting drawing an image and a period of a pixel clock are uniformly corrected for on optical scanning unit. A main scanning magnification, a sub-scanning registration, and scanning line tilt are detected as relative deviation with one station as a reference by reading a detection pattern of a toner image formed on the intermediate transfer belt 1105 in the reference stations of the respective optical scanning units. The state of superimposition of images is periodically subjected to correction control.

The correction control is performed at timing such as start of the apparatus or between jobs. When the number of prints per one job is large, to control deviation due to a temperature change during that period, the job is interrupted in the middle and corrected.

As shown in FIG. 53, the detecting unit includes the LED element 1154 for lighting, the photo sensor 1155 that receives reflected light, and the pair of condensing lenses 1156. According to the present embodiment, the detecting units are arranged in the center and both left and right ends of an image.

A line pattern 1141 tilted by about 45 degrees with respect to the main scanning line is formed using black and magenta toner images serving as references in the respective optical scanning units. A detection time difference is read according to movement of the intermediate transfer belt 1105. Since this process is the same as that shown in FIG. 51, an explanation of the process is omitted.

This pattern is formed by a plurality of light sources (according to the present embodiment, two beams). Thus, as shown in FIG. 56, unevenness occurs by d in the main scanning direction because of a wavelength difference between the light sources. A line width is different depending on a combination as indicated by D1 and D2 in the sub-scanning direction because of a pitch error.

In the case of two beams, when a line interval scanned by one surface of the polygon mirror 1106 is narrowed, an interval between the line and the next line scanned by an adjacent surface is widened.

Thus, according to the present embodiment, all the light sources are used, a line width extending over at least three lines or more is set along a detection position to form the line pattern 1141 such that a beam from any one of the light sources is used for scanning on adjacent two or more surfaces of the polygon mirror 1106, and both edges of the line is detected along the detection position to calculate a middle point of the edges.

This makes it possible to detect averaged deviation including all pitch errors. There is the same effect as detecting deviation individually for each of the light sources to calculate an average value. The detection is not affected by fluctuation in a pitch and fluctuation in a main scanning magnification.

It is likely that a line width changes in every detection depending on from which light source the drawing of the line pattern 1141 is started. Thus, it is necessary to always form a leading row of the line pattern 1141 with a specific light source.

Concerning a sub-scanning registration detected in this way, a surface phase is selected for every other surface of the polygon mirror 1106, that is, when the number of light sources is n, with a line pitch n·p, 2P according to the present embodiment, as a unit. A scanning line with smallest misregistration among scanning lines of the respective light sources is selected as a leading row at the time of usual printing to correct timing for starting drawing an image in the sub-scanning direction of one optical scanning unit commonly for the respective image forming stations and control rotations phases of the polygon mirrors 1106 to be a predetermined value. This makes it possible to also correct the rest ΔP equal to or less than one scanning line pitch P, which cannot be corrected according to the timing, in the sub-scanning misregistration detected by the toner image.

Tilt is corrected commonly for the respective image forming stations in one optical scanning unit according to the rearrangement of pixel data.

On the other hand, in the optical scanning unit, as described above, it is possible to always monitor scanning position deviation among the image forming stations using the photo diodes 1152 and 1153.

According to the present embodiment, the photo diodes 1152 and 1153 are arranged at both ends of a scanning area in the main scanning direction to make it possible to also detect scanning line tilt. A registration position and tilt are automatically corrected by feedback correction and controlled to be adjusted to a reference scanning position of a station. Concerning a main scanning magnification, magnification change among the image forming stations is always monitored based on detection times of a synchronization detection signal and an end detection signal as described above and a reference frequency of a pixel clock for modulating the respective semiconductor lasers 1501 and 1502 is corrected such that the main scanning magnification coincides with a magnification of the reference image forming station. Thus, it is possible to correct color misalignment of all the image forming stations if only states of superimposition of images in the reference image forming stations among the respective units are adjusted to one another.

In this way, according to the present embodiment, periodic correction by toner image detection is minimized to keep superimposition accuracy of respective color images without consuming time for interrupting a print operation.

The four image forming stations are divided into pairs of two image forming stations. The image forming stations are scanned by the polygon mirror 1106 rotating in the identical direction to align scanning directions of the respective image forming stations to make it less likely that misregistration occurs even if fluctuation in a magnification in the main scanning direction occurs and make it possible to cope with correction among the optical scanning units only with electrical correction. Consequently, time required for the correction is reduced.

Note that, in the main scanning direction, distortion of a magnification at an intermediate image height is reduced by changing a period of a pixel clock for each of the sections formed by dividing the main scanning area as described above such that a magnification is uniform over the entire area in the main scanning direction.

Therefore, it is desirable to provide a sensor for detecting misregistration for each dividing position. However, this leads to an increase in cost and correction time. According to the present embodiment, to minimize the number of sensors, phase data weighted by predicting a magnification change for each of the divided areas, which occurs following a temperature change, is stored in advance in a data table in association with an amount of change of a magnification in a predetermined section.

Therefore, the sensors are arranged in three places, that is, the center and both the ends, in the main scanning area to detect amounts of change of a magnification in respective sections formed by dividing the main scanning area into two. A magnification change for each of the divided sections is predicted such that misregistration from the reference image forming station is zero at the three places.

Figure 57D:
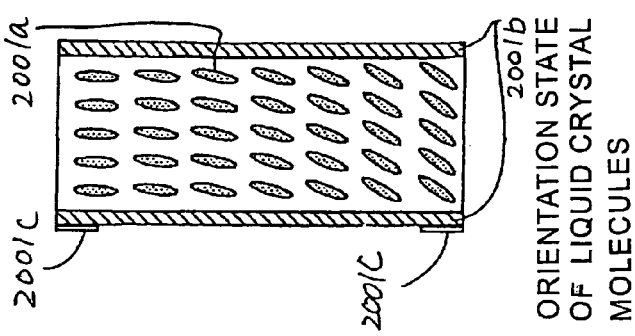
FIGS. 57A to 57D are diagrams of a liquid crystal deflection element and characteristics of the liquid crystal deflection element.
Figure 57C:
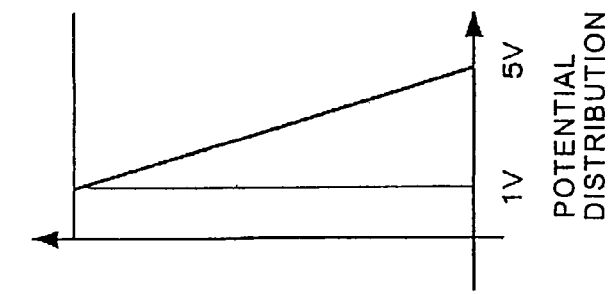
Figure 57B:
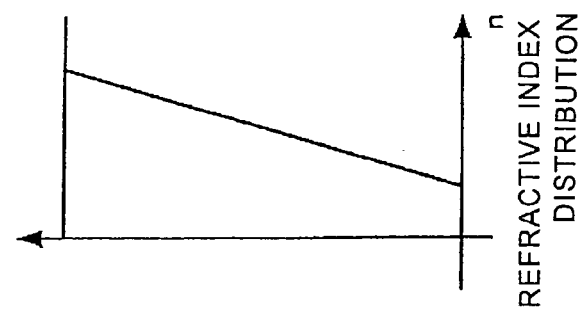
Figure 57A:
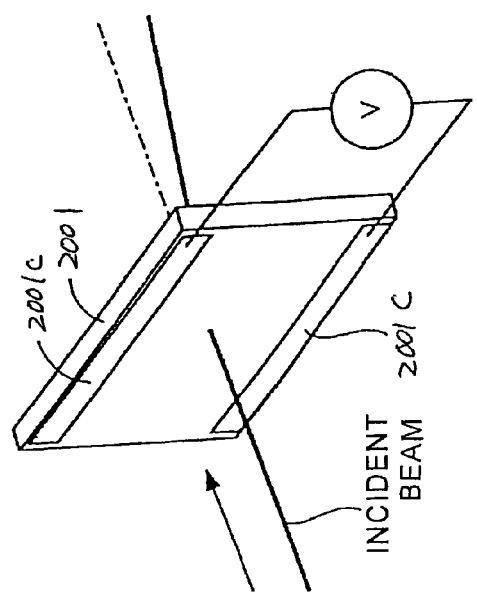

FIGS. 57A to 57D are schematics of the liquid crystal deflection element 2001 serving as an optical axis deflecting unit. FIG. 57A is a schematic of an external appearance of the liquid crystal deflection element 2001. In the liquid crystal deflection element 2001, as shown in FIG. 57D, a liquid crystal 2001a is encapsulated between transparent glass plates 2001b. Electrodes 2001c are formed in upper and lower parts of a surface of one glass plate 2001b.

When a potential difference is given between the electrodes 2001c, as shown in FIG. 57C, tilt of a potential occurs. As shown in FIG. 57B, an orientation of the liquid crystal 2001a changes to cause a refractive index distribution.

Therefore, it is possible to slightly tilt an emission axis of a beam as in a prism. A nematic liquid crystal or the like having induced anisotropy is used as the liquid crystal 2001a. Therefore, if the electrodes 2001c are provided in the sub-scanning direction, it is possible to change a scanning position on a photosensitive member surface according to an applied voltage.

Note that, according to this operation, a position of incidence in the toroidal lens slightly changes. However, an amount of change of the scanning position is about several tens μm. The amount of change does cause bending.

Figure 68:
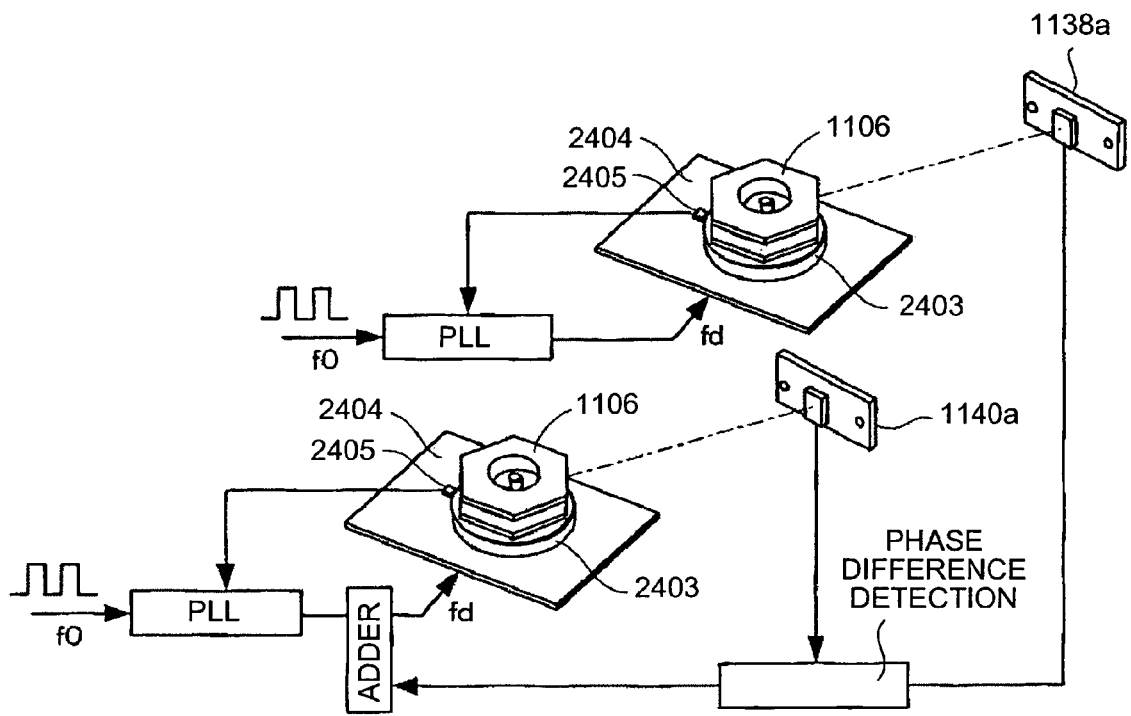
FIG. 68 is a block diagram of a circuit for controlling a phase of a polygon mirror.

FIG. 68 is a block diagram of a circuit for controlling a phase of the polygon mirrors 1106. The respective polygon mirrors 1106 are mounted on rotors 2403 and supported by circuit boards 2404 to freely rotate.

In general, an S pole and an N pole are arranged in a rotor magnet to equally divide a circumferential direction. Hall elements 2405 serving as a rotation position detecting unit are provided on the circuit boards 2404. Every time a boundary of the poles passes over the Hall elements 2405 according to rotation of polygon motors, rotation position detection signals of a fixed period are generated.

Pulse signals f0 of a fixed frequency are inputted to the polygon mirrors 1106 from the outside according to the number of revolutions to rotate the polygon mirrors 1106. The pulse signals f0 and the rotation position detection signals are inputted to PLL circuits. Consequently, a driving frequency fd, a phase of which is controlled such that the rotation position detection signal has a fixed period, is generated to rotate the polygon mirrors 1106 at constant speed.

The pulse signals f0 of an identical frequency are inputted to the respective polygon mirrors 1106. On the other hand, light beams deflected by the polygon mirrors 1106 are detected by synchronization detecting sensors 138 and 140 at a start end of each scanning and a synchronization detection signal is generated for each surface of the polygon mirrors 1106.

Since a divided angle of each surface is fixed, the synchronization detection signal is also a pulse signal of a fixed period. Therefore, if the number of poles is set such that the number of surfaces of the polygon mirrors 1106 and the number of pulses of a rotation position detection signal corresponding to one rotation are equal, frequencies are equal. This makes it easy to perform phase control.

Usually, the Hall elements 2405 and the respective surfaces of the polygon mirrors 1106 are not attached with angles thereof adjusted in the peripheral direction. Thus, rotation position detection signals and synchronization detection signals from the Hall elements 2405 have different phases, respectively.

According to the present embodiment, in the polygon mirrors 1106 in the respective optical scanning units 900A and 900B, the synchronization detecting sensors 1138aa and 1140a are arranged at an identical image height such that rotation angles of the polygon mirrors 1106 are the same when light beams pass through the synchronization detecting sensors 1138aa and 1140a.

With any one of the polygon mirrors 1106, the polygon mirror 1106 shown in the upper part of the figure according to the present embodiment, as a reference, a phase difference of a synchronization detection signal of the other polygon mirror 1106 is inputted to an adder. Consequently, a phase of the driving frequency fd outputted from the PLL circuits is controlled. A rotation phase t of the polygon mirrors 1106 is controlled such that detection timing of the synchronization detection signals takes a predetermined value.

According to the present embodiment, the rotation phase t at this point is set as described below. When moving speed of the intermediate transfer belt 1105 is v mm/s, misregistration detected on the intermediate transfer belt 1105 is d mm, and a scanning frequency of the polygon mirrors 1106 is f hertz, the rotation phase t is represented as follows.

$$T=d/v-k/f$$

where k is an integer equal to or larger than t. It is possible to satisfactorily correct the misregistration d among the respective optical scanning units to one line or less by controlling the rotation phase t to satisfy this condition.

Note that the scanning frequency f is represented as follows using recording density DPI.

$$f=v \cdot DPI/25.4$$

The number of revolutions R of the polygon mirrors 1106 is represented as follows using the number of surfaces n.

$$R=60 \times f/n$$

In the optical scanning units 900A and 900B, a variation of a scanning line is electrically adjusted. Thus, it is possible to eliminate presence of artificial superiority (skill) in adjustment work as much as possible and realize uniformalization of correction, improvement of accuracy, and an increase in speed.

In the optical scanning units 900A and 900B, in electrical adjustment of a variation of a scanning line, the main scanning area is divided according to a deviation amount with respect to a reference scanning line and a recording position for image data is shifted such that timing for starting drawing an image is staggered for each of areas divided. Thus, it is possible to eliminate presence of artificial superiority (skill) in adjustment work as much as possible and realize uniformalization of correction, improvement of accuracy, and an increase in speed.

In the optical scanning units 900A and 900B, scanning line tilt on the surface to be scanned is corrected by adjusting an attachment position of an optical element around an axis parallel to an optical axis. Thus, it is possible to simultaneously correct a tilt component in attachment of the optical element and eliminate complication of a bending shape following the tilt. Therefore, it is possible to minimize a correction residual and perform high-quality image without color misalignment or color change.

In the optical scanning units 900A and 900B, an optical element subjected to adjustment of a variation of a scanning line among the optical elements constituting the focusing optical system is arranged such that light beams from a plurality of light sources cross one another near the optical element. Thus, it is possible to realize improvement of accuracy through uniformalization of correction.

In the optical scanning units 900A and 900B, since a position of incidence of a ray in an optical element is adjustable in the sub-scanning section with respect to the optical axis, it is possible to realize the adjustment only through control for an attachment angle of the return mirror arranged on the upstream side. Thus, it is possible perform high-quality image formation without color misalignment or color change at low cost without requiring a complicated adjusting mechanism.

In the optical scanning units 900A and 900B, the second scanning-line-variation correcting unit changes a scanning line by changing a focus line of an optical element having a convergent action at least in the sub-scanning direction among the optical elements constituting the focusing optical system in the sub-scanning direction. Thus, it is possible to surely correct a local change component (e.g., a bending component) remaining after correcting a quadratic function curve component and perform high-quality image formation without color misalignment or color change.

In the optical scanning units 900A and 900B, the first scanning-line-variation correcting unit and the second scanning-line-variation correcting unit are provided for an identical optical element constituting the focusing optical system to change a scanning line. Thus, it is possible to aggregate correcting mechanisms and perform high-quality image formation without color misalignment or color change at low cost.

In the image forming apparatus, since the optical scanning units 900A and 900B are provided, a deviation of a change (e.g., bending) in a scanning line among the image forming stations is in a complicated shape locally having unevenness, it is possible to surely correct the deviation to be in line with a scanning line shape of a reference image forming station. Thus, it is possible to perform high-quality image formation without color misalignment and color change.

According to the third embodiment, a prism action of the liquid crystal deflection element 2001 is used. In a fourth embodiment of the present invention, an adjustment constitution using a prism (an unparallel flat plate) is used.

Figure 69A:
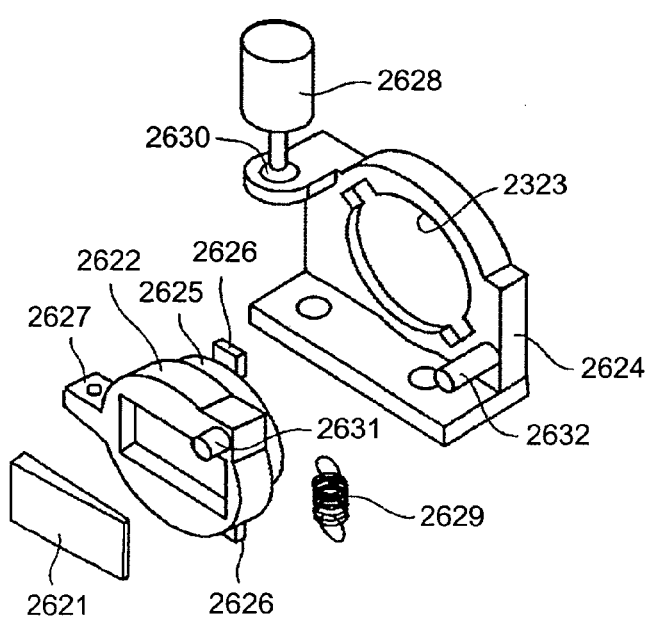
FIGS. 69A and 69B are diagrams of an adjustment constitution using a prism (an unparallel flat plate) in a fourth embodiment of the present invention.
Figure 69B:
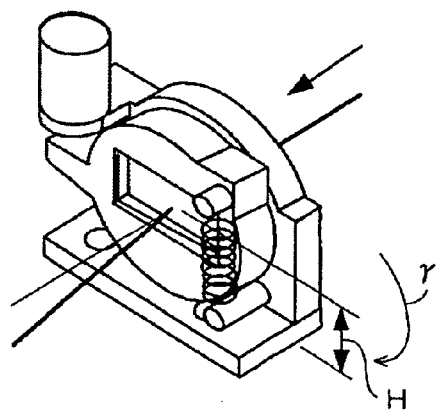

FIG. 69A is a diagram for explaining a constitution of the prism and FIG. 69B is a diagram of an external appearance of the prism.

As shown in FIG. 69A, an unparallel flat plate 2621 is fixed in a center frame of a cylindrical holder member 2622. The holder member 2622 is inserted in a support member 2624, in which a bearing section 2623 is formed, with a pair of brim sections 2626 fit to notches and is returned to a horizontal state. Then, the brim sections 2626 are hooked on a rear side of the support member 2624. The holder member 2622 is rotatably held with a fitting section 2625 as a reference in a state in which the holder member 2622 adheres to the support member 2624.

The support member 2624 is screwed to the housing 2200 with a bottom surface thereof as a reference as described above. Height H is set such that a rotation center of the bearing section 2623 coincides with an emission axis of a light source unit. It is possible to slightly tilt an emission axis of a beam according to rotation.

A lever section 2627 is formed at one end of the holder member 2622. A feed screw formed at a shaft tip of a stepping motor 2628 engaged and fixed in a through-hole 2630 formed in the support member 2624 is screwed in the lever section 2627. The unparallel flat plate 2621 is rotationally movable following up and down movement of the lever section 2627.

Note that, to secure backlash in this case, a tensile force is applied between a pin 2631 of the holder member 2622 and a pin 2632 of the support member 2624 by a spring 2629 to bias the pins in one direction. When a rotation angle of the rotation is $\gamma$, a vertical angle of the unparallel flat plate is $\epsilon$, a focal length of a coupling lens is fc, and a sub-scanning magnification of an entire optical system is $\zeta$, a change of a sub-scanning position on a photosensitive member surface is given by the following equation.

$$\Delta y = \zeta \cdot fc \cdot (n-1) \cdot \epsilon \cdot \sin \gamma$$

where n is a refractive index of the unparallel flat plate. It is possible to change the sub-scanning position substantially proportional to the rotation angle when the rotation angle is very small.

In summary, in the respective embodiments, color misalignment collection between two colors in the respective optical scanning units 900A and 900B is performed to electrically correct color misalignment of colors serving as references of the color misalignment correction uniformly according to electrical correction. Consequently, it is possible to simplify a procedure for the correction.

Since the correction is divided for every two colors, two sets of common optical scanning units only have to be prepared. Although four colors are used in the embodiments, it is possible to apply the correction to six colors or the like including halftones already used in an ink-jet printer. This is explained below as a fifth embodiment.

Figure 70:
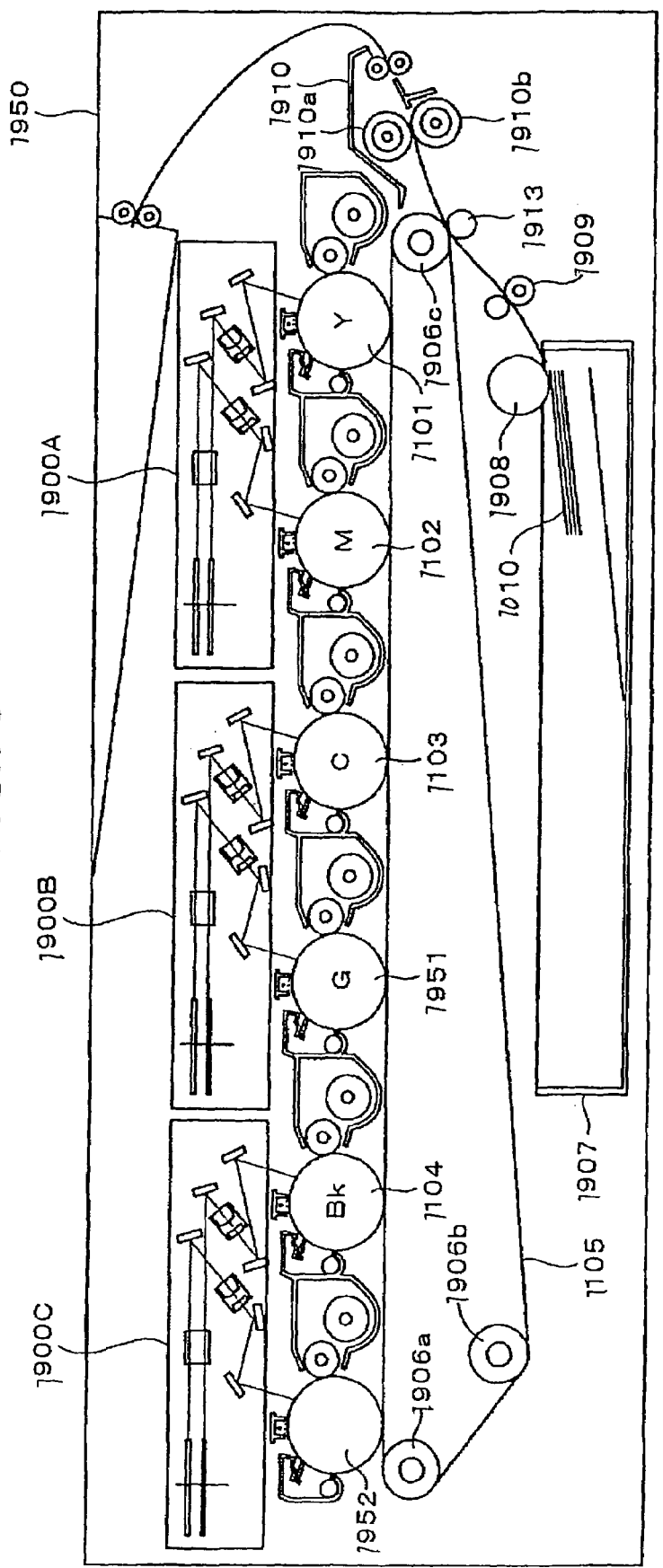
FIG. 70 is a schematic of an entire image forming apparatus in a fifth embodiment of the present invention.

In FIG. 70, a multi-color image forming apparatus 1950 according to the present embodiment includes a photosensitive drum 1951 corresponding to gray for improvement of gradation and a photosensitive drum 1952 corresponding to a transparent toner for improvement of glossiness other than the photosensitive drums 1101, 1102, 1103, and 1104 corresponding to yellow, magenta, cyan, and black.

According to the present embodiment, an optical scanning unit 1900A corresponding to yellow and magenta, an optical scanning unit 900B corresponding to cyan and gray, and an optical scanning unit 900C corresponding to black and the transparent toner are arranged.

Since an image forming operation, an optical scanning function, and the like according to the present embodiment are the same as those in the embodiments, an explanation thereof is omitted.

According to the embodiments described above, the tandem image forming apparatus that transfers images onto an intermediate transfer member and, then, collectively transfers the images onto a sheet-like recording medium is explained as an example. It is also possible to carry out the present invention in a tandem color image forming apparatus of a direct transfer type that sequentially transfers images while superimposing the images one on top of another while conveying a sheet-like recording medium with an endless belt.

In the optical scanning device that uses light beams from light sources to perform scanning with a rotary polygon mirror and focuses the light beams on a surface to be scanned with a focusing optical system according to the third to the fifth embodiment, a scanning-line-variation correcting unit that corrects a variation of a scanning line on the surface to be scanned is provided. The scanning-line-variation correcting unit can cause a variation of a scanning line of a change component (a cubic or higher-order function curve component) having vertexes in a plurality of portions along the main scanning direction. The cubic or higher-order function curve component is offset by causing a variation of a scanning line of an opposite form. Thus, it is possible to surely correct a change component (e.g., a curve component) for which correction has been conventionally difficult. It is possible to perform high-quality image formation without color misalignment or color change without deteriorating productivity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical-element holding device comprising:
   an elastic member that presses an optical element with an elastic force in an adjusting direction that is orthogonal to an optical axis of the optical element and orthogonal to a longitudinal direction of the optical element; and
   a support member that forms a pair with the elastic member and adjustably supports the optical element against a pressing force of the elastic member so that the optical element's deflection is adjustable, and wherein
   at least three pairs of the elastic member and the support member are aligned in a direction that is perpendicular to the adjusting direction and perpendicular to the optical axis.

2. The optical-element holding device according to claim 1, wherein
   two pairs of the elastic member and the support member are arranged at both ends of the optical element in the longitudinal direction.

3. The optical-element holding device according to claim 1, wherein
   at least one of the support member is held by a separate holder member and is movable in a direction of the pressing force.

4. The optical-element holding device according to claim 3, further comprising:
   an adjusting mechanism that is capable of adjusting an amount of movement of the support member, wherein
   the adjusting mechanism includes at least an adjusting screw element.

5. The optical-element holding device according to claim 1, wherein
   the optical element is held in a rotatable manner around a rotation axis substantially parallel to the optical axis of the optical element.

6. The optical-element holding device according to claim 5, wherein
   two support members are fixed to a holder member or formed integrally with the holder member.

7. The optical-element holding device according to claim 1, wherein
   the optical element is held in a rotatable manner around a rotation axis substantially parallel to the longitudinal direction.

8. The optical-element holding device according to claim 1, further comprising:
   a holder member that holds the support member for each of the support members, wherein
   the holder member is provided on either one of one side and other side of the optical element.

9. An optical scanning device comprising:
   a light deflector that deflects a light beam emitted from a light source;
   at least one optical element that focuses the deflected light beam on a surface to be scanned as a beam spot; and
   an optical-element holding unit including
      an elastic member that presses an optical element with an elastic force in a direction orthogonal to an optical axis of the optical element and orthogonal to a longitudinal direction of the optical element; and
a support member that forms a pair with the elastic member and adjustably supports the optical element against a pressing force of the elastic member, wherein
at least three pairs of the elastic member and the support member are provided.

10. The optical scanning device according to claim 9, further comprising:
a detecting unit that detects an amount of deflection of the optical element, wherein
the support member is capable of adjusting an amount of movement based on a result of detection by the detecting unit.

11. The optical scanning device according to claim 10, wherein
the detecting unit detects the amount of deflection of the optical element by detecting a bending of a scanning line on the surface to be scanned.

12. An image forming apparatus comprising:
an optical scanning unit that includes
a light deflector that deflects a light beam emitted from a light source;
at least one optical element that focuses the deflected light beam on a surface to be scanned as a beam spot; and
an optical-element holding unit including
an elastic member that presses an optical element with an elastic force in a direction orthogonal to an optical axis of the optical element and orthogonal to a longitudinal direction of the optical element; and
a support member that forms a pair with the elastic member and supports the optical element against a pressing force of the elastic member, wherein
at least three pairs of the elastic member and the support member are provided.

13. An image forming apparatus comprising:
an optical scanning unit that includes
a light deflector that deflects a light beam emitted from a light source;
at least one optical element that focuses the deflected light beam on a surface to be scanned as a beam spot; and
an optical-element holding unit including
an elastic member that presses an optical element with an elastic force in a direction orthogonal to an optical axis of the optical element and orthogonal to a longitudinal direction of the optical element;
a support member that forms a pair with the elastic member and adjustably supports the optical element against a pressing force of the elastic member, wherein at least three pairs of the elastic member and the support member are provided; and
a detecting unit that detects an amount of deflection of the optical element, wherein
the support member is capable of adjusting an amount of movement based on a result of detection by the detecting unit, and
the detecting unit detects the amount of deflection of the optical element from a toner image formed on a transfer belt.

14. A method of adjusting shape of an optical element in an optical-element holding device that includes an elastic member that presses an optical element with an elastic force in a direction orthogonal to an optical axis of the optical element and orthogonal to a longitudinal direction of the optical element, and a support member that forms a pair with the elastic member and supports the optical element against a pressing force of the elastic member, wherein at least three pairs of the elastic member and the support member are provided, the method comprising:
adjusting deflection of the optical element by adjusting a position of the support ember forming the pair with the elastic member.

15. A method of adjusting shape of an optical element, the method comprising:
adjusting deflection of the optical element by applying an external force to the optical element, wherein
the shape of the optical element after the adjusting is a shape with a number of peaks equal to or less than three by making the external force act to one place.

16. The method according to claim 15, wherein
the external force is applied in a symmetrical manner in a longitudinal direction of the optical element.

17. The method according to claim 15, wherein
the external force is applied at a preliminary assembly stage at the adjusting.

18. The method according to claim 15, wherein
number of adjusting places to which adjustable external forces are applied is equal to or less than three.

19. The method according to claim 17, further comprising:
applying a counteracting elastic force against each of the adjustable external forces to make the external force act to one place.

20. The method according to claim 15, wherein
a shape error of the optical element that when the shape of the optical element is changed to a shape with a number of peaks equal to or less than three by the external force is equal to or less than 0.1 millimeter.

21. A mechanism for adjusting shape of an optical element, the mechanism comprising:
an elastic member that presses an optical element with an elastic force in a direction orthogonal to an optical axis of the optical element and orthogonal to a longitudinal direction of the optical element; and
a support member that forms a pair with the elastic member and supports the optical element against a pressing force of the elastic member, wherein
at least three pairs of the elastic member and the support member are provided, and
an external force is to one place of the optical element by the elastic members and the support members to adjust the shape of the optical element so that the shape of the optical element after adjustment becomes a shape with a number of peaks equal to or less than three.

22. A mechanism for adjusting shape of an optical element to which a method of adjusting the shape of the optical element is applied, the method including applying a counteracting elastic force against each of adjustable external forces applied to the optical element in a preliminary assembly stage in an adjusting process and making the external force act to one place so that the shape of the optical element after the adjusting is a shape with a number of peaks equal to or less than three, the mechanism comprising:
a first plate elastic member and a second plate elastic member that are longer than the optical element, arranged on both sides of the optical element in a direction perpendicular to a longitudinal direction, and nip the optical element;
a plurality of press adjusting members that are arranged in a row on one of the first and the second plate elastic members in the longitudinal direction to press and deform the optical element, the press adjusting members including a first press adjusting member, a second press adjusting member, and a third press adjusting member;

two support members that are arranged between other of the first and the second plate elastic members and the optical element in opposite to the first and the second press adjusting members, respectively; and a third elastic member that is arranged between the first and the second plate elastic members and applies an elastic force to the optical element in opposite to a pressing force by the third press adjusting member.

23. An optical scanning device comprising:

a mechanism for adjusting shape an optical element to which a method of adjusting the shape of the optical element is applied, the method including adjusting deflection of the optical element by applying an external force to the optical element so that the shape of the optical element after the adjusting is a shape with a number of peaks equal to or less than three by making the external force act to one place, wherein the shape of the optical element is adjustable in a state in which the optical element is mounted on the optical scanning device.

24. An image forming apparatus comprising:

an optical scanning unit that includes a mechanism for adjusting shape an optical element to which a method of adjusting the shape of the optical element is applied, the method including adjusting deflection of the optical element by applying an external force to the optical element so that the shape of the optical element after the adjusting is a shape with a number of peaks equal to or less than three by making the external force act to one place, wherein the shape of the optical element is adjustable in a state in which the optical element is mounted on the optical scanning unit.

\* \* \* \* \*